(12) United States Patent
Uchida et al.

(10) Patent No.: US 10,740,599 B2
(45) Date of Patent: Aug. 11, 2020

(54) NOTIFICATION DEVICE, EXERCISE ANALYSIS SYSTEM, NOTIFICATION METHOD, NOTIFICATION PROGRAM, EXERCISE SUPPORT METHOD, AND EXERCISE SUPPORT DEVICE

(71) Applicant: Seiko Epson Corporation, Shinjuku-ku (JP)

(72) Inventors: Shuji Uchida, Shiojiri (JP); Hideo Sasahara, Matsumoto (JP); Kazumi Matsumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 312 days.

(21) Appl. No.: 15/842,031

(22) Filed: Dec. 14, 2017

(65) Prior Publication Data

US 2018/0107867 A1    Apr. 19, 2018

Related U.S. Application Data

(62) Division of application No. 14/814,498, filed on Jul. 30, 2015, now Pat. No. 9,875,400.

(30) Foreign Application Priority Data

| Jul. 31, 2014 | (JP) | 2014-156118 |
| Jul. 31, 2014 | (JP) | 2014-157203 |
| Jul. 31, 2014 | (JP) | 2014-157207 |
| Jun. 5, 2015 | (JP) | 2015-115211 |

(51) Int. Cl.
*G06K 9/00* (2006.01)
*G09B 19/00* (2006.01)

(52) U.S. Cl.
CPC ..... *G06K 9/00342* (2013.01); *G09B 19/0038* (2013.01)

(58) Field of Classification Search
CPC combination set(s) only.
See application file for complete search history.

(56) References Cited

U.S. PATENT DOCUMENTS

| 8,460,001 B1 | 6/2013 | Chuang |
| 8,540,560 B2 | 9/2013 | Crowley et al. |
| 9,227,108 B1 * | 1/2016 | Chuang .............. G09B 19/0038 |

(Continued)

FOREIGN PATENT DOCUMENTS

| JP | 2002-336376 A | 11/2002 |
| JP | 2006-110046 A | 4/2006 |
| JP | 2013-140158 A | 7/2013 |

OTHER PUBLICATIONS

Non-Final Office Action dated May 16, 2017 in related U.S. Appl. No. 14/814,498 (nine pages).

*Primary Examiner* — Travis R Hunnings
(74) *Attorney, Agent, or Firm* — Kilpatrick Townsend & Stockton LLP

(57) ABSTRACT

A notification device includes a difference calculation section adapted to calculate differences between index values of a plurality of indexes, which are calculated by analyzing an exercise of a user using an inertial sensor, and are related to an athletic ability of the user, and target values set to the respective indexes, an index selection section adapted to select some of the indexes based on the differences with respect to the respective indexes, and an output section adapted to output the some of the indexes selected.

14 Claims, 30 Drawing Sheets

(56) References Cited

U.S. PATENT DOCUMENTS

| | | | |
|---|---|---|---|
| 9,642,415 B2* | 5/2017 | Pease | A61B 5/1112 |
| 10,220,254 B1* | 3/2019 | Chuang | G09B 19/0038 |
| 2010/0331145 A1 | 12/2010 | Lakovic et al. | |
| 2013/0041617 A1* | 2/2013 | Pease | A61B 5/112 |
| | | | 702/139 |
| 2014/0114453 A1 | 4/2014 | Bentley | |
| 2014/0164611 A1 | 6/2014 | Molettiere et al. | |
| 2015/0057111 A1 | 2/2015 | Tremblay-Munger et al. | |
| 2015/0324637 A1* | 11/2015 | Utsunomiya | A61B 5/11 |
| | | | 382/107 |
| 2016/0192866 A1* | 7/2016 | Norstrom | G06K 9/00342 |
| | | | 434/247 |
| 2016/0367879 A1* | 12/2016 | Reynolds, III | A61B 5/7415 |
| 2017/0151463 A1* | 6/2017 | Barfred | A61B 5/00 |
| 2017/0239551 A1* | 8/2017 | Pease | A61B 5/486 |
| 2017/0361162 A1* | 12/2017 | Bailly | A63B 24/0062 |

* cited by examiner

| EXERCISE INDEX | MAXIMUM VALUE OF DIFFERENCE | NOTIFICATION METHOD | |
|---|---|---|---|
| LANDING-BLOW-COG | 50cm | FIRST SOUND | FIRST VIBRATION |
| PROPULSIVE EFFICIENCY | 5 DEGREES | SECOND SOUND | SECOND VIBRATION |
| GROUNDING TIME | 100msec | THIRD SOUND | THIRD VIBRATION |
| FORWARD TILT ANGLE | 5 DEGREES | FOURTH SOUND | FOURTH VIBRATION |
| ⋮ | ⋮ | ⋮ | ⋮ |

136

| RUNNING SPEED | TARGET VALUES OF EXERCISE INDEXES | | | | |
|---|---|---|---|---|---|
| | LANDING-BLOW-COG | PROPULSIVE EFFICIENCY | GROUNDING TIME | FORWARD TILT ANGLE | ... |
| 5m/s | 35cm | 10 DEGREES | 100msec | 8 DEGREES | ... |
| 4m/s | 30cm | 11 DEGREES | 150msec | 7 DEGREES | ... |
| 3m/s | 25cm | 12 DEGREES | 200msec | 6 DEGREES | ... |
| 2m/s | 20cm | 13 DEGREES | 250msec | 5 DEGREES | ... |

| NOTIFICATION MODE | NOTIFICATION TARGET | NOTIFICATION METHOD | |
|---|---|---|---|
| MODE 1 | TARGET GROUNDING TIME | FIRST SOUND | FIRST VIBRATION |
| | TARGET FLYING TIME | NONE | |
| MODE 2 | TARGET GROUNDING TIME | NONE | |
| | TARGET FLYING TIME | SECOND SOUND | SECOND VIBRATION |
| MODE 3 | TARGET GROUNDING TIME | FIRST SOUND | FIRST VIBRATION |
| | TARGET FLYING TIME | SECOND SOUND | SECOND VIBRATION |
| MODE 4 | TARGET GROUNDING TIME | NONE | |
| | TARGET FLYING TIME | NONE | |

| RUNNING SPEED | TARGET GROUNDING TIME | TARGET FLYING TIME |
|---|---|---|
| 4m/s | 170msec | 110msec |
| 3m/s | 190msec | 100msec |
| 2m/s | 210msec | 90msec |

FIG. 25

[LACTATE ACCUMULATION STATE SETTING TABLE] 770

| VERTICAL VIBRATION AMPLITUDE [cm] | LACTATE ACCUMULATION LEVEL | LACTATE ACCUMULATION STATE |
|---|---|---|
| ~5.0 | 1 | NORMAL STATE |
| 5.0~6.0 | 2 | |
| 6.0~7.0 | 3 | |
| 7.0~8.0 | 4 | |
| 8.0~ | 5 | HIGH ACCUMULATION STATE |

FIG. 36

[RUNNING FORM SETTING TABLE] 780

| RUNNING FORM | EXERCISE INDEX | |
| | CADENCE [spm] | STRIDE [m] |
|---|---|---|
| LONG-STRIDE RUNNING | ~170 | 1.3~ |
| SHORT-STRIDE RUNNING | 170~ | ~1.3 |

FIG. 37

NOTIFICATION DEVICE, EXERCISE ANALYSIS SYSTEM, NOTIFICATION METHOD, NOTIFICATION PROGRAM, EXERCISE SUPPORT METHOD, AND EXERCISE SUPPORT DEVICE

CROSS-REFERENCE TO RELATED APPLICATIONS

This application is a divisional of U.S. patent application Ser. No. 14/814,498, filed Jul. 30, 2015, which claims priority to Japanese Patent Application No. 2014-157203, filed Jul. 31, 2014, No. 2015-115211, filed Jun. 5, 2015, No. 2014-157207, filed Jul. 31, 2014 and No. 2014-156118, filed Jul. 31, 2014 the entire disclosures of which are incorporated by reference herein.

BACKGROUND

1. Technical Field

The present invention relates to a notification device, an exercise analysis system, a notification method, a notification program, an exercise support method, and an exercise support device.

2. Related Art

In JP-A-2006-110046 (Document 1), there is described a running method learning device, which detects the acceleration in each of X, Y, and Z axis directions and the angular velocity around the Z axis when running, calculates the translational acceleration and the angular velocity in each of the axis directions of the runner from the measurement values thus detected, compares the calculated values with target values recorded on a storage device, and then informs the runner of the fact that the measurement values exceed the target values at every step via a warning information device if the measurement values exceed the target values. Further, the running method learning device is provided with a support device for supporting the runner to determine the target values in advance, and performs the target value excess determination exclusively with respect to the warning type selected by the runner. Specifically, the runner can select two types of warning in total by assigning one type of warning to a left ear of a stereo earphone, and assigning the other type of warning to a right ear of the stereo earphone. In this running method learning device, the warning is issued when the target value has been exceeded at every step with respect to the types of warning on which the target value excess determination has been performed. Therefore, it is possible for the runner to make specific and detailed corrections with respect only to the items to be improved.

Further, in JP-A-2002-336376 (Document 2), there is described a health enhancement system, which calculates an exercise pitch of the user using an output of a sensor, and then generates a rhythm, which can be identified by the user, based on the exercise pitch (e.g., the walking pace (walking speed), the pace of swinging arms) thus calculated. According to this system, it is possible to easily and naturally guide the user to a preferable exercise pitch.

Further, a portable electronic apparatus, which is used while attached to the body or the arm of the user conducting an exercise such as running or marathon, is in widespread use. As such a portable electronic apparatus, there has been developed a device, which incorporates a variety of types of sensors such as an acceleration sensor and a gyro sensor, and is provided with a function of calculating a variety of exercise data such as a position, a running speed, a heart rate, the number of steps, and a running pace using the detection values of the built-in sensors (see, e.g., JP-A-2013-140158 (Document 3)).

However, in the running method learning device described in Document 1, since it is necessary for the runner to previously determine what the runner pays attention to while running, then select two types of warning to perform the warning assignment, it is not achievable to know the qualities of the matters the runner does not pay attention to. Further, since the warning inevitably issued in the case in which the target values have been exceeded with respect to either of the two types of warning thus selected, the runner cannot understand which one is worse (which one must be improved in priority). Therefore, in the running method learning device described in Document 1, in some cases, it is not achievable to know which one of the number of indexes related to the athletic abilities is relatively worse or better with respect to the target value, and thus, the runner fails to efficiently be improved in athletic abilities.

Further, in the system described in Document 2, although there is provided a function of giving guidance about the walking pace (the walking speed) and the pace of swinging the arms of the user, it is not achievable to provide a function of giving guidance about the timing of landing and taking off of the feet at every step. Although the timings of landing and taking off of the feet at every step, namely the time (grounding time) during which one of the feet is grounded, and the time (flying time) during which the both feet are separated from the ground are very important indexes for realizing efficient running, a device which informs the user of the timings of the grounding time and the flying time to be the target during the exercise of the user has not currently been proposed.

Further, it has been known that in a variety of exercises including running, if lactate accumulation occurs in a muscle due to the continuous exercise, the muscle weakens due to the lactic acid, which leads to deterioration of the exercise performance. Therefore, if the lactate accumulation can be figured out during the exercise, it is convenient. Whether or not the lactate accumulation has occurred can be known by measuring the level of lactate (lactate concentration) in the blood. As the measurement method of the level of lactate in the blood, a method of obtaining the blood or the breath and the performing the measurement is used in general. However, these methods of the related art require to obtain the blood and the breath, and are therefore difficult to perform during the exercise.

SUMMARY

An advantage of some aspects of the invention is to provide a notification device, an exercise analysis system, a notification method, and a notification program each capable of making a notification of some of indexes related to athletic abilities based on the respective target values during the exercise of the user.

Another advantage of some aspects of the invention is to provide a notification device, an exercise analysis system, a notification method, and a notification program each capable of making a notification of the timing of the grounding time and the flying time to be the target during the exercise of the user.

Still another advantage of some aspects of the invention is to provide an exercise support method, and an exercise support device each capable of estimating the state of the lactate accumulation during the exercise without obtaining the blood or the breath.

The invention can be implemented as the following aspects or application examples.

Application Example 1

A notification device according to this application example includes a difference calculation section adapted to calculate differences between index values of a plurality of indexes, which are calculated by analyzing an exercise of a user using an inertial sensor, and are related to an athletic ability of the user, and target values set to the respective indexes, an index selection section adapted to select some of the indexes based on the differences with respect to the respective indexes, and an output section adapted to output the some of the indexes selected.

The athletic abilities can be, for example, technical abilities or endurance capacities.

According to the notification device related to this application example, by selecting some of the indexes based on the differences between the values of the indexes related to the athletic abilities of the user and the respective target values and then outputting the some of the indexes, it is possible to make a notification of the some indexes out of the indexes based on the respective target values during the exercise of the user.

Application Example 2

In the notification device according to the application example described above, the index selection section may select the indexes larger in the difference than other indexes as the some of the indexes.

According to the notification device related to this application example, it is possible to make a notification of the indexes relatively worse out of the indexes based on the respective target values during the exercise of the user. Therefore, it is possible for the user to perform the exercise while recognizing the worse indexes.

Application Example 3

In the notification device according to the application example described above, the index selection section may select the indexes smaller in the difference than other indexes as the some of the indexes.

According to the notification device related to this application example, it is possible to make a notification of the indexes relatively better out of the indexes based on the respective target values during the exercise of the user. Therefore, it is possible for the user to perform the exercise while recognizing the better indexes.

Application Example 4

The notification device according to the application example described above may further include a normalization section adapted to normalize the differences with respect to the respective indexes, and the index selection section may select the some of the indexes based on the differences normalized with respect to the respective indexes.

According to the notification device related to this application example, it is possible to select some of the indexes under fair conditions to make a notification during the exercise of the user. Therefore, it is possible to reduce the possibility that the notification of specific indexes is apt to be made frequently irrespective of the exercise state of the user.

Application Example 5

In the notification device according to the application example described above, the index selection section may select a predetermined number of the indexes having the largest differences normalized.

According to the notification device related to this application example, it is possible to select the predetermined number of indexes larger in the differences from the respective target values under the fair conditions out of the indexes to make a notification during the exercise of the user. Therefore, it is possible for the user to perform the exercise while recognizing the worse indexes larger in the differences from the respective target values.

Application Example 6

In the notification device according to the application example described above, the index selection section may select none of the indexes in a case in which all of the differences normalized are smaller than a threshold value.

According to the notification device related to this application example, it is possible for the user to determine that the exercise state is good if no notification of any indexes is made.

Application Example 7

In the notification device according to the application example described above, the index selection section may select a predetermined number of the indexes having the smallest differences normalized.

According to the notification device related to this application example, it is possible to select the predetermined number of indexes smaller in the differences from the respective target values under the fair conditions out of the indexes to make a notification during the exercise of the user. Therefore, it is possible for the user to perform the exercise while recognizing the better indexes smaller in the differences from the respective target values.

Application Example 8

In the notification device according to the application example described above, the index selection section may select none of the indexes in a case in which all of the differences normalized are larger than a threshold value.

According to the notification device related to this application example, it is possible for the user to determine that the exercise state is bad if no notification of any indexes is made.

Application Example 9

The notification device according to the application example described above may further include a target value setting section adapted to set the target values corresponding to a speed of the user with respect to the respective indexes using correspondence information between the speed of the user and the respective target values of the indexes.

According to the notification device related to this application example, it is possible to select some of the indexes to make a notification while changing the target values in accordance with the exercise speed of the user.

Application Example 10

In the notification device according to the application example described above, the indexes may be at least one of landing-below-center of gravity, propulsive efficiency, flow of leg, a running pitch, and a landing impact.

Application Example 11

In the notification device according to the application example described above, the output section may output the some of the indexes selected as one of sounds different from each other and vibrations different from each other.

According to the notification device related to this application example, it is possible for the user to recognize which index is included in the notification using the type of the sound or the vibration.

Application Example 12

An exercise analysis system according to this application example includes any one of the notification devices described above, and an exercise analysis device adapted to analyze the exercise of the user using the detection result of the inertial sensor to calculate the index values of the indexes.

According to the exercise analysis system related to this application example, by the exercise analysis device calculating the values of the respective indexes related to the athletic abilities of the user using the detection results of the inertial sensors, and the notification device selecting some of the indexes based on the differences between the values of the indexes and the respective target values, it is possible to make a notification of the some indexes based on the respective target values during the exercise of the user.

Application Example 13

A notification method according to this application example includes calculate differences between values, which are calculated by analyzing an exercise of a user using a detection result of an inertial sensor, and respective target values with respect to a plurality of indexes related to an exercise performance of the user, selecting some of the indexes based on the differences with respect to the respective indexes, and making a notification of the some of the indexes selected.

According to the notification method related to this application example, by selecting some of the indexes based on the differences between the values of the indexes related to the athletic abilities of the user and the respective target values, it is possible to make a notification of the some indexes out of the indexes based on the respective target values during the exercise of the user.

Application Example 14

A notification program according to this application example makes a computer execute a process including calculate differences between values, which are calculated by analyzing an exercise of a user using a detection result of an inertial sensor, and respective target values with respect to a plurality of indexes related to an exercise performance of the user, selecting some of the indexes based on the differences with respect to the respective indexes, and performing a control of making a notification of the some of the indexes selected.

According to the notification program related to this application example, by selecting some of the indexes based on the differences between the values of the indexes related to the athletic abilities of the user and the respective target values, it is possible to make a notification of the some indexes out of the indexes based on the respective target values during the exercise of the user.

Application Example 15

A notification device according to this application example includes an output section adapted to periodically make a notification of at least one of a first period corresponding to a target value of a grounding time of a foot of a user, and a second period corresponding to a target value of a flying time of a foot of the user during an exercise of the user.

According to the notification device related to this application example, in the case of periodically making a notification of the first period during the exercise of the user, a notification of the timing of the grounding time to be the target can be made. Further, according to the notification device related to this application example, in the case of periodically making a notification of the second period during the exercise of the user, a notification of the timing of the flying time to be the target can be made. Further, according to the notification device related to this application example, in the case of periodically making notifications of the first period and the second period during the exercise of the user, notifications of the timing of the grounding time to be the target and the timing of the flying time to be the target can be made.

Application Example 16

In the notification device according to the application example described above, the output section may make the notification using one of a sound and a vibration.

According to the notification device related to this application example, it is possible for the user to recognize the timing of the grounding time to be the target or the timing of the flying time to be the target without using the visual sense during the exercise.

Application Example 17

In the notification device according to the application example described above, the output section may make the notification of the first period using a first notification medium, and makes the notification of the second period using a second notification medium different from the first notification medium.

For example, it is also possible that the first notification medium is a first sound or a first vibration, and the second notification medium is a second sound different from the first sound, or a second vibration different from the first vibration.

According to the notification device related to this application example, it is possible for the user to identify which one of the timing of the grounding time to be the target and the timing of the flying time to be the target is included in the notification based on the difference in notification medium.

Application Example 18

The notification device according to the application example described above may further include a notification mode selection section capable of selecting one of a first mode of making the notification of the first period without making the notification of the second period and a second mode of making the notification of the second period without making the notification of the first period.

According to the notification device related to this application example, it is possible to select either one of the timing of the grounding time to be the target and the timing of the flying time to be the target to make a notification in accordance with the taste of the user.

Application Example 19

In the notification device according to the application example described above, the notification mode selection section may be capable of selecting a third mode of making both of the notification of the first period and the notification of the second period.

According to the notification device related to this application example, it is possible to select either one or both of the timing of the grounding time to be the target and the timing of the flying time to be the target to make a notification in accordance with the taste of the user.

Application Example 20

The notification device according to the application example described above may further include a target value setting section adapted to set the target value of the grounding time and the target value of the flying time based on predetermined information in the exercise of the user.

According to the notification device related to this application example, it is possible to make a notification of the timing of the grounding time to be the target and the flying time while changing the grounding time and the flying time in accordance with the exercise state of the user.

Application Example 21

In the notification device according to the application example described above, the predetermined information may be information of the grounding time.

According to the notification device related to this application example, it is possible to make a notification of the timing of the grounding time to be the target and the flying time to be the target while changing the grounding time and the flying time in accordance with the grounding time in the exercise of the user.

Application Example 22

In the notification device according to the application example described above, the predetermined information may be information of a running pitch.

According to the notification device related to this application example, it is possible to make a notification of the timing of the grounding time to be the target and the flying time to be the target while changing the grounding time and the flying time in accordance with the running pitch in the exercise of the user.

Application Example 23

In the notification device according to the application example described above, the predetermined information may be information of the running speed.

According to the notification device related to this application example, it is possible to make a notification of the timing of the grounding time to be the target and the flying time to be the target while changing the grounding time and the flying time in accordance with the running speed in the exercise of the user.

Application Example 24

In the notification device according to the application example described above, the predetermined information may be information calculated using a detection result of an inertial sensor.

Since the inertial sensors can detect fine motions of the regions of the user wearing the inertial sensors, it is possible to accurately calculate the information related to the exercise of the user using the detection result of the inertial sensors. Therefore, according to the notification device related to this application example, it is possible to more accurately make a notification of the timing of the grounding time to be the target or the timing of the flying time to be the target.

Application Example 25

An exercise analysis system according to this application example includes any one of the notification devices described above, and an exercise analysis device adapted to calculate the predetermined information using the detection result of the inertial sensor.

According to the exercise analysis system related to this application example, it is possible for the notification device to make a more accurate notification of the timing of the grounding time to be the target and the timing of the flying time to be the target while changing the timings in accordance with the information related to the exercise of the user calculated with accuracy by the exercise analysis device using the detection result of the inertial sensors.

Application Example 26

A notification method according to this application example includes periodically making a notification of at least one of a first period corresponding to a target value of a grounding time of a foot of a user, and a second period corresponding to a target value of a flying time of a foot of the user during an exercise of the user.

According to the notification method related to this application example, in the case of periodically making a notification of the first period during the exercise of the user, a notification of the timing of the grounding time to be the target can be made. Further, according to the notification method related to this application example, in the case of periodically making a notification of the second period during the exercise of the user, a notification of the timing of the flying time to be the target can be made. Further, according to the notification method related to this application example, in the case of periodically making notifications of the first period and the second period during the exercise of the user, notifications of the timing of the grounding time to be the target and the timing of the flying time to be the target can be made.

Application Example 27

A notification program according to this application example makes a computer execute a process including periodically making a notification of at least one of a first period corresponding to a target value of a grounding time of a foot of a user, and a second period corresponding to a target value of a flying time of a foot of the user during an exercise of the user.

According to the notification program related to this application example, in the case of performing the control for periodically making a notification of the first period during the exercise of the user, it is possible to make the computer make a notification of the timing of the grounding time to be the target. Further, according to the notification program related to this application example, in the case of performing the control for periodically making a notification of the second period during the exercise of the user, it is possible to make the computer make a notification of the timing of the flying time to be the target. Further, according to the notification program related to this application example, in the case of performing the control for periodically making notifications of the first period and the second period during the exercise of the user, it is possible to make the computer make the notifications of the timing of the grounding time to be the target and the timing of the flying time to be the target.

Application Example 28

An exercise support method according to this application example includes making a notification of the fact that a form of running is in an unstable state in a case in which an amplitude value of a vibration along a vertical direction of a user in running has exceeded a threshold value.

According to the exercise support method related to this application example, it is possible to make a notification of the fact that the form of running is in the unstable state in the case in which an amplitude value of the vibration along a vertical direction of the user in running has exceeded the threshold value. The amplitude of the vibration in the vertical direction represents the wobble of the body of the user in the vertical direction. Therefore, in the case in which, for example, the vibration amplitude is high, it is possible to determine that the form in running is in the unstable state. Further, if the lactate accumulation occurs in a certain region, the running form becomes unstable due to the muscle weakness in that region. Thus, since the running form of the user has become in the unstable state, it is possible to presumptively determine the fact that the lactate accumulation occurs.

Application Example 29

The exercise support method according to the application example described above may further include estimating the form of the user using the amplitude value of the vibration, and it is also possible that the notification includes a recommendation of a form different from the form estimated in the making a notification in the case of the unstable state.

According to the exercise support method related to this application example, it is possible to estimate the form of the user using the amplitude value of the vibration along the vertical direction of the user in running, and then recommend a form different from the form thus estimated in the case in which the running form is in the unstable state. In some cases, by changing the running form, the muscle part in which the lactate accumulation easily occurs can be changed. Therefore, by recommending to run in a different form in the case in which it has been determined that the running form is in the unstable state, namely the lactate accumulation has occurred, it becomes possible to remove or relax the lactate accumulated in the muscle of a specific region.

Application Example 30

The exercise support method according to the application example described above may further include calculating duration of the form estimated in the making a notification, and it is also possible to arrange that the recommendation is made in the case in which the unstable state has been determined, and the duration fulfills a predetermined condition.

According to the exercise support method related to this application example, it is possible to recommend a different form in the case in which it is determined that the running form is in the unstable state, and the duration of the form has fulfilled the predetermined condition. If running in the same form is continued, it becomes easy for the lactate accumulation to occur. Therefore, it is more effective to recommend a different form in the case of continuing running in the same form.

Application Example 31

An exercise support device according to this application example includes a determination section adapted to determine that a form of running is in an unstable state in a case in which an amplitude value of a vibration along a vertical direction of a user in running has exceeded a threshold value, and makes a predetermined notification in the case in which the unstable state has been determined.

According to the exercise support device related to this application example, it is possible to make a notification of the fact that the form of running is in the unstable state in the case in which an amplitude value of the vibration along a vertical direction of the user in running has exceeded the threshold value. The amplitude of the vibration in the vertical direction represents the wobble of the body of the user in the vertical direction. Therefore, in the case in which, for example, the vibration amplitude is high, it is possible to determine that the form in running is in the unstable state. Further, if the lactate accumulation occurs in a certain region, the running form becomes unstable due to the muscle weakness in that region. Thus, since the running form of the user has become in the unstable state, it is possible to presumptively determine the fact that the lactate accumulation occurs.

BRIEF DESCRIPTION OF THE DRAWINGS

The invention will now be described with reference to the accompanying drawings, wherein like numbers reference like elements.

FIG. 20 is a diagram showing a configuration example of a speed-target value table according to the first embodiment.

FIG. 24 is a diagram showing a configuration example of a notification control table according to a second embodiment of the invention.

FIG. 25 is a diagram showing a configuration example of a speed-target value table according to the second embodiment.

FIG. 36 is a diagram showing a data configuration example of a lactate accumulation state setting table.

FIG. 37 is a diagram showing a data configuration example of running form setting data.

DESCRIPTION OF EXEMPLARY EMBODIMENTS

Figure 1:
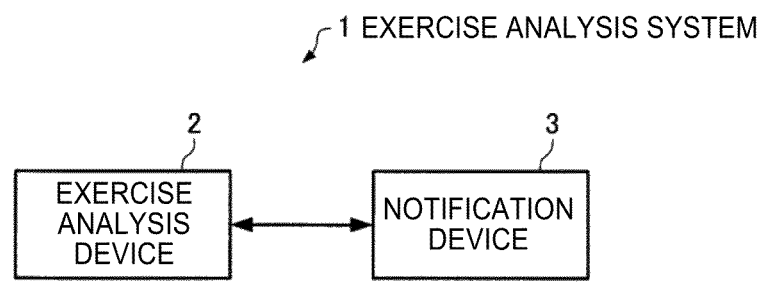
FIG. 1 is a diagram showing a configuration example of an exercise analysis system according to an embodiment of the invention.

A notification device according to the present embodiment includes a difference calculation section for calculating a difference between an index value, which has been calculated by analyzing the exercise of the user using an inertial sensor, and a target value for each of indexes related to the athletic abilities of the user, an index selection section for selecting some of the indexes based on the differences with respect to each of the indexes, and an output section for making a notification of the some indexes thus selected.

The athletic abilities can be, for example, technical abilities or endurance capacities.

According to the notification device related to the present embodiment, by selecting some of the indexes based on the differences between the values of the indexes related to the athletic abilities of the user and the respective target values, it is possible to make a notification of the some indexes out of the indexes based on the respective target values during the exercise of the user.

In the notification device according to the embodiment described above, it is possible for the index selection section to select the indexes larger in the difference than the other indexes as the some indexes.

According to the notification device related to the present embodiment, it is possible to make a notification of the indexes relatively worse out of the indexes based on the respective target values during the exercise of the user. Therefore, it is possible for the user to perform the exercise while recognizing the worse indexes.

In the notification device according to the embodiment described above, it is possible for the index selection section to select the indexes smaller in the difference than the other indexes as the some indexes.

According to the notification device related to the present embodiment, it is possible to make a notification of the indexes relatively better out of the indexes based on the respective target values during the exercise of the user. Therefore, it is possible for the user to perform the exercise while recognizing the better indexes.

It is also possible for the notification device according to the embodiment described above to include a normalization section for normalizing the difference with respect to each of the indexes, and select the some indexes based on the normalized differences with respect to the respective indexes.

According to the notification device related to the present embodiment, it is possible to select some of the indexes under fair conditions to make a notification during the exercise of the user. Therefore, it is possible to reduce the possibility that the notification of specific indexes is apt to be made frequently irrespective of the exercise state of the user.

In the notification device according to the embodiment described above, it is possible for the index selection section to select a predetermined number of indexes having the largest normalized differences.

According to the notification device related to the present embodiment, it is possible to select the predetermined number of indexes larger in the differences from the respective target values under the fair conditions out of the indexes to make a notification during the exercise of the user. Therefore, it is possible for the user to perform the exercise while recognizing the worse indexes larger in the differences from the respective target values.

In the notification device according to the embodiment described above, it is possible for the index selection section to select no indexes in the case in which all of the differences thus normalized are smaller than a threshold value.

According to the notification device related to the present embodiment, it is possible for the user to determine that the exercise state is good if no notification of any indexes is made.

In the notification device according to the embodiment described above, it is possible for the index selection section to select a predetermined number of indexes having the smallest normalized differences.

According to the notification device related to the present embodiment, it is possible to select the predetermined number of indexes smaller in the differences from the respective target values under the fair conditions out of the indexes to make a notification during the exercise of the user. Therefore, it is possible for the user to perform the exercise while recognizing the better indexes smaller in the differences from the respective target values.

In the notification device according to the embodiment described above, it is possible for the index selection section to select no indexes in the case in which all of the differences thus normalized are larger than a threshold value.

According to the notification device related to the present embodiment, it is possible for the user to determine that the exercise state is bad if no notification of any indexes is made.

It is possible for the notification device according to the embodiment described above to include a target value setting section for setting the target value corresponding to the velocity of the user with respect to each of the indexes using correspondence information between the velocity of the user and the respective target values of the indexes.

According to the notification device related to the present embodiment, it is possible to select some of the indexes to make a notification while changing the target values in accordance with the exercise velocity of the user.

In the notification device according to the embodiment described above, the indexes can include at least one of landing-below-COG (center of gravity), propulsive efficiency, flow of leg, a running pitch, and a landing impact.

In the notification device according to the embodiment described above, it is possible for the output section to make the notifications of the some indexes thus selected as respective sounds or vibrations different from each other.

According to the notification device related to the present embodiment, it is possible for the user to recognize which index is included in the notification using the type of the sound or the vibration.

An exercise analysis system according to the present embodiment includes any one of the notification devices described above, and an exercise analysis device for analyzing the exercise of the user using the detection result of the inertial sensors to calculate the values of the respective indexes.

According to the exercise analysis system related to the present embodiment, by the exercise analysis device calculating the values of the respective indexes related to the athletic abilities of the user using the detection result of the inertial sensors, and the notification device selecting some of the indexes based on the differences between the values of the indexes and the respective target values, it is possible to make a notification of the some indexes based on the respective target values during the exercise of the user.

A notification method according to the present embodiment includes a step of calculating a difference between a value, which has been calculated by analyzing the exercise of the user using the detection result of the inertial sensor, and the target value for each of the indexes related to the athletic abilities of the user, a step of selecting some of the indexes based on the differences with respect to the respective indexes, and a step of making a notification of the some indexes thus selected.

According to the notification method related to the present embodiment, by selecting some of the indexes based on the differences between the values of the indexes related to the athletic abilities of the user and the respective target values, it is possible to make a notification of the some indexes out of the indexes based on the respective target values during the exercise of the user.

A program according to the present embodiment makes a computer execute a step of calculating a difference between a value, which has been calculated by analyzing the exercise of the user using the detection result of the inertial sensor, and the target value for each of the indexes related to the athletic abilities of the user, a step of selecting some of the indexes based on the differences with respect to the respective indexes, and a step of performing control for making a notification of the some indexes thus selected.

According to the program related to the present embodiment, by selecting some of the indexes based on the differences between the values of the indexes related to the athletic abilities of the user and the respective target values, it is possible to make a notification of the some indexes out of the indexes based on the respective target values during the exercise of the user.

A notification device according to the present embodiment includes an output section for periodically making a notification of at least one of a first period corresponding to a target value of the grounding time in landing the foot of the user and a second period corresponding to a target value of the flying time during the exercise of the user.

According to the notification device related to the present embodiment, in the case of periodically making a notification of the first period during the exercise of the user, a notification of the timing of the grounding time to be the target can be made. Further, according to the notification device related to the present embodiment, in the case of periodically making a notification of the second period during the exercise of the user, a notification of the timing of the flying time to be the target can be made. Further, according to the notification device related to the present embodiment, in the case of periodically making notifications of the first period and the second period during the exercise of the user, notifications of the timing of the grounding time to be the target and the timing of the flying time to be the target can be made.

In the notification device according to the embodiment described above, it is possible for the output section to make at least one of the notifications of the first period and the second period as a sound or a vibration.

According to the notification device related to the present embodiment, it is possible for the user to recognize the timing of the grounding time to be the target or the timing of the flying time to be the target without using the visual sense during the exercise.

In the notification device according to the embodiment described above, it is also possible for the output section to make a notification of the first period using a first sound or a first vibration, and make a notification of the second period using a second sound different from the first sound or a second vibration different from the first vibration.

According to the notification device related to the present embodiment, it is possible for the user to identify which one of the timing of the grounding time to be the target and the timing of the flying time to be the target is included in the notification based on the type of the sound or the vibration.

It is also possible for the notification device according to the embodiment described above to include a notification mode selection section capable of selecting one of a first mode of making the notification of the first period without making the notification of the second period and a second mode of making the notification of the second period without making the notification of the first period.

According to the notification device related to the present embodiment, it is possible to select either one of the timing of the grounding time to be the target and the timing of the flying time to be the target to make a notification in accordance with the taste of the user.

In the notification device according to the embodiment described above, it is possible for the notification mode selection section to be able to further select a third mode of making a notification of both of the first and second periods.

According to the notification device related to the present embodiment, it is possible to select either one or both of the timing of the grounding time to be the target and the timing of the flying time to be the target to make a notification in accordance with the taste of the user.

It is also possible for the notification device according to the embodiment described above to include a target value setting section for setting the target value of the grounding time and the target value of the flying time based on predetermined information in the exercise of the user.

According to the notification device related to the present embodiment, it is possible to make a notification of the timing of the grounding time to be the target and the flying time to be the target while changing the grounding time and the flying time in accordance with the exercise state of the user.

In the notification device according to the embodiment described above, the predetermined information can be the information of the grounding time.

According to the notification device related to the present embodiment, it is possible to make a notification of the timing of the grounding time to be the target and the flying time to be the target while changing the grounding time and the flying time in accordance with the grounding time in the exercise of the user.

In the notification device according to the embodiment described above, the predetermined information can be the information of the running pitch.

According to the notification device related to the present embodiment, it is possible to make a notification of the timing of the grounding time to be the target and the flying time to be the target while changing the grounding time and the flying time in accordance with the running pitch in the exercise of the user.

In the notification device according to the embodiment described above, the predetermined information can be the information of the running speed.

According to the notification device related to the present embodiment, it is possible to make a notification of the timing of the grounding time to be the target and the flying time to be the target while changing the grounding time and the flying time in accordance with the running speed in the exercise of the user.

In the notification device according to the embodiment described above, the predetermined information can be the information calculated using the detection result of the inertial sensors.

Since the inertial sensors can detect fine motions of the regions of the user wearing the inertial sensors, it is possible to accurately calculate the information related to the exercise of the user using the detection result of the inertial sensors. Therefore, according to the notification device related to the present embodiment, it is possible to more accurately make a notification of the timing of the grounding time to be the target or the timing of the flying time to be the target.

An exercise analysis system according to the present embodiment includes any one of the notification devices described above, and an exercise analysis device for calculating the predetermined information described above using the detection result of the inertial sensors.

According to the exercise analysis system related to the present embodiment, it is possible for the notification device to make a more accurate notification of the timing of the grounding time to be the target and the timing of the flying time to be the target while changing the timings in accordance with the information related to the exercise of the user calculated with accuracy by the exercise analysis device using the detection result of the inertial sensors.

A notification method according to the present embodiment includes a step of periodically making the notification of at least one of the first period corresponding to the target value of the grounding time in landing the foot of the user and the second period corresponding to the target value of the flying time during the exercise of the user.

According to the notification method related to the present embodiment, in the case of periodically making a notification of the first period during the exercise of the user, a notification of the timing of the grounding time to be the target can be made. Further, according to the notification method related to the present embodiment, in the case of periodically making a notification of the second period during the exercise of the user, a notification of the timing of the flying time to be the target can be made. Further, according to the notification method related to the present embodiment, in the case of periodically making notifications of the first period and the second period during the exercise of the user, notifications of the timing of the grounding time to be the target and the timing of the flying time to be the target can be made.

A program according to the present embodiment makes a computer execute a step of performing control for periodically making a notification of at least one of the first period corresponding to the target value of the grounding time and the second period corresponding to the target value of the flying time during the exercise of the user.

According to the program related to the present embodiment, in the case of performing the control for periodically making a notification of the first period during the exercise of the user, it is possible to make the computer make a notification of the timing of the grounding time to be the target. Further, according to the program related to the present embodiment, in the case of performing the control for periodically making a notification of the second period during the exercise of the user, it is possible to make the computer make a notification of the timing of the flying time to be the target. Further, according to the program related to the present embodiment, in the case of performing the control for periodically making notifications of the first period and the second period during the exercise of the user, it is possible to make the computer make the notifications of the timing of the grounding time to be the target and the timing of the flying time to be the target.

An exercise support method according to the present embodiment includes a step of performing notification control of the fact that the running form is in an unstable state in the case in which the detection value of a body motion detecting sensor section attached to the body portion of the user has exceeded a threshold value.

Further, as another embodiment, it is possible to configure an exercise support device provided with a determination section for determining that the running form is in the unstable state in the case in which the detection value has exceeded the threshold value using the detection value of the body motion detecting sensor section attached to the body portion of the user, and a notification control section for performing a predetermined notification control in the case in which the determination of the unstable state has been made.

According to the exercise support method and so on related to the present embodiment, it is possible to make a notification of the fact that the running form is in the unstable state in the case in which the detection value of the body motion detecting sensor section attached to the body portion of the user has exceeded the threshold value. If the lactate accumulation occurs in a certain region, the running form becomes unstable due to the muscle weakness in that region. Thus, since the running form of the user has become in the unstable state, the lactate accumulation is presumptively determined.

It is also possible for the exercise support method according to the embodiment described above to further include a step of calculating an amplitude of the vibration in the vertical direction of the user using the detection value described above, and a step of performing the notification control based on the vibration amplitude.

According to the exercise support method related to the present embodiment, it is possible to calculate the amplitude of the vibration in the vertical direction of the user using the detection value of the body motion detecting sensor, and then make a notification of the fact that the running form is in the unstable state based on the vibration amplitude thus calculated. The amplitude of the vibration in the vertical direction represents the wobble of the body of the user in the vertical direction. Therefore, in the case in which, for example, the vibration amplitude is high, it is possible to determine that the form when running is in the unstable state.

The exercise support method according to the embodiment described above further includes a step of estimating the form of the user using the detection value, and it is also possible for the notification control to include a step of recommending a form different from the form thus estimated in the case of the unstable state.

According to the exercise support method related to the present embodiment, it is possible to estimate the form of the user using the detection value of the body motion detecting sensor, and then recommend a form different from the form thus estimated in the case in which the running form is in the unstable state. In some cases, by changing the running form, the muscle part in which the lactate accumulation easily occurs can be changed. Therefore, by recommending to run in a different form in the case in which it has been determined that the running form is in the unstable state, namely the lactate accumulation has occurred, it becomes possible to remove or relax the lactate accumulated in the muscle of a specific region.

It is also possible that the exercise support method according to the embodiment described above further includes a step of calculating a duration in which the form thus estimated is the same, and in the recommending step, the recommendation is performed in the case in which it is determined that the unstable state has occurred and the duration has fulfilled a predetermined condition.

According to the exercise support method related to the present embodiment, it is possible to recommend a different form in the case in which it is determined that the running form is in the unstable state, and the duration in which the form is the same has fulfilled the predetermined condition. If running in the same form is continued, it becomes easy for the lactate accumulation to occur. Therefore, it is more effective to recommend a different form in the case of continuing running in the same form.

Hereinafter, some preferred embodiments of the invention will be described in detail using the accompanying drawings. It should be noted that the embodiments described below do not unreasonably limit the content of the invention as set forth in the appended claims. Further, all of the constituents described below are not necessarily essential elements of the invention.

1. First Embodiment

1-1. Configuration of Exercise Analysis System

Although the explanation will hereinafter be presented citing an exercise analysis system for analyzing the exercise in running (including walking) of the user as an example, the exercise analysis system according to the first embodiment can also be applied to an exercise analysis system for analyzing an exercise other than running in a similar manner.

Figure 2:
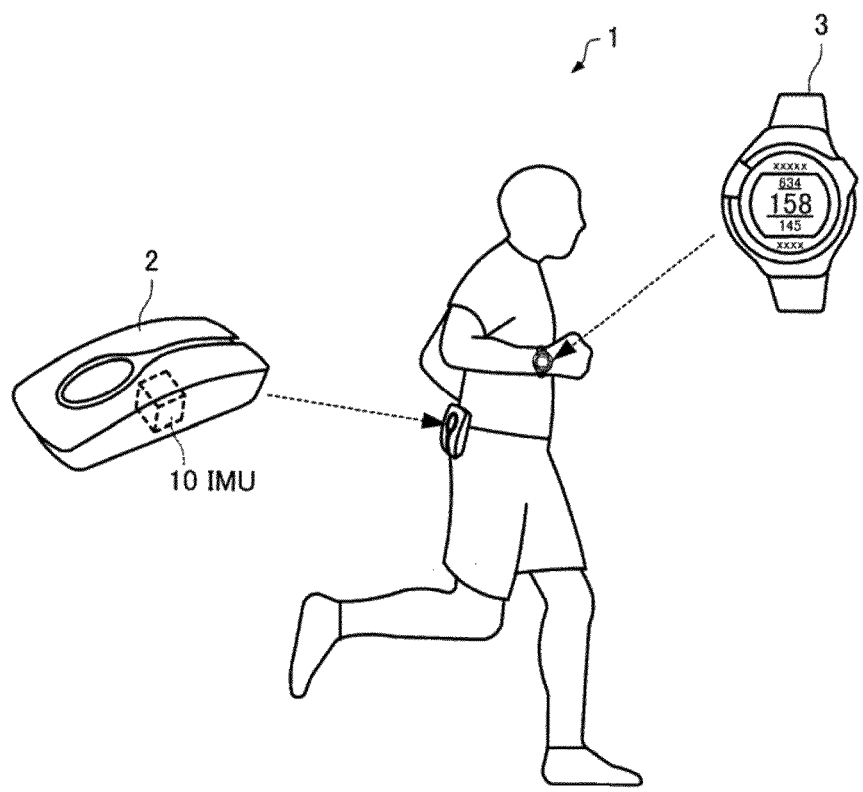
FIG. 2 is an explanatory diagram of a general outline of the exercise analysis system according to the embodiment.

FIG. 1 is a diagram showing a configuration example of the exercise analysis system 1 according to the first embodiment. As shown in FIG. 1, the exercise analysis system 1 according to the first embodiment is configured including an exercise analysis device 2 and a notification device 3. The exercise analysis device 2 is a device for analyzing the exercise during running of the user, and the notification device 3 is a device for notifying the user of information of a state of the exercise during running of the user and a running result. As shown in FIG. 2, in the present embodiment, the exercise analysis device 2 incorporates an inertial measurement unit (IMU) 10, and is attached to the body portion (e.g., right waist, left waist, or central portion of the waist) of the user so that one of the detection axes (hereinafter referred to as a z axis) of the inertial measurement unit (IMU) 10 roughly coincides with a gravitational acceleration direction (vertically downward direction) in the state in which the user is in the rest state. Further, the notification device 3 is a wrist-type (wristwatch-type) portable information apparatus, and is attached to the wrist or the like of the user. It should be noted that the notification device 3 can also be a portable information apparatus such as a head mount display (HMD) or a smartphone.

The user operates the notification device 3 when starting running to instruct start of the measurement (an inertial navigation calculation process and an exercise analysis process described later) by the exercise analysis device 2, and then operates the notification device 3 when stopping running to instruct stop of the measurement by the exercise analysis device 2. The notification device 3 transmits a command for instructing start or stop of the measurement to the exercise analysis device 2 in accordance with the operation by the user.

When the exercise analysis device 2 receives the command of starting the measurement, the exercise analysis device 2 starts the measurement by the inertial measurement unit (IMU) 10, calculates values of a variety of exercise indexes, which are indexes related to a running ability (an example of athletic abilities) of the user using the measurement result, and generates exercise analysis information including the values of the variety of exercise indexes as the information of the analysis result of the running exercise of the user. The exercise analysis device 2 generates information (in-running output information) output during running of the user using the exercise analysis information thus generated, and then transmits the in-running output information to the notification device 3. The notification device 3 receives the in-running output information from the exercise analysis device 2, then calculates the differences between the values of the variety of exercise indexes included in the in-running output information and the respective target values set in advance, then selects some exercise indexes out of the variety of exercise indexes based on the differences with respect to the respective exercise indexes, and then notifies the user of the exercise indexes thus selected with sounds or vibrations. Thus, it is possible for the user to run while recognizing which exercise indexes are worse (or better).

Further, when the exercise analysis device 2 receives the command of stopping the measurement, the exercise analysis device 2 stops the measurement by the inertial measurement unit (IMU) 10, then generates the information (running result information: a running distance, running speed) of the running result of the user, and then transmits the running result information to the notification device 3. The notification device 3 receives the running result information from the exercise analysis device 2, and then notifies the user of the information of the running result as characters or images. Thus, it is possible for the user to recognize the information of the running result immediately after stopping running. Alternatively, it is also possible for the notification device 3 to generate the running result information based on the in-running output information, and then notify the user as the characters or the images.

It should be noted that data communication between the exercise analysis device 2 and the notification device 3 can be wireless communication or wired communication.

1-2. Coordinate Systems

The coordinate systems necessary in the explanation described below will be defined as follows.

e-frame (Earth Centered Earth Fixed frame): a right-handed three-dimensional Cartesian coordinate system taking the center of the Earth as the origin, and having the z axis parallel to the rotational axis.

n-frame (Navigation frame): a three-dimensional Cartesian coordinate system taking a moving object (the user) as the origin, and having an x axis set to the north, a y axis set to the east, and a z axis set to the gravitational direction.

b-frame (Body frame): a three-dimensional Cartesian coordinate system based on the sensor (the inertial measurement unit (IMU) 10).

m-frame (Moving frame): a right-handed three-dimensional Cartesian coordinate system taking a moving object (the user) as the origin, and having an x axis set to the proceeding direction of the moving object (the user).

1-3. Exercise Analysis Device 1-3-1. Configuration of Exercise Analysis Device

Figures 3, 4:
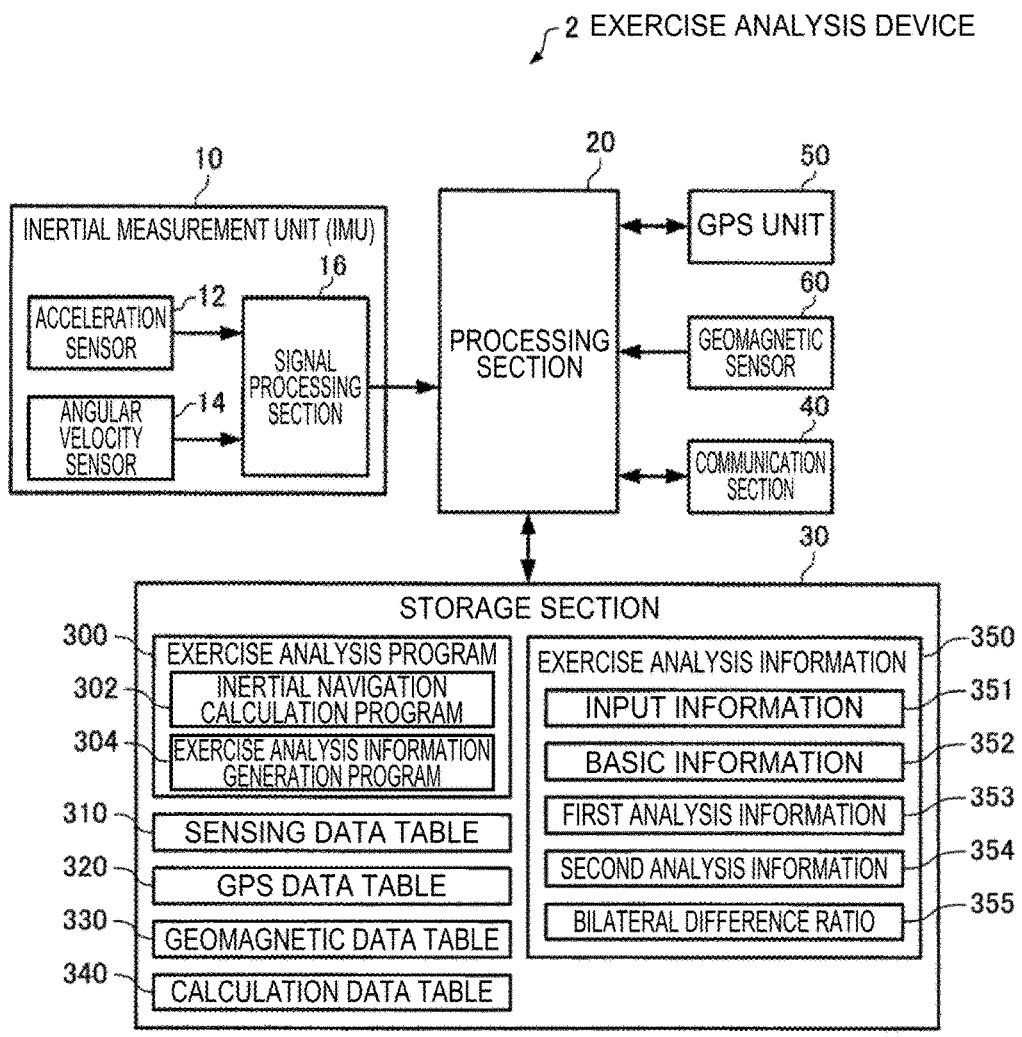
FIG. 3 is a functional block diagram showing a configuration example of an exercise analysis device.
FIG. 4 is a diagram showing a configuration example of a sensing data table.

FIG. 3 is a functional block diagram showing a configuration example of the exercise analysis device 2. As shown in FIG. 3, the exercise analysis device 2 is configured including the inertial measurement unit (IMU) 10, a processing section 20, a storage section 30, a communication section 40, a GPS (global positioning system) unit 50, and a geomagnetic sensor 60. It should be noted that it is also possible for the exercise analysis device 2 according to the present embodiment to have a configuration obtained by eliminating or modifying some of these constituents, or adding other constituents.

The inertial measurement unit 10 (an example of the inertial sensor) is configured including an acceleration sensor 12, an angular velocity sensor 14, and a signal processing section 16.

The acceleration sensor 12 detects the acceleration in each of the three axial directions intersecting with (ideally perpendicular to) each other, and then outputs a digital signal (acceleration data) corresponding to the levels and the directions of the triaxial acceleration thus detected.

The angular velocity sensor 14 detects the angular velocity in each of the three axial directions intersecting with (ideally perpendicular to) each other, and then outputs a digital signal (angular velocity data) corresponding to the levels and the directions of the triaxial angular velocity thus measured.

The signal processing section 16 receives the acceleration data and the angular velocity data respectively from the acceleration sensor 12 and the angular velocity sensor 14, then stores them attached with time information in a storage section not shown, then generates sensing data obtained by fitting the acceleration data, the angular velocity data, and the time information thus stored into a predetermined format, and then outputs the sensing data to the processing section 20.

It is ideal for each of the acceleration sensor 12 and the angular velocity sensor 14 to be attached so that the three axes coincide with the three axes of the sensor coordinate system (the b-frame) based on the inertial measurement unit 10, but in reality, there occurs an error in attachment angle. Therefore, the signal processing section 16 performs a process of converting each of the acceleration data and the angular velocity data into data in the sensor coordinate system (the b-frame) using a correction parameter previously calculated in accordance with the attachment angle error. It should be noted that it is also possible for the processing section 20 described later to perform the conversion process for the signal processing section 16.

Further, it is also possible for the signal processing section 16 to perform a temperature correction process of the acceleration sensor 12 and the angular velocity sensor 14. It should be noted that it is also possible for the processing section 20 described later to perform the temperature correction process for the signal processing section 16, or it is also possible to incorporate the function of the temperature correction in the acceleration sensor 12 and the angular velocity sensor 14.

The acceleration sensor 12 and the angular velocity sensor 14 can also be devices outputting analog signals, and in this case, it is sufficient for the signal processing section 16 to perform A/D conversion on each of the output signal of the acceleration sensor 12 and the output signal of the angular velocity sensor 14 to generate the sensing data.

The GPS unit 50 receives GPS satellite signals transmitted from GPS satellites as a kind of positioning satellites, then performs positioning calculation using the GPS satellite signals to calculate the position and the velocity (a vector including the size and the direction) of the user in the n-frame, and then outputs the GPS data, which is obtained by adding the time information and positioning accuracy information to the position and the velocity, to the processing section 20. It should be noted that since a method of calculating the position and the velocity, and a method of generating the time information using the GPS are known to the public, the detailed explanation will be omitted.

The geomagnetic sensor 60 detects the geomagnetism in each of the three axial directions intersecting with (ideally perpendicular to) each other, and then outputs a digital signal (geomagnetic data) corresponding to the levels and the directions of the triaxial geomagnetism thus detected. It should be noted that the geomagnetic sensor 60 can also be a sensor outputting an analog signal, and in this case, it is also possible for the processing section 20 to perform the A/D conversion on the output signal of the geomagnetic sensor 60 to generate the geomagnetic data.

The communication section 40 is for performing data communication with the communication section 140 (see FIG. 18) of the notification device 3, and performs a process of receiving the command (e.g., the command of starting/stopping the measurement) having been transmitted from the communication section 140 of the notification device 3 and then transmitting the command to the processing section 20, a process of receiving the in-running output information and the running result information having been generated by the processing section 20 and then transmitting the in-running output information and the running result information to the communication section 140 of the notification device 3, and so on.

The processing section 20 is formed of, for example, a central processing unit (CPU), a digital signal processor (DSP), and an application specific integrated circuit (ASIC), and performs a variety of arithmetic processing and control processing in accordance with a variety of programs stored in the storage section 30 (a recording medium). In particular, when the processing section 20 receives the command of starting the measurement from the notification device 3 via the communication section 40, the processing section 20 receives the sensing data, the GPS data, and the geomagnetic data respectively from the inertial measurement unit 10, the GPS unit 50, and the geomagnetic sensor 60, and then calculates the velocity, the position, attitude angles of the body, and so on of the user using the data until the processing section 20 receives the command of stopping the measurement. Further, the processing section 20 performs a variety of arithmetic processing using the information thus calculated to analyze the exercise of the user to thereby generate a variety of types of exercise analysis information described later, and makes the storage section 30 store the variety of types of exercise analysis information. Further, the processing section 20 performs a process of generating the in-running output information and the running result information using the exercise analysis information thus generated, and then transmitting the in-running output information and the running result information to the communication section 40.

The storage section 30 is formed of, for example, a recording medium for storing the programs and the data such as a read only memory (ROM), a flash ROM, a hard disk drive, or a memory card, and a random access memory (RAM) forming a work area of the processing section 20. The storage section 30 (either of the recording media) stores an exercise analysis program 300, which is read out by the processing section 20, and is used for executing the exercise analysis process (see FIG. 14). The exercise analysis program 300 includes an inertial navigation calculation program 302 for executing an inertial navigation calculation process (see FIG. 15), and an exercise analysis information generation program 304 for executing an exercise analysis information generation process (see FIG. 17) as subroutines.

Further, the storage section 30 stores a sensing data table 310, a GPS data table 320, a geomagnetic data table 330, a calculation data table 340, exercise analysis information 350, and so on.

The sensing data table 310 is a data table storing the sensing data (the detection result of the inertial measurement unit 10), which have been received by the processing section 20 from the inertial measurement unit 10, in a time-series manner. FIG. 4 is a diagram showing a configuration example of the sensing data table 310. As shown in FIG. 4, the sensing data table 310 is formed of the sensing data, each of which includes detection time 311 of the inertial measurement unit 10, the acceleration 312 detected by the acceleration sensor 12, and the angular velocity 313 detected by the angular velocity sensor 14 associated with each other, arranged in a time-series manner. When starting the measurement, the processing section 20 adds new sensing data to the sensing data table 310 every time a sampling period Δt (e.g., 20 ms or 10 ms) elapses. Further, the processing section 20 corrects the acceleration and the angular velocity using an acceleration bias and an angular velocity bias estimated by error estimation (described later) using an extended Kalman filter, and then overwrites the acceleration and the angular velocity with corrected ones to update the sensing data table 310.

Figure 5:
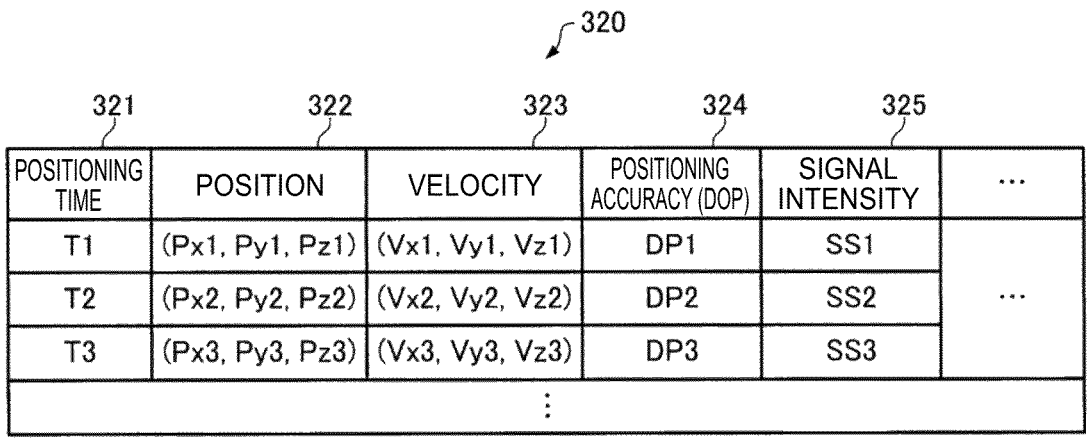
FIG. 5 is a diagram showing a configuration example of a GPS data table.

The GPS data table 320 is a data table storing the GPS data (the detection result of the GPS unit (GPS sensor) 50), which have been received by the processing section 20 from the GPS unit 50, in a time-series manner. FIG. 5 is a diagram showing a configuration example of the GPS data table 320. As shown in FIG. 5, the GPS data table 320 is formed of the GPS data, each of which has time 321 when the GPS unit 50 performs the positioning calculation, a position 322 calculated by the positioning calculation, a velocity 323 calculated by the positioning calculation, the positioning accuracy (dilution of precision (DOP)) 324, the signal intensity 325 of the GPS satellite signal thus received, and so on associated with each other, arranged in a time-series manner. When starting the measurement, the processing section 20 adds new GPS data to thereby update the GPS data table 320 every time the GPS data is obtained (e.g., every second asynchronously with the acquisition timing of the sensing data).

Figure 6:
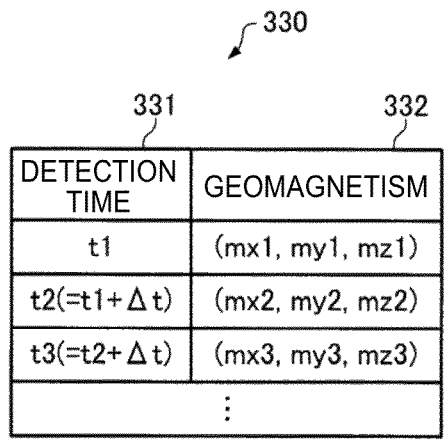
FIG. 6 is a diagram showing a configuration example of a geomagnetic data table.

The geomagnetic data table 330 is a data table storing the geomagnetic data (the detection result of the geomagnetic sensor), which have been received by the processing section 20 from the geomagnetic sensor 60, in a time-series manner. FIG. 6 is a diagram showing a configuration example of the geomagnetic data table 330. As shown in FIG. 6, the geomagnetic data table 330 is formed of the geomagnetic data, each of which has the detection time 331 of the geomagnetic sensor 60 and the geomagnetism 332 detected by the geomagnetic sensor 60 associated with each other, arranged in a time-series manner. When starting the measurement, the processing section 20 adds new geomagnetic data to the geomagnetic data table 330 every time a sampling period Δt (e.g., 10 ms) elapses.

Figure 7:
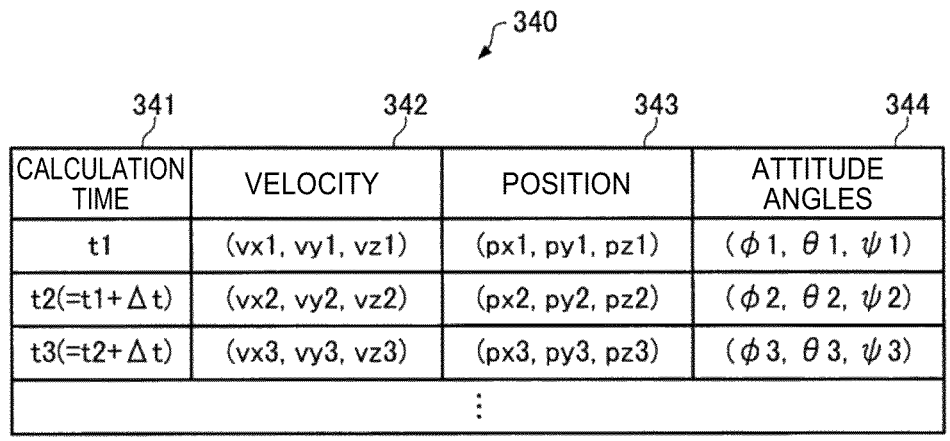
FIG. 7 is a diagram showing a configuration example of a calculation data table.

The calculation data table 340 is a data table storing the velocity, the position, and the attitude angles, which are calculated by the processing section 20 using the sensing data, in a time-series manner. FIG. 7 is a diagram showing a configuration example of the calculation data table 340. As shown in FIG. 7, the calculation data table 340 is formed of the calculation data, each of which has the time 341, the velocity 342, and position 343, and attitude angles 344 calculated by the processing section 20 associated with each other, arranged in a time-series manner. When starting the measurement, the processing section 20 calculates the velocity, the position, and the attitude angles to add new calculation data to the calculation data table 340 every time the sensing data is newly obtained, namely every time the sampling period Δt elapses. Further, the processing section 20 corrects the velocity, the position, and the attitude angles using the velocity error, the position error, and the attitude angle error estimated by the error estimation using the extended Kalman filter, and then overwrites the velocity, the position, and the attitude angles with corrected ones to update the calculation data table 340.

The exercise analysis information 350 is a variety of types of information related to the exercise of the user, and includes items of input information 351, items of basic information 352, items of first analysis information 353, items of second analysis information 354, items of a bilateral difference ratio 355, and so on generated by the processing section 20. The details of these types of information will be described later.

1-3-2. Functional Configuration of Processing Section

Figure 8:
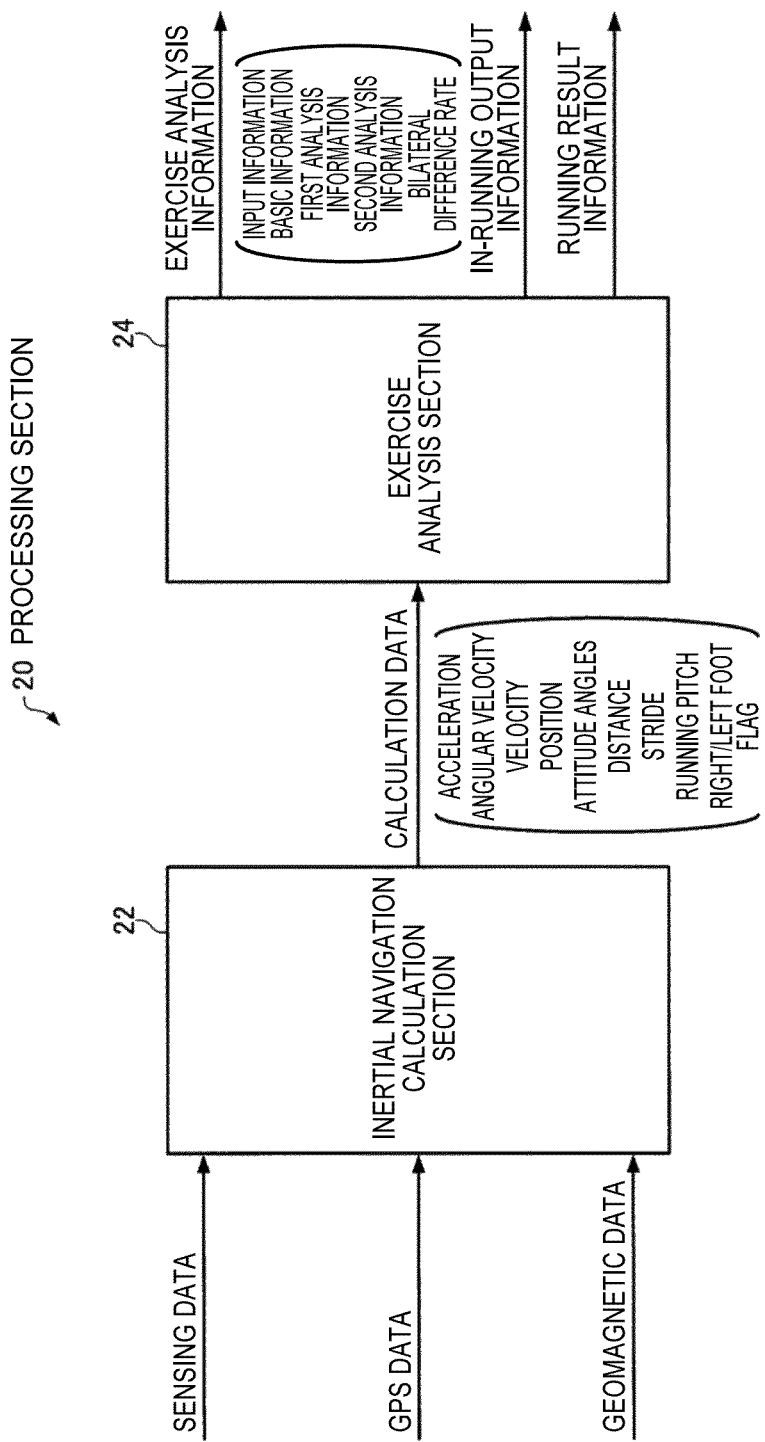
FIG. 8 is a functional block diagram showing a configuration example of a processing section of the exercise analysis device.

FIG. 8 is a functional block diagram showing a configuration example of the processing section 20 of the exercise analysis device 2. In the present embodiment, the processing section 20 executes the exercise analysis program 300 stored in the storage section 30 to thereby function as an inertial navigation calculation section 22 and an exercise analysis section 24. It should be noted that it is also possible for the processing section 20 to receive the exercise analysis program 300 stored in an arbitrary storage device (recording medium) via a network or the like, and then execute the exercise analysis program 300.

The inertial navigation calculation section 22 performs the inertial navigation calculation using the sensing data (the detection result of the inertial measurement unit 10), the GPS data (the detection result of the GPS unit 50), and the geomagnetic data (the detection result of the geomagnetic sensor 60) to calculate the acceleration, the angular velocity, the velocity, the position, the attitude angles, the distance, the stride, and the running pitch, and then outputs calculation data including these calculation results. The calculation data output by the inertial navigation calculation section 22 are stored in the storage section 30 in a time-series order. The details of the inertial navigation calculation section 22 will be described later.

The exercise analysis section 24 analyzes the exercise during running of the user using the calculation data (the calculation data stored in the storage section 30) output by the inertial navigation calculation section 22 to generate the exercise analysis information (e.g., the input information, the basic information, the first analysis information, the second analysis information, and the bilateral difference ratio described later) as the information of the analysis result. The exercise analysis information generated by the exercise analysis section 24 is stored in the storage section 30 in a time-series manner during running of the user.

Further, the exercise analysis section 24 generates the in-running output information as the information output during running of the user (specifically a period from when the inertial measurement unit 10 starts the measurement to when the inertial measurement unit 10 stops the measurement) using the exercise analysis information thus generated. The in-running output information having been generated by the exercise analysis section 24 is transmitted to the notification device 3 via the communication section 40.

Further, the exercise analysis section 24 generates the running result information as the information of the running result when stopping running of the user (specifically when stopping the measurement by the inertial measurement unit 10) using the exercise analysis information generated during running. The running result information having been generated by the exercise analysis section 24 is transmitted to the notification device 3 via the communication section 40.

1-3-3. Functional Configuration of Inertial Navigation Calculation Section

Figure 9:
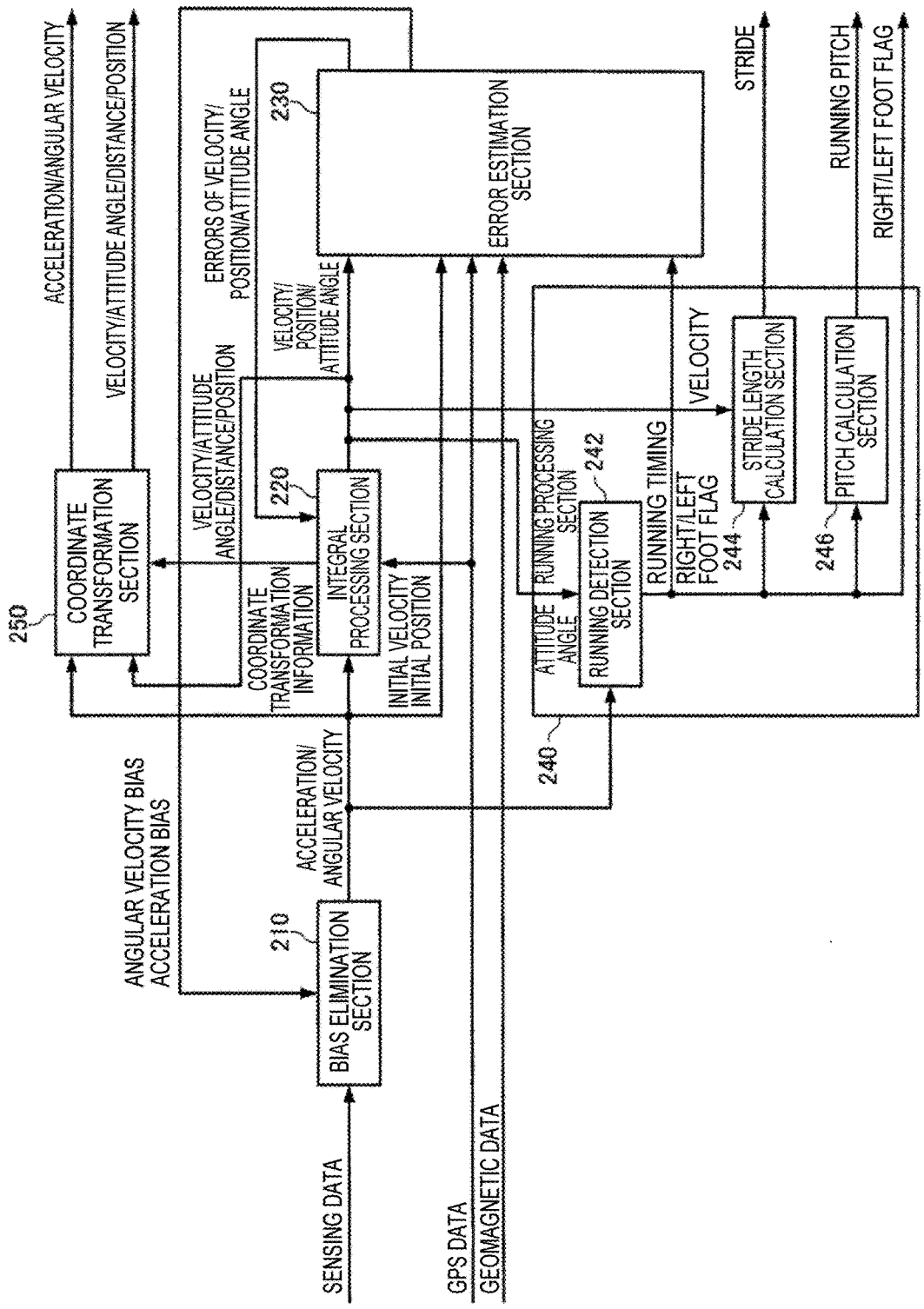
FIG. 9 is a functional block diagram showing a configuration example of an inertial navigation calculation section.

FIG. 9 is a functional block diagram showing a configuration example of the inertial navigation calculation section 22. In the present embodiment, the inertial navigation calculation section 22 includes a bias elimination section 210, an integral processing section 220, an error estimation section 230, a running processing section 240, and a coordinate transformation section 250. It should be noted that it is also possible for the inertial navigation calculation section 22 according to the present embodiment to have a configuration obtained by eliminating or modifying some of these constituents, or adding other constituents.

The bias elimination section 210 performs a process of subtracting the acceleration bias $b_a$ and the angular velocity bias $b_\omega$ estimated by the error estimation section 230 respectively from the triaxial acceleration and the triaxial angular velocity included in the sensing data newly obtained to thereby correct the triaxial acceleration and the triaxial angular velocity. It should be noted that since there is no estimation values of the acceleration bias $b_a$ and the angular velocity bias $b_d$ in the initial state immediately after starting the measurement, the bias elimination section 210 calculates the initial bias using the sensing data from the inertial measurement unit assuming that the initial state of the user is a resting state.

The integral processing section 220 performs a process of calculating the velocity $v^e$, the position $p^e$, and the attitude angles (a roll angle $\phi_{be}$, a pitch angle $\theta_{be}$, and a yaw angle $\psi_{be}$) in the e-frame from the acceleration and the angular velocity corrected by the bias elimination section 210. Specifically, the integral processing section 220 sets the initial velocity to zero assuming that the initial state of the user is the resting state, or calculates the initial velocity from the velocity included in the GPS data, and further calculates the initial position from the position included in the GPS data. Further, the integral processing section 220 identifies the direction of the gravitational acceleration from the triaxial acceleration in the b-frame corrected by the bias elimination section 210 to calculate the initial values of the roll angle $\phi_{be}$ and the pitch angle $\theta_{be}$, and at the same time calculates the initial value of the yaw angle $\psi_{be}$ from the velocity included in the GPS data to thereby obtain the initial attitude angles in the e-frame. In the case in which the GPS data cannot be obtained, the initial value of the yaw angle $\psi_{be}$ is set to, for example, zero. Further, the integral processing section 220 calculates the initial values of a coordinate transformation matrix (a rotation matrix) $C_b^e$ from the b-frame to the e-frame expressed by Formula 1 from the initial attitude angles thus calculated.

Formula 1

$$C_b^e = \begin{bmatrix} \cos\theta_{be} \cdot \cos\varphi_{be} & \cos\theta_{be} \cdot \sin\varphi_{be} & -\sin\theta_{be} \\ \sin\phi_{be} \cdot \sin\theta_{be} \cdot \cos\varphi_{be} - \cos\phi_{be} \cdot \sin\varphi_{be} & \sin\phi_{be} \cdot \sin\theta_{be} \cdot \sin\varphi_{be} + \cos\phi_{be} \cdot \cos\varphi_{be} & \sin\phi_{be} \cdot \cos\theta_{be} \\ \cos\phi_{be} \cdot \sin\theta_{be} \cdot \cos\varphi_{be} + \sin\phi_{be} \cdot \sin\varphi_{be} & \cos\phi_{be} \cdot \sin\theta_{be} \cdot \sin\varphi_{be} - \sin\phi_{be} \cdot \cos\varphi_{be} & \cos\phi_{be} \cdot \cos\theta_{be} \end{bmatrix} \quad (1)$$

Subsequently, the integral processing section 220 integrates (performs a curl operation on) the triaxial angular velocity corrected by the bias elimination section 210 to calculate the coordinate transformation matrix $C_b^e$, and then calculates the attitude angles using Formula 2.

Formula 2

$$\begin{bmatrix} \phi_{be} \\ \theta_{be} \\ \varphi_{be} \end{bmatrix} = \begin{bmatrix} \arctan2(C_b^e(2,3), C_b^e(3,3)) \\ -\arcsin C_b^e(1,3) \\ \arctan2(C_b^e(1,2), C_b^e(1,1)) \end{bmatrix} \quad (2)$$

Further, the integral processing section 220 converts the triaxial acceleration in the b-frame corrected by the bias elimination section 210 into the triaxial acceleration in the e-frame using the coordinate transformation matrix $C_b^e$, and then integrates the triaxial acceleration after eliminating the gravitational acceleration component to thereby calculate the velocity $v^e$ in the e-frame. Further, the integral processing section 220 integrates the velocity $v^e$ in the e-frame to calculate the position $p^e$ in the e-frame.

Further, the integral processing section 220 also performs a process of correcting the velocity $v^e$, the position $p^e$, and the attitude angles using the velocity error $\delta v^e$, the position error $\delta p^e$, and the attitude angle error $\varepsilon^e$ estimated by the error estimation section 230, and a process of calculating the distance by integrating the velocity $v^e$ thus corrected.

Further, the integral processing section 220 also calculates a coordinate transformation matrix $C_b^m$ from the b-frame to the m-frame, and a coordinate transformation matrix $C_e^m$ from the e-frame to the m-frame, and a coordinate transformation matrix $C_e^n$ from the e-frame to the n-frame. These coordinate transformation matrixes are used for a coordinate transformation process of the coordinate transformation section 250 described later as coordinate transformation information.

The error estimation section 230 estimates errors of the indexes representing the state of the user using the velocity, the position, and the attitude angles calculated by the integral processing section 220, the acceleration and the angular velocity corrected by the bias elimination section 210, the GPS data, the geomagnetic data, and so on. In the present embodiment, the error estimation section 230 estimates the errors of the velocity, the attitude angles, the acceleration, the angular velocity, and the position using the extended Kalman filter. Specifically, the error estimation section 230 uses the error (the velocity error) $\delta v^e$ of the velocity $v^e$ calculated by the integral processing section 220, the error (the attitude angle error) $\varepsilon^e$ of the attitude angles calculated by the integral processing section 220, the acceleration bias $b_a$, the angular velocity bias $b_\omega$, and the error (the position error) $\delta p^e$ of the position $p^e$ calculated by the integral processing section 220 as the state variables of the extended Kalman filter to define the state vector X as Formula 3.

Formula 3

$$X = \begin{bmatrix} \delta v^e \\ \varepsilon^e \\ b_a \\ b_\omega \\ \delta p^e \end{bmatrix}. \quad (3)$$

The error estimation section 230 uses a prediction formula of the extended Kalman filter to predict the state variables included in the state vector X. The prediction formula of the extended Kalman filter is expressed as Formula 4. In Formula 4, the matrix $\Phi$ is a matrix for associating the previous state vector X and the present state vector X with each other, and some of the elements are designed to momentarily vary while reflecting the attitude angles, the position, and so on. Further, Q represents a matrix representing process noise, wherein each of the elements is set to an appropriate value in advance. Further, P represents an error covariance matrix of the state variables.

Formula 4

$$X = \Phi X$$

$$P = \Phi P \Phi^T + Q \quad (4)$$

Further, the error estimation section 230 uses an update formula of the extended Kalman filter to update (correct) the state variables thus predicted. The update formula of the extended Kalman filter is expressed as Formula 5. Z and H represent an observation vector and an observation matrix, respectively, and Formula 5 expresses the fact that the state vector X is corrected using a difference between the actual observation vector Z and the vector HX predicted from the state vector X. R represents the covariance matrix of the observation error, and can be a constant value determined in advance, or can also be varied dynamically. K represents a Kalman gain, and the smaller the covariance matrix R is, the higher the Kalman gain K becomes. According to Formula 5, the higher the Kalman gain K is (the smaller the covariance matrix R is), the larger the correction amount of the state vector X becomes, and the error covariance matrix P decreases accordingly.

Formula 5

$$K = PH^T(HPH^T + R)^{-1}$$

$$X = X + K(Z - HX)$$

$$P = (I - KH)P \quad (5)$$

As the method of the error estimation (an estimation method of the state vector X), the following can be cited for example.

Error Estimation Method Using Correction Based on Attitude Angle Error

Figure 10:
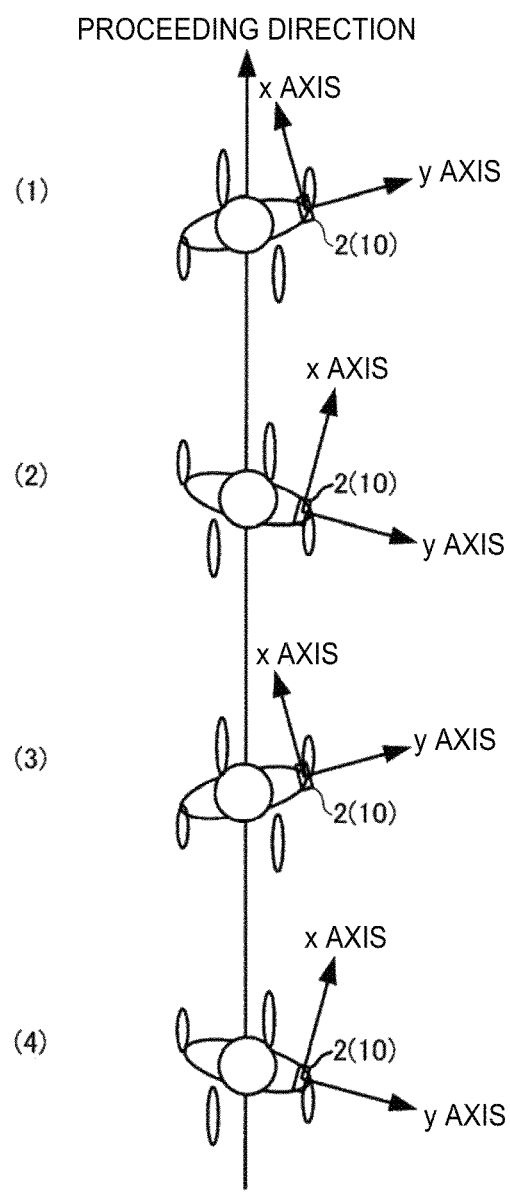
FIG. 10 is an explanatory diagram of an attitude of the user when running.
Figure 11:
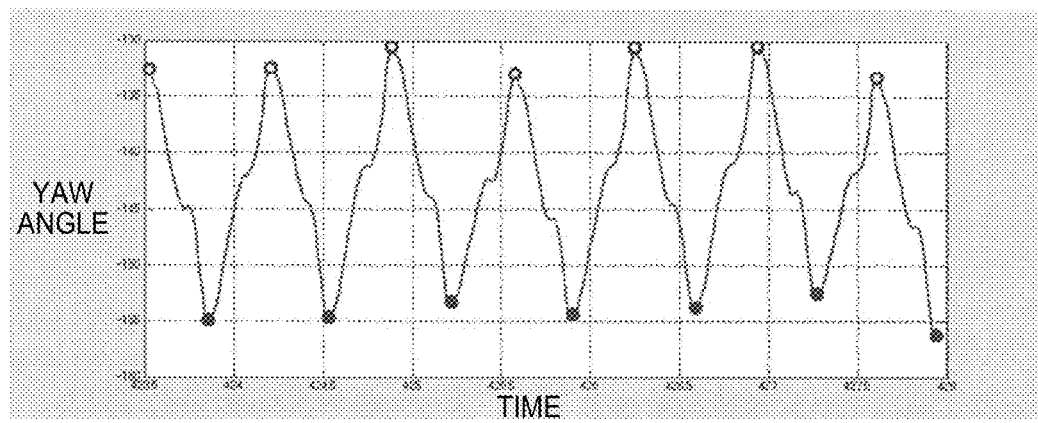
FIG. 11 is an explanatory diagram of a yaw angle of the user when running.

FIG. 10 is a diagram of looking down at the translation of the user in the case in which the user wearing the exercise analysis device 2 on the right waist makes a running action (straight ahead). Further, FIG. 11 is a diagram showing an example of the yaw angle (an azimuth angle) calculated from the detection result of the inertial measurement unit 10 in the case in which the user makes the running action (straight ahead), wherein the horizontal axis represents time, and the vertical angle represents the yaw angle (the azimuth angle).

Due to the running action of the user, the attitude of the inertial measurement unit 10 with respect to the user changes occasionally. In the state in which the user steps out with the left foot, the inertial measurement unit 10 takes an attitude tilted leftward with respect to the proceeding direction (the x axis in the m-frame) as shown in the part (1) and the part (3) of FIG. 10. In contrast, in the state in which the user steps out with the right foot, the inertial measurement unit 10 takes an attitude tilted rightward with respect to the proceeding direction (the x axis in the m-frame) as shown in the part (2) and the part (4) of FIG. 10. In other words, it results that the attitude of the inertial measurement unit 10 periodically changes every two steps, namely one step each with the left and right feet, due to the running action of the user. In FIG. 11, for example, the yaw angle takes local maximum values (marks ○ in FIG. 11) in the state of stepping out with the right foot, and takes local minimum values (marks ● in FIG. 11) in the state of stepping out with the left foot. Therefore, it is possible to estimate the error assuming that the previous (two steps ago) attitude angle and the present attitude angle are equal to each other, and the previous attitude angle is a true attitude. In this method, the observation vector Z in Formula 5 is a difference between the previous attitude angle and the present attitude angle calculated by the integral processing section 220, and using Formula 5 as the update formula, the state vector X is corrected based on the difference between the attitude angle error $\varepsilon^e$ and the observation value to estimate the error.

Error Estimation Method Using Correction Based on Angular Velocity Bias

In this method, the error is estimated assuming that the previous (two steps ago) attitude angle and the present attitude angle are equal to each other, but it is not required for the previous attitude angle to be the true attitude. In this method, the observation vector Z in Formula 5 is an angular velocity bias calculated from the previous attitude angle and the present attitude angle calculated by the integral processing section 220, and using Formula 5 as the update formula, the state vector X is corrected based on the difference between the angular velocity bias $b_\omega$ and the observation value to estimate the error.

Error Estimation Method Using Correction Based on Azimuth Angle Error

In this method, the error is estimated assuming that the previous (two steps ago) yaw angle (the azimuth angle) and the present yaw angle (the azimuth angle) are equal to each other, and the previous yaw angle (the azimuth angle) is a true yaw angle (azimuth angle). In this method, the observation vector Z is a difference between the previous yaw angle and the present yaw angle calculated by the integral processing section 220, and using Formula 5 as the update formula, the state vector X is corrected based on the difference between an azimuth angle error $\varepsilon_z^e$ and the observation value to estimate the error.

Error Estimation Method Using Correction Based on Stoppage

In this method, the error is estimated assuming that the velocity is zero during a stoppage. In this method, the observation vector Z is a difference between the velocity $v^e$ calculated by the integral processing section 220 and zero, and using Formula 5 as the update formula, the state vector X is corrected based on the velocity error $\delta v^e$ to estimate the error.

Error Estimation Method Using Correction Based on Rest

In this method, the error is estimated assuming that the velocity is zero and an attitude change is zero during rest. In this method, the observation vector Z corresponds to the error of the velocity $v^e$ calculated by the integral processing section 220 and the difference between the previous attitude angle and the present attitude angle calculated by the integral processing section 220, and using Formula 5 as the update formula, the state vector X is corrected based on the velocity error $\delta v^e$ and the attitude angle error $\varepsilon^e$ to estimate the error.

Error Estimation Method Using Correction Based on Observation Value of GPS

In this method, the error is estimated assuming that the velocity $v^e$, the position $p^e$, of the yaw angle $\psi_{be}$ calculated by the integral processing section 220 and the velocity, the position, or the azimuth angle (the velocity, the position, or the azimuth angle transformed to the e-frame) calculated from the GPS data are equal to each other, respectively. In this method, the observation vector Z is a difference between the velocity, the position, or the yaw angle calculated by the integral processing section 220 and the velocity, the position, or the azimuth angle calculated from the GPS data, respectively, and using Formula 5 as the update formula, the state vector X is corrected based on the difference between the velocity error $\delta v^e$, the position error $\delta p^e$, or the azimuth angle error $\varepsilon_z^e$ and the observation value to estimate the error.

Error Estimation Method Using Correction Based on Observation Value of Geomagnetic Sensor In this method, the error is estimated assuming that the yaw angle $\psi_{be}$ calculated by the integral processing section 220 and the azimuth angle (the azimuth angle transformed to the e-frame) calculated from the geomagnetic data are equal to each other. In this method, the observation vector Z is a difference between the yaw angle calculated by the integral processing section 220 and the azimuth angle calculated from the geomagnetic data, and using Formula 5 as the update formula, the state vector X is corrected based on the difference between the azimuth angle error $\varepsilon_z^e$ and the observation value to estimate the error.

Figure 12:
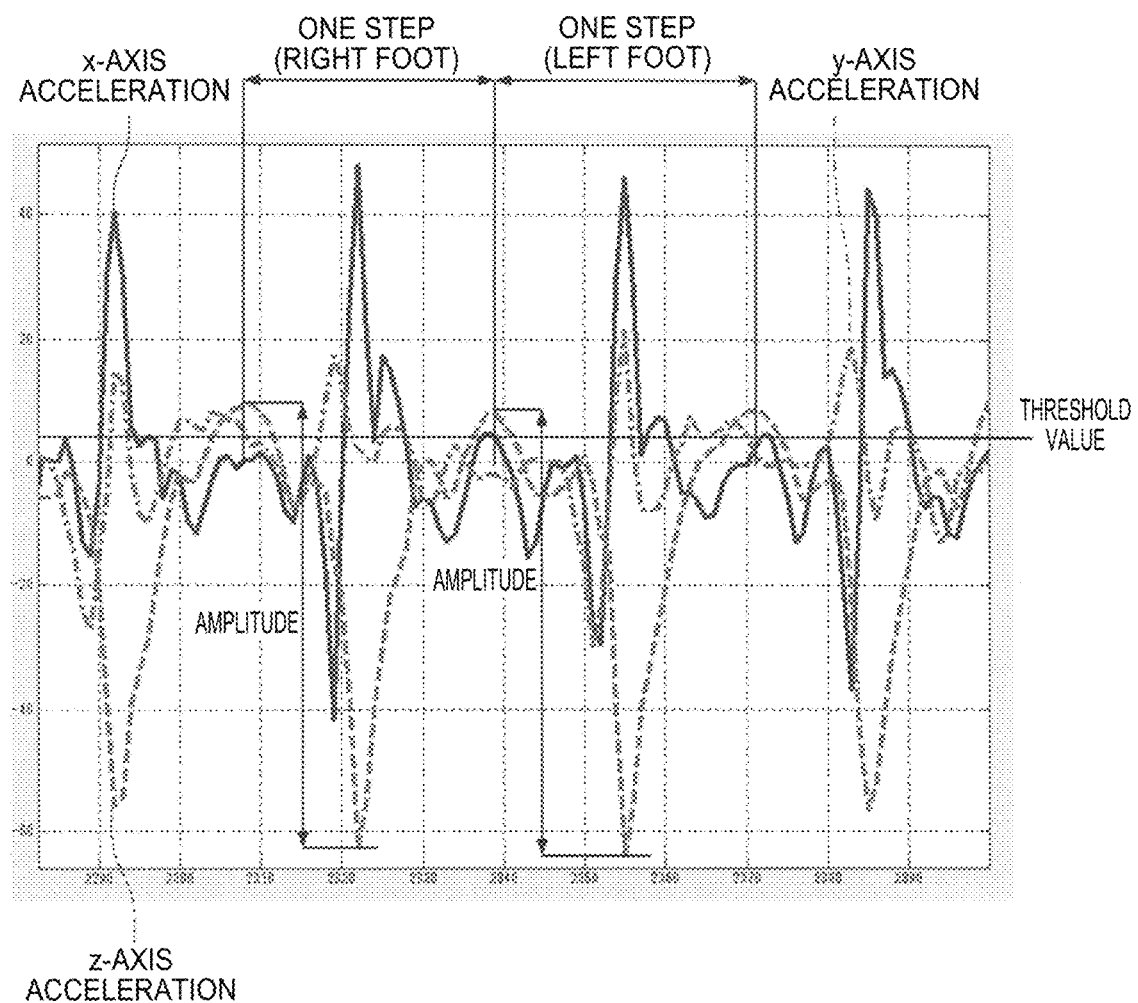
FIG. 12 is a diagram showing an example of triaxial acceleration of the user when running.

Going back to FIG. 9, the running processing section 240 includes a running detection section 242, a stride length calculation section 244, and a pitch calculation section 246. The running detection section 242 performs a process of detecting a running period (running timing) of the user using the detection result (specifically, sensing data corrected by the bias elimination section 210) of the inertial measurement unit 10. As explained with respect to FIGS. 10 and 11, since the attitude of the user periodically (every two steps (one step each with the left and right feet)) changes during running of the user, the acceleration detected by the inertial measurement unit 10 also changes periodically. FIG. 12 is a diagram showing an example of the triaxial acceleration detected by the inertial measurement unit 10 during running of the user. In FIG. 12, the horizontal axis represents time, and the vertical axis represents an acceleration value. It is understood that as shown in FIG. 12, the triaxial acceleration changes periodically, and in particular, the z-axis (the axis in the gravitational direction) acceleration regularly changes with periodicity. The z-axis acceleration reflects the acceleration of an up-and-down motion of the user, and a period from when the z-axis acceleration takes a local maximum value equal to or higher than a predetermined threshold value to the next time the z-axis acceleration takes the local maximum value equal to or higher than the predetermined threshold value corresponds to the period of one step.

Therefore, in the present embodiment, the running detection section 242 detects the running period every time the z-axis acceleration (corresponding to the acceleration of the up-and-down motion of the user) detected by the inertial measurement unit 10 takes the local maximum value equal to or higher than the predetermined threshold value. Specifically, the running detection section 242 outputs a timing signal representing the fact that the running period has been detected every time the z-axis acceleration takes the local maximum value equal to or higher than the predetermined threshold value. In reality, since the triaxial acceleration detected by the inertial measurement unit 10 includes a high-frequency noise component, the running detection section 242 detects the running period using the z-axis acceleration, which has been made to pass through a low-pass filter to remove the noise.

Further, the running detection section 242 determines whether the running period thus detected is the left running period or the right running period to output a right/left foot flag (e.g., set to an ON state in the case of the right foot, and set to an OFF state in the case of the left foot) representing which one of the right and left running period has been detected. For example, since the yaw angle takes the local maximum values (the marks ○ in FIG. 11) in the state of stepping out with the right feet, and the yaw angle takes the local minimum values (the marks ● in FIG. 11) as shown in FIG. 11, it is possible for the running detection section 242 to determine which one of the right and left running periods has been detected using the attitude angles (in particular the yaw angle) calculated by the integral processing section 220. Further, as shown in FIG. 10, when viewed from the top of the head of the user, the inertial measurement unit 10 rotates clockwise in a period in which the user, which is in the state of stepping out with the left foot (the state of the part (1) or the part (3) in FIG. 10), reaches the state of stepping out with the right foot (the state of the part (2) or the part (4) in FIG. 10), and in contrast, rotates counterclockwise in a period in which the user, which is in the state of stepping out with the right foot, reaches the state of stepping out with the left foot. Therefore, for example, it is also possible for the running detection section 242 to determine which one of the right and left running periods has been detected based on the polarity of the z-axis acceleration. In this case, since the triaxial acceleration detected by the inertial measurement unit 10 includes a high-frequency noise component, the running detection section 242 determines which one of the right and left running periods has been detected using the z-axis acceleration, which has been made to pass through the low-pass filter to remove the noise.

The stride length calculation section 244 calculates the stride length of each of right and left strides using the timing signal of the running period and the right/left foot flag output by the running detection section 242 and the velocity or the position calculated by the integral processing section 220, and then performs the process of outputting the result as the right and left strides. Specifically, the stride length calculation section 244 integrates the velocity every sampling period Δt (or calculates a difference between the position at the start of the running period and the position at the start of the subsequent running period) during the period from the start of the running period to the start of the subsequent running period to calculate the stride length, and then outputs the stride length as the stride.

The pitch calculation section 246 performs a process of calculating the number of steps in one minute using the timing signal of the running period output by the running detection section 242, and then outputting the result as the running pitch. Specifically, the pitch calculation section 246 calculates, for example, the number of steps per second by calculating the reciprocal of the running period, and then multiplies result by 60 to obtain the number of steps per minute (the running pitch).

The coordinate transformation section 250 performs the coordinate transformation process of transforming the triaxial acceleration and the triaxial angular velocity in the b-frame corrected by the bias elimination section 210 respectively to the triaxial acceleration and the triaxial angular velocity in the m-frame using the coordinate transformation information (the coordinate transformation matrix $C_b^m$ from the b-frame to the m-frame calculated by the integral processing section 220. Further, the coordinate transformation section 250 performs the coordinate transformation process of transforming the velocities in the three axis directions, the attitude angles around the three axes, and the distances in the three axis directions in the e-frame calculated by the integral processing section 220 respectively to the velocities in the three axis directions, the attitude angles around the three axes, and the distances in the three axis directions in the m-frame using the coordinate transformation information (the coordinate transformation matrix $C_e^m$) from the e-frame to the m-frame calculated by the integral processing section 220. Further, the coordinate transformation section 250 performs the coordinate transformation process for transforming the position in the e-frame calculated by the integral processing section 220 to the position in the n-frame using the coordinate transformation information (the coordinate transformation matrix $C_e^n$) from the e-frame to the n-frame calculated by the integral processing section 220.

Further, the inertial navigation calculation section 22 outputs (stores in the storage section 30) the calculation data including information such as the acceleration, the angular velocity, the velocity, the position, the attitude angles, and the distance, on which the coordinate transformation section 250 has performed the coordinate transformation, and the strides, the running pitches, and the right/left foot flag calculated by the running processing section 240.

1-3-4. Functional Configuration of Exercise Analysis Section

Figure 13:
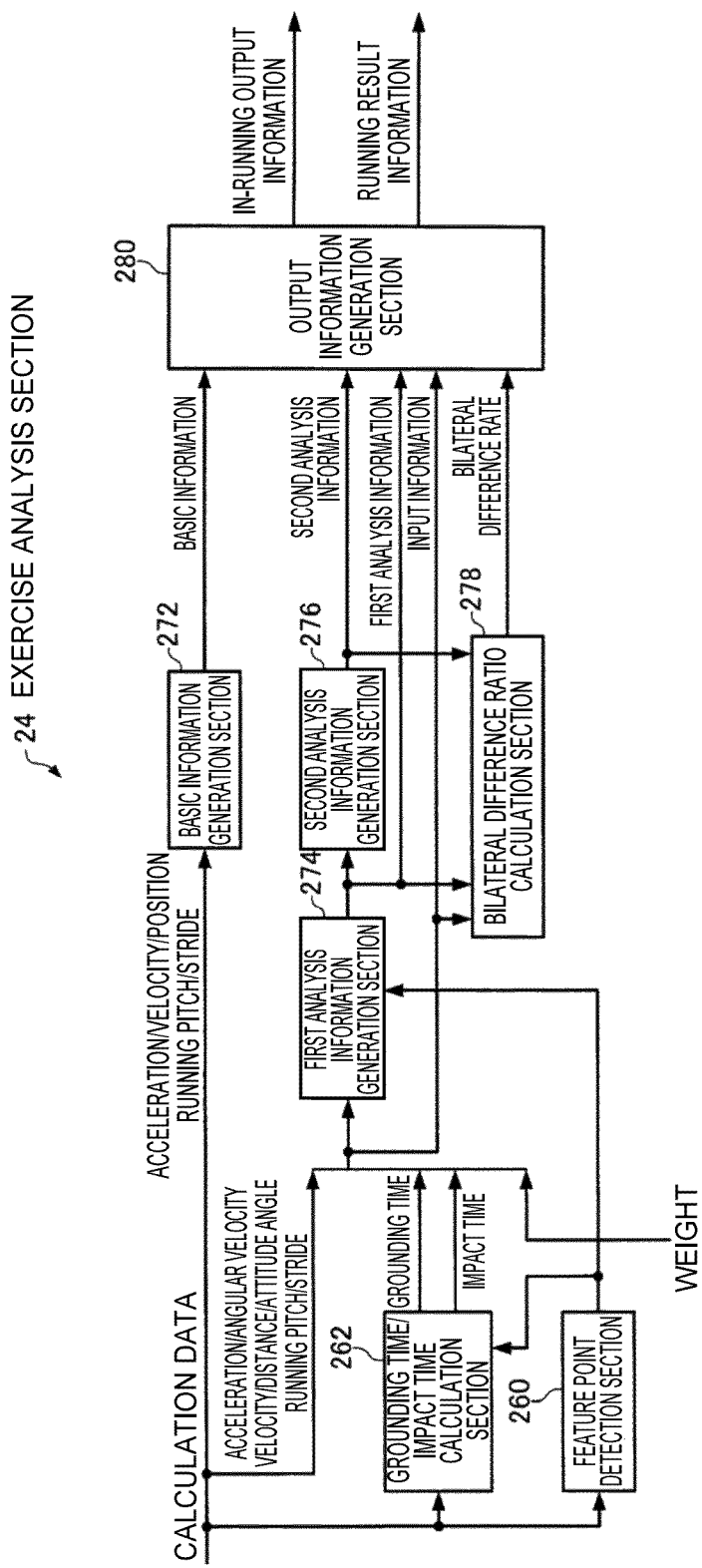
FIG. 13 is a functional block diagram showing a configuration example of an exercise analysis section.

FIG. 13 is a functional block diagram showing a configuration example of the exercise analysis section 24. In the present embodiment, the exercise analysis section 24 includes a feature point detection section 260, a grounding time/impact time calculation section 262, a basic information generation section 272, a first analysis information generation section 274, a second analysis information generation section 276, a bilateral difference ratio calculation section 278, and an output information generation section 280. It should be noted that it is also possible for the exercise analysis section 24 according to the present embodiment to have a configuration obtained by eliminating or modifying some of these constituents, or adding other constituents.

The feature point detection section 260 performs a process of detecting feature points in the running exercise of the user using the calculation data. The feature points in the running exercise of the user are, for example, landing (which can arbitrarily be set to when a part of the sole lands on the ground, when the entire sole lands on the ground, an arbitrary time point in a period from when the heel lands on the ground to when the toe is separated from the ground, an arbitrary time point in a period from when the toe lands on the ground to when the heel is separated from the ground, a period during which the entire sole has contact with the ground, and so on), treading-in (the state in which the largest part of the weight is born by the foot), separation from the ground (which is also referred to as kicking, and can arbitrarily be set to when a part of the sole is separated from the ground, when the entire sole is separated from the ground, an arbitrary time point in a period from when the heel lands on the ground to when the toe is separated from the ground, an arbitrary time point in a period from when the toe lands on the ground to when the toe is separated from the ground, and so on), and so on. Specifically, the feature point detection section 260 detects the feature points in the running period of the right foot and the feature points in the running period of the left foot separately from each other using the right/left foot flag included in the calculation data. For example, it is possible for the feature point detection section 260 to detect the landing at the timing when vertical acceleration (the detection value along the z axis of the acceleration sensor) changes from a positive value to a negative value, detect the treading-in at the time point when proceeding direction acceleration has a peak on and after the vertical acceleration has a peak in the negative direction after the landing, and then detect the separation from the ground (the kicking) at the time point when the vertical acceleration changes from a negative value to a positive value.

The grounding time/impact time calculation section 262 performs a process of calculating the values of the grounding time and the impact time based on the timing when the feature point detection section 260 has detected the feature points using the calculation data. Specifically, the grounding time/impact time calculation section 262 determines whether the present calculation data is the calculation data of the running period of the right foot or the calculation data of the running period of the left foot based on the right/left foot flag included in the calculation data, and then calculates the values of the grounding time and the impact time separately for the running period of the right foot and the running period of the left foot based on the time point when the feature point detection section 260 has detected the feature points. The details of the definitions, calculation methods, and so on of the grounding time and the impact time will be described later.

The basic information generation section 272 performs a process of generating basic information related to the exercise of the user using the information of the acceleration, the velocity, the position, the stride, and the running pitch included in the calculation data. Here, the basic information includes items of the running pitch, the stride, the running speed, the altitude, a running distance, and running time (lap time). Specifically, the basic information generation section 272 outputs the running pitch and the stride included in the calculation data as the running pitch and the stride of the basic information, respectively. Further, the basic information generation section 272 calculates the current values, average values during running, and so on of the running speed, the altitude, the running distance, and the running time (lap time) using some or all of the acceleration, the velocity, the position, the running pitch, and the stride included in the calculation data.

The first analysis information generation section 274 performs a process of analyzing the exercise of the user based on the timing when the feature point detection section 260 has detected the feature points using the input information to generate the first analysis information.

Here, the input information includes the items of the proceeding direction acceleration, proceeding direction velocity, a proceeding direction distance, the vertical acceleration, vertical velocity, a vertical distance, horizontal acceleration, horizontal velocity, a horizontal distance, the attitude angles (the roll angle, the pitch angle, and the yaw angle), the angular velocities (in the roll direction, the pitch direction, and the yaw direction), the running pitch, the stride, the grounding time, the impact time, and the weight. The weight is input by the user, the grounding time and the impact time are calculated by the grounding time/impact time calculation section 262, and the rest of the items are included in the calculation data.

Further, the first analysis information includes items of brake amounts at landing (a first brake amount at landing, a second brake amount at landing), landing-below-COG ratios (a first landing-below-COG ratio, a second landing-below-COG ratio, a third landing-below-COG ratio), propulsion (first propulsion, second propulsion), propulsive efficiency (first propulsive efficiency, second propulsive efficiency, third propulsive efficiency, fourth propulsive efficiency), energy consumption, a landing impact, running ability, a forward tilt angle, a timing coincidence degree, and the flow of leg. The items of the first analysis information are items representing the running state of the user. The details of the definitions and calculation methods of the items of the first analysis information will be described later.

Further, the first analysis information generation section 274 calculates the values of the respective items of the first analysis information separately for the right and left regions of the body of the user. Specifically, the first analysis information generation section 274 calculates the items included in the first analysis information separately for the running period of the right foot and the running period of the left foot in accordance with whether the feature point detection section 260 has detected the feature points in the running period of the right foot or the feature points in the running period of the left foot. Further, the first analysis information generation section 274 calculates an average value or a total value of the right and left running periods with respect to each of the items included in the first analysis information.

The second analysis information generation section 276 performs a process of generating the second analysis information using the first analysis information generated by the first analysis information generation section 274. Here, the second analysis information includes items of an energy loss, energy efficiency, and a load on the body. The details of the definitions and calculation methods of the items of the second analysis information will be described later. The second analysis information generation section 276 calculates the values of the items of the second analysis information separately for the running period of the right foot and the running period of the left foot. Further, the second analysis information generation section 276 calculates an average value or a total value of the right and left running periods with respect to each of the items included in the second analysis information.

The bilateral difference ratio calculation section 278 performs a process of calculating the bilateral difference ratio as an index representing the balance between the right and left regions of the body of the user using the value in the running period of the right foot and the value in the running period of the left foot with respect to each of the running pitch, the stride, the grounding time, and the impact time included in the input information, all of the items of the first analysis information, and all of the items of the second analysis information. The details of the definition and calculation method of the bilateral difference ratio will be described later.

The output information generation section 280 performs a process of generating the in-running output information as information output during running of the user using the basic information, the input information, the first analysis information, the second analysis information, the bilateral difference ratio, and so on. The "running pitch," the "stride," the "grounding time," and the "impact time" included in the input information, all of the items of the first analysis information, all of the items of the second analysis information, and the bilateral difference ratio are exercise indexes used for the evaluation of the running technique of the user, and the in-running output information includes the information of some or all of the values of these exercise indexes. The exercise indexes included in the in-running output information can be determined in advance, or can also be arranged to be able to be selected by the user operating the notification device 3. Further, the in-running output information can also include some or all of the running speed, the altitude, the running distance, and the running time (the lap time) included in the basic information.

Further, the output information generation section 280 generates the running result information as information of the running result of the user using the basic information, the input information, the first analysis information, the second analysis information, the bilateral difference ratio, and so on. For example, it is also possible for the output information generation section 280 to generate the running result information including information of the average values of the respective exercise indexes during running of the user (during the measurement by the inertial measurement unit 10). Further, the running result information can also include some or all of the running speed, the altitude, the running distance, and the running time (the lap time).

The output information generation section 280 transmits the in-running output information to the notification device 3 during running of the user via the communication section 40, and then transmits the running result information to the notification device 3 at the end of running of the user.

1-3-5. Input Information

The items of the input information will hereinafter be explained in detail.

Proceeding Direction Acceleration, Vertical Direction Acceleration, and Horizontal Direction Acceleration The "proceeding direction" is a proceeding direction (the x-axis direction in the m-frame) of the user, the "vertical direction" is a vertical direction (the z-axis direction in the m-frame), and the "horizontal direction" is a direction (the y-axis direction in the m-frame) perpendicular to both of the proceeding direction and the vertical direction. The proceeding direction acceleration, the vertical acceleration, and the horizontal acceleration are the acceleration in the x-axis direction in the m-frame, the acceleration in the z-axis direction, and the acceleration in the y-axis direction, respectively, and are calculated by the coordinate transformation section 250.

Proceeding Direction Velocity, Vertical Direction Velocity, and Horizontal Direction Velocity The proceeding direction velocity, the vertical velocity, and the horizontal velocity are the velocity in the x-axis direction in the m-frame, the velocity in the z-axis direction, and the velocity in the y-axis direction, respectively, and are calculated by the coordinate transformation section 250. Alternatively, it is also possible to calculate the proceeding direction velocity, the vertical velocity, and the horizontal velocity by respectively integrating the proceeding direction acceleration, the vertical acceleration, and the horizontal acceleration.

Angular Velocities (in Roll Direction, Pitch Direction, and Yaw Direction)

The angular velocity in the roll direction, the angular velocity in the pitch direction, and the angular velocity in the yaw direction are the angular velocity around the x-axis, the angular velocity around the y-axis, and the angular velocity around the z-axis, respectively, in the m-frame and are calculated by the coordinate transformation section 250.

Attitude Angles (Roll Angle, Pitch Angle, and Yaw Angle)

The roll angle, the pitch angle, and the yaw angle are the attitude angle around the x-axis, the attitude angle around the y-axis, and the attitude angle around the z-axis, respectively, in the m-frame output by the coordinate transformation section 250, and are calculated by the coordinate transformation section 250. Alternately, it is also possible to calculate the roll angle, the pitch angle, and the yaw angle by integrating (performing a curl operation on) the angular velocity in the roll direction, the angular velocity in the pitch direction, and the angular velocity in the yaw direction.

Proceeding Direction Distance, Vertical Direction Distance, and Horizontal Direction Distance The proceeding direction distance, the vertical distance, and the horizontal distance are the moving distance in the x-axis direction, the moving distance in the z-axis direction, and the moving distance in the y-axis direction, respectively, in the m-frame from a desired position (e.g., a position of the user immediately before starting running), and are calculated by the coordinate transformation section 250.

Running Pitch

The running pitch is an exercise index defined as the number of steps per minute, and is calculated by the pitch calculation section 246. Alternatively, it is also possible to calculate the running pitch by dividing the proceeding direction distance per minute by the stride.

Stride

The stride is an exercise index defined as the stride length of one step, and is calculated by the stride length calculation section 244. Alternatively, it is also possible to calculate the stride by dividing the proceeding direction distance per minute by the running pitch.

Grounding Time

The grounding time is an exercise index defined as the time taken from the landing to the separation from the ground (kicking), and is calculated by the grounding time/impact time calculation section 262. The separation from the ground (kicking) is a moment when the toe is separated from the ground. It should be noted that the grounding time is highly correlated with the running speed, and can therefore be used as the running ability in the first analysis information.

Impact Time

The impact time is an exercise index defined as the time during which the impact generated by the landing is applied to the body, and is calculated by the grounding time/impact time calculation section 262. The impact time can be calculated as follows.

(impact time)=(time point at which the proceeding direction acceleration is the minimum in one step)−(time point of landing)

Weight

The weight is the weight of the user, and the numerical value of the weight is input by the user operating the operation section 150 (see FIG. 18) before running.

1-3-6. First Analysis Information

The details of the items of the first analysis information calculated by the first analysis information generation section 274 will hereinafter be explained.

First Brake Amount at Landing

The first brake amount at landing is an exercise index defined as the velocity amount decreased by landing, and can be calculated as follows.

(first brake amount at landing)=(proceeding direction velocity before landing)−(the lowest proceeding direction velocity)

The velocity in the proceeding direction drops due to landing, and the lowest point of the proceeding direction velocity after landing in one step corresponds to the lowest proceeding direction velocity.

Second Brake Amount at Landing

The second brake amount at landing is an exercise index defined as the lowest negative acceleration amount in the proceeding direction generated by landing, and coincides with the lowest proceeding direction acceleration in one step. The lowest point of the proceeding direction acceleration after landing in one step corresponds to the lowest proceeding direction acceleration.

First Landing-Below-COG Ratio

The first landing-below-COG ratio is an exercise index representing whether or not landing below the center of gravity can be achieved. If it becomes possible to land below the center of gravity of the body, the brake amount at landing decreases, and it becomes possible to run efficiently. Since the brake amount normally increases in accordance with the velocity, the brake amount alone is not sufficient as the index. However, since the first landing-below-COG ratio is an index, which can be expressed as a ratio, according to the first landing-below-COG ratio, the same evaluation can be realized even if the velocity changes. By defining $\alpha$ as follows using the proceeding direction acceleration (negative acceleration) and the vertical acceleration at landing, the first landing-below-COG ratio can be calculated as follows.

$\alpha$=arctan((proceeding direction acceleration at landing)/(vertical acceleration at landing))

(first landing-below-COG ratio)=cos $\alpha$×100(%)

Alternatively, it is also possible to calculate an ideal angle $\alpha'$ using data of a plurality of people fast in running to calculate the first landing-below-COG ratio as follows.

(first landing-below-COG ratio)={1−|($\alpha'$−$\alpha$)/$\alpha'$|}×100 (%)

Second Landing-Below-COG Ratio

The second landing-below-COG ratio is an exercise index expressing whether or not the landing below the center of gravity of the body is achieved using a degree of the velocity drop at landing, and is calculated as follows.

(second landing-below-COG ratio)=((the lowest proceeding direction velocity after landing)/(proceeding direction velocity immediately before landing))×100(%)

Third Landing-Below-COG Ratio

The third landing-below-COG ratio is an exercise index expressing whether or not the landing below the center of gravity of the body is achieved using the distance or the time from the landing to when the foot reaches a point below the center of gravity of the body. The third landing-below-COG ratio can be calculated either of the following formulas.

(third landing-below-COG ratio)=(proceeding direction distance when the foot reaches a point below the center of gravity of the body)−(proceeding direction distance at landing)

(third landing-below-COG ratio)=(time point when the foot reaches a point below the center of gravity of the body)−(time point at landing)

After the landing (a point where the vertical acceleration changes from a positive value to a negative value), there exists the timing when the vertical acceleration has a peak in the negative direction, and the timing can be determined as the timing (the time point) when the foot reaches a point below the center of gravity of the body.

It should be noted that besides the above, the third landing-below-COG ratio can also be defined as follows.

(third landing-below-COG ratio)=arctan((distance from the landing position to the point of the foot below the center of gravity of the body)/ (height of the waist))

Alternatively, the third landing-below-COG ratio can also be defined as the following formula (the proportion of the distance from the landing to the point reached by the foot below the center of gravity of the body to the moving distance in a period during which the foot is grounded).

(third landing-below-COG ratio)=(1−(distance from the landing to the point of the foot below the center of gravity of the body)/(moving distance from the landing to the kicking))×100(%)

Alternatively, the third landing-below-COG ratio can also be defined as the following formula (the proportion of the time from the landing to when the foot has reached a point below the center of gravity of the body to the moving time in the period during which the foot is grounded).

(third landing-below-COG ratio)=(1−(time from the landing to when the foot reaches a point below the center of gravity of the body)/(moving time from the landing to the kicking))×100(%)

First Propulsion

The first propulsion is an exercise index defined as a velocity amount increasing in the proceeding direction by kicking the ground, and can be calculated as follows.

(first propulsion)=(the highest proceeding direction velocity after kicking)−(the lowest proceeding direction velocity before kicking)

Second Propulsion

The second propulsion is an exercise index defined as the highest positive acceleration in the proceeding direction generated by kicking, and coincides with the highest proceeding direction acceleration after kicking in one step.

First Propulsive Efficiency

The first propulsive efficiency is an exercise index representing whether or not the kicking force is efficiently used as the propulsion. If ineffective vertical motions and ineffective horizontal motions are eliminated, it becomes possible to run efficiently. Since the vertical motions and the horizontal motions normally increase in accordance with the velocity, the vertical motions and the horizontal motions alone are not sufficient as the index. However, since the first propulsive efficiency is an index, which can be expressed as a ratio, according to the first propulsive efficiency, the same evaluation can be realized even if the velocity changes. The first propulsive efficiency is calculated with respect to each of the vertical direction and the horizontal direction. By defining a value γ as follows using the vertical acceleration and the proceeding direction acceleration at kicking, the first propulsive efficiency in the vertical direction can be calculated as follows.

γ=arctan((vertical acceleration at kicking)/(proceeding direction acceleration at kicking))

(first propulsive efficiency in the vertical direction)
=cos γ×100(%)

Alternatively, it is also possible to calculate an ideal angle γ' using data of a plurality of people fast in running to calculate the first propulsive efficiency in the vertical direction as follows.

(first propulsive efficiency in the vertical direction)
={1−|(γ'−γ)/γ'|}×100(%)

Similarly, by defining a value δ as follows using the horizontal acceleration and the proceeding direction acceleration at kicking, the first propulsive efficiency in the horizontal direction can be calculated as follows.

δ=arctan((horizontal acceleration at kicking)/(proceeding direction acceleration at kicking))

(first propulsive efficiency in the horizontal direction)=cos δ×100(%)

Alternatively, it is also possible to calculate an ideal angle δ' using data of a plurality of people fast in running to calculate the first propulsive efficiency in the horizontal direction as follows.

(first propulsive efficiency in the horizontal direction)={1−|(δ'−δ)/δ'|}×100(%)

It should be noted that besides the above, it is also possible to replace the value γ with arctan((vertical velocity at kicking)/(velocity in the proceeding direction at kicking)) to calculate the first propulsive efficiency in the vertical direction. Similarly, it is also possible to replace the value S with arctan((horizontal velocity at kicking)/(velocity in the proceeding direction at kicking)) to calculate the first propulsive efficiency in the horizontal direction.

Second Propulsive Efficiency

The second propulsive efficiency is an exercise index expressing whether or not the kicking force is efficiently used as the propulsion using an angle of the acceleration at treading-in. By defining 4 as follows using the vertical acceleration and the proceeding direction acceleration at treading-in, the second propulsive efficiency in the vertical direction can be calculated as follows.

ξ=arctan((vertical acceleration at treading-in)/(proceeding direction acceleration at treading-in))

(second propulsive efficiency in the vertical direction)=cos ξ×100(%)

Alternatively, it is also possible to calculate an ideal angle ξ' using data of a plurality of people fast in running to calculate the second propulsive efficiency in the vertical direction as follows.

(second propulsive efficiency in the vertical direction)={2−|(ξ'−ξ)/ξ'|}×100(%)

Similarly, by defining η as follows using the horizontal acceleration and the proceeding direction acceleration at treading-in, the second propulsive efficiency in the horizontal direction can be calculated as follows.

η=arctan((horizontal acceleration at treading-in)/(proceeding direction acceleration at treading-in))(second propulsive efficiency in the horizontal direction)=cos η×100(%)

Alternatively, it is also possible to calculate an ideal angle η' using data of a plurality of people fast in running to calculate the second propulsive efficiency in the horizontal direction as follows.

(second propulsive efficiency in the horizontal direction)={1−|(η'−η)/η'|}×100(%)

It should be noted that besides the above, it is also possible to replace the value ξ with arctan((vertical velocity at treading-in)/(velocity in the proceeding direction at treading-in)) to calculate the second propulsive efficiency in the vertical direction. Similarly, it is also possible to replace the value η with arctan((horizontal velocity at treading-in)/(velocity in the proceeding direction at treading-in)) to calculate the second propulsive efficiency in the horizontal direction.

Third Propulsive Efficiency

The third propulsive efficiency is an exercise index expressing whether or not the kicking force is efficiently used as the propulsion using an angle of jumping-out. Assuming the highest mark (a half of the amplitude of the vertical distance) in the vertical direction in one step as H, and the proceeding direction distance from kicking to landing as X, the third propulsive efficiency can be calculated as Formula 6.

Formula 6

$$\text{(third propulsive efficiency)} = \arcsin\left(\sqrt{\frac{16H^2}{X^2 + 16H^2}}\right) \tag{6}$$

Fourth Propulsive Efficiency

The fourth propulsive efficiency is an exercise index expressing whether or not the kicking force is efficiently used as the propulsion using the proportion of the energy used for proceeding in the proceeding direction to the total energy generated in one step, and can be calculated as follows.

(fourth propulsive efficiency)=((energy used for proceeding in the proceeding direction)/(energy used for one step))×100(%)

The energy is a sum of the potential energy and the kinetic energy.

Energy Consumption

The energy consumption is an exercise index defined as an energy amount consumed for taking one step forward, and also represents a value obtained by accumulating the energy amount consumed for taking one step forward during the running period. The energy consumption can be calculated as follows.

(energy consumption)=(energy consumption in the vertical direction)+(energy consumption in the proceeding direction)+(energy consumption in the horizontal direction)

Here, the energy consumption in the vertical direction is calculated as follows.

(energy consumption in the vertical direction)=
(weight)×(gravity)×(vertical distance)

Further, the energy consumption in the proceeding direction is calculated as follows.

(energy consumption in the proceeding direction)=
[(weight)×{(the highest proceeding direction velocity after kicking)$^2$−(the lowest proceeding direction velocity after landing)$^2$}/2]

Further, the energy consumption in the horizontal direction is calculated as follows.

(energy consumption in the horizontal direction)=
[(weight)×{(the highest horizontal velocity after kicking)$^2$−(the lowest horizontal velocity after landing)$^2$}/2]

Landing Impact

The landing impact is an exercise index representing how much impact is applied to the body due to the landing, and is calculated as follows.

(landing impact)=(impact force in the vertical direction)+(impact force in the proceeding direction)+(impact force in the horizontal direction)

Here, the impact force in the vertical direction is calculated as follows.

(impact force in the vertical direction)=(weight)×(vertical velocity at landing)/(impact time)

Further, the impact force in the proceeding direction is calculated as follows.

(impact force in the proceeding direction)=(weight)×{(proceeding direction velocity before landing)−(the lowest proceeding direction velocity after landing)}/(impact time)

Further, the impact force in the horizontal direction is calculated as follows.

(impact force in the horizontal direction)=(weight)×{(horizontal velocity before landing)−(the lowest horizontal velocity after landing)}/(impact time)

Running Ability

The running ability is an exercise index representing the performance of running of the user. For example, it has been known that the ratio between the stride and the grounding time is correlated with the record (time) of running ("Grounding Time, Separation-From-Ground Time in 100 m Racing" Journal of Research and Development for Future Athletics 3(1), pp. 1-4, 2004), and is calculated as follows.

(running ability)=((stride)/(grounding time))

Forward Tilt Angle

The forward tilt angle is an exercise index representing how much the body of the user is tilted with respect to the ground. The forward tilt angle is set to 0 degree in the state in which the user is standing vertically with respect to the ground, takes a positive value when the user stoops, and takes a negative value when the user bends the body backward. The forward tilt angle can be obtained by converting the pitch angle in the m-frame to fulfill the specification described above. Since there is a possibility that the tilt has already occurred when the exercise analysis device 2 (the inertial measurement unit 10) is attached to the user, it is also possible to assume that the rest state corresponds to 0 degree shown in the left drawing, and to calculate the forward tilt angle using the variation from the rest state.

Timing Coincidence Degree

The timing coincidence degree is an exercise index representing how close the timing of the feature point of the user is to the good timing. For example, it is possible to adopt the exercise index representing how close the timing of waist rotation is to the kicking timing. In the running method with the leg flowing, when one of the legs is landed, the other of the legs still remains behind the body. Therefore, in the case in which the waist rotation timing comes after kicking, it is possible to determine that it is the running method in which the leg is flowing. It can be said that the running method is good if the rotation timing of the waist and the kicking timing roughly coincide with each other. It can be said that the running method with the leg flowing appears if the rotation timing of the waist is behind the kicking timing.

Flow of Legs

The flow of leg is an exercise index representing how far the leg, which has been kicked, is located behind at the time point when the leg subsequently lands. The flow of leg is calculated as, for example, an angle of the femur of the posterior leg at landing. For example, it is possible to estimate the angle of the femur of the posterior leg at landing from an index, which is correlated with the flow of leg, and has been calculated, using a correlation formula obtained in advance.

The index correlated with the flow of leg is calculated as, for example, (time at which the waist has rotated as far as possible in the yaw direction)−(time of landing). The time at which "the waist has rotated as far as possible in the yaw direction" corresponds to the starting point of the action of the subsequent step. In the case in which the period from landing to the subsequent action is long, it can be said that it takes time to pull the leg back, and there occurs the phenomenon that the leg is flowing.

Alternatively, the index correlated with the flow of leg is calculated as (yaw angle at which the waist has rotated as far as possible in the yaw direction)−(yaw angle at landing). In the case in which the variation in yaw angle is large in the period from landing to the subsequent action, the action of pulling the leg back exists after landing, which appears in the variation of the yaw angle. Therefore, there occurs the phenomenon that the leg is flowing.

Alternatively, it is also possible to adopt the pitch angle at landing as the index correlated with the flow of leg. In the case in which the leg is located at a high position behind the body, the body (the waist) is tilted forward. Therefore, the pitch angle of the sensor attached to the waist increases. When the pitch angle is large at landing, there occurs the phenomenon that the leg is flowing.

1-3-7. Second Analysis Information

The details of the items of the second analysis information calculated by the second analysis information generation section 276 will hereinafter be explained.

Energy Loss

The energy loss is an exercise index representing an energy amount wasted out of the energy amount consumed for taking one step forward, and also represents the value obtained by accumulating the energy amount wasted out of the energy amount consumed for taking one step forward during the running period. The energy loss is calculated as follows.

(energy loss)={(energy consumption)×(100−(landing-below-COG ratio)}×(100−(propulsive efficiency))}

Here, the landing-below-COG ratio is either one of the first through third landing-below-COG ratios, and the propulsive efficiency is one of the first through fourth propulsive efficiencies.

Energy Efficiency

The energy efficiency is an exercise index representing whether or not the energy consumed for taking one step forward is efficiently used as the energy for proceeding in the proceeding direction, and also represents the value obtained by accumulating the energy efficiency during the running period. The energy efficiency is calculated as follows.

(energy efficiency)={(energy consumption)−(energy loss)}/(energy consumption)

Load on Body

The load on the body is an exercise index obtained by accumulating the landing impact, and representing how much impact is accumulated in the body. Since an injury is caused by the accumulation of the impact, how easily an injury is caused can be determined by evaluating the load on the body. The load on the body is calculated as follows.

(load on the body)=(load on the right leg)+(load on the left leg)

The load on the right leg can be calculated by accumulating the landing impact on the right leg. The load on the left leg can be calculated by accumulating the landing impact on the left leg. Here, both of the accumulation during running and the backward accumulation are performed.

1-3-8. Bilateral Difference Ratio (Balance Between Both Sides)

The bilateral difference ratio is an exercise index representing how much difference is observed between the right and left regions of the body with respect to each of the running pitch, the stride, the grounding time, the impact time, the items of the first analysis information, and the items of the second analysis information, and is assumed to represent how different the left leg is from the right leg. The bilateral difference ratio is calculated as follows.

(bilateral difference ratio)=(numerical value of the left leg)/(numerical value of the right leg)×100 (%)

The numerical value denotes either one of the running pitch, the stride, the grounding time, the impact time, the brake amount, the propulsion, the landing-below-COG ratio, the propulsive efficiency, the velocity, the acceleration, the moving distance, the forward tilt angle, the flow of leg, the rotation angle of the waist, rotational angular velocity of the waist, a horizontal tilt amount, the impact time, the running ability, the energy consumption, the energy loss, the energy efficiency, the landing impact, and the load on body. Further, the bilateral difference ratio includes the average value and the dispersion of each of the numerical values.

1-3-9. Procedure of Process

Figure 14:
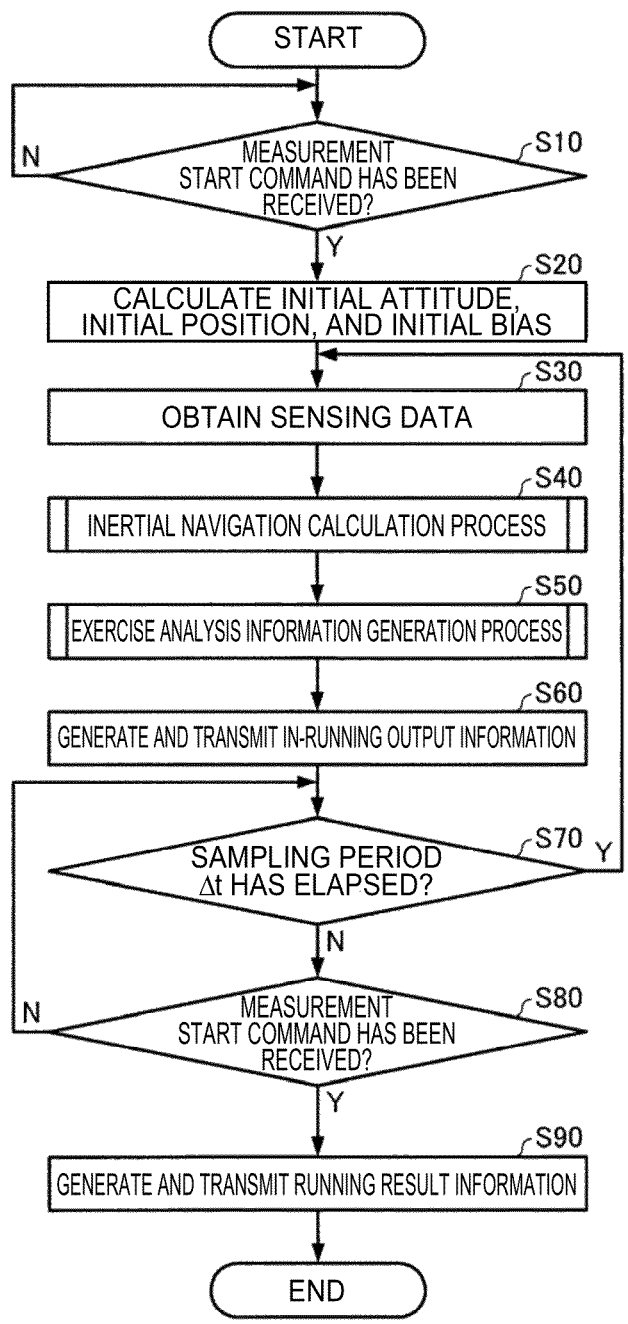
FIG. 14 is a flowchart showing an example of a procedure of an exercise analysis process.

FIG. 14 is a flowchart showing an example of a procedure of the exercise analysis process performed by the processing section 20. The processing section 20 executes the exercise analysis program 300 stored in the storage section 30 to thereby execute the exercise analysis process under the procedure of, for example, the flowchart shown in FIG. 14.

As shown in FIG. 14, the processing section 20 waits (N in S10) until the command of starting the measurement is received, and in the case in which the command of starting the measurement has been received (Y in S10), the processing section 20 firstly calculates (S20) an initial attitude, an initial position, and an initial bias using the sensing data and the GPS data measured by the inertial measurement unit 10 assuming that the user is in the rest state.

Then, the processing section 20 obtains (S30) the sensing data from the inertial measurement unit 10, and then adds the sensing data thus obtained to the sensing data table 310.

Then, the processing section 20 performs the inertial navigation calculation process (S40) to generate the calculation data including a variety of types of information. An example of the procedure of the inertial navigation calculation process will be described later.

Then, the processing section 20 performs the exercise analysis information generation process (S50) using the calculation data generated in S40 to generate the exercise analysis information. An example of the procedure of the exercise analysis information generation process will be described later.

Then, the processing section 20 generates the in-running output information using the exercise analysis information generated in S40 to transmit (S60) the in-running output information to the notification device 3.

Then, the processing section 20 repeats the process corresponding to S30 and the subsequent steps every time the sampling period Δt elapses after obtaining the sensing data last time (Y in S70) until the command of stopping the measurement is received (N in S70 and N in S80).

When the processing section 20 has received the command of stopping the measurement (Y in S80), the processing section 20 generates the running result information using the exercise analysis information generated in S50 to transmit (S90) the running result information to the notification device 3, and then terminates the exercise analysis process.

Figure 15:
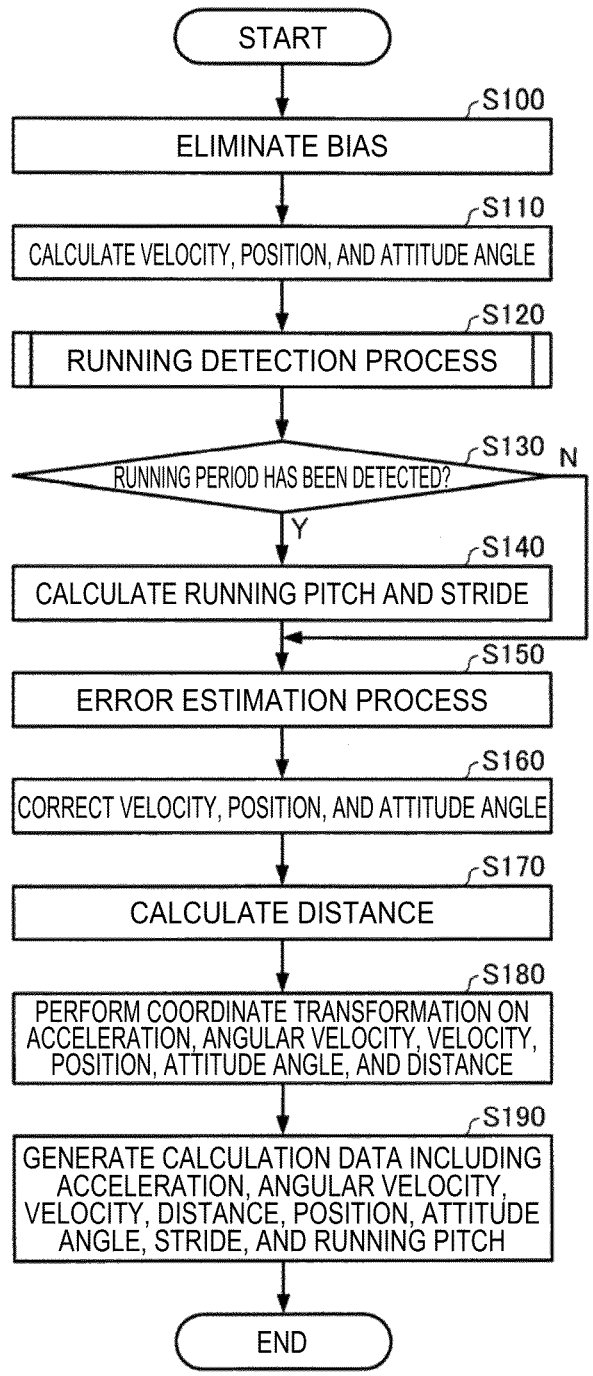
FIG. 15 is a flowchart showing an example of a procedure of an inertial navigation calculation process.

FIG. 15 is a flowchart showing an example of a procedure of the inertial navigation calculation process (the process of S40 shown in FIG. 14). The processing section 20 (the inertial navigation calculation section 22) executes the inertial navigation calculation program 302 stored in the storage section 30 to thereby execute the inertial navigation calculation process under the procedure of, for example, the flowchart shown in FIG. 15.

As shown in FIG. 15, the processing section 20 firstly eliminates (S100) the bias from the acceleration and the angular velocity included in the sensing data obtained in S30 shown in FIG. 14 to thereby correct the acceleration and the angular velocity using the initial bias calculated in S20 shown in FIG. 14 (using the acceleration bias $b_a$ and the angular velocity bias $b_\omega$ after estimating the acceleration bias $b_a$ and the angular velocity bias $b_\omega$ in S150 described later), and then updates the sensing data table 310 with the acceleration and the angular velocity thus corrected.

Then, the processing section 20 integrates the sensing data corrected in S100 to calculate (S110) the velocity and the attitude angle, and then adds the calculation data including the velocity and the attitude angle thus calculated to the calculation data table 340.

Then, the processing section 20 performs (S120) the running detection process. An example of the running detection process will be described later.

Then, in the case in which the processing section 20 has detected the running period using the running detection process (S120) (Y in S130), the processing section 20 calculates (S140) the running pitches and the strides. Further, in the case in which the processing section 20 fails to detect the running period (N in S130), the processing section 20 does not perform the process in S140.

Then, the processing section 20 performs the error estimation process to estimate (S150) the velocity error $\delta v^e$, the attitude angle error $\varepsilon^e$, the acceleration bias $b_a$, the angular velocity bias $b_\omega$, and the position error $\delta p^e$.

Then, the processing section 20 corrects (S160) the velocity, the position, and the attitude angle using the velocity error $\delta v^e$, the attitude angle error $\varepsilon^e$, and the position error $\delta p^e$, respectively, and then updates the calculation data table 340 with the velocity, the position, and the attitude angle thus corrected. Further, the processing section 20 integrates the velocity corrected in S160 to calculate (S170) the distance in the e-frame.

Then, the processing section 20 performs the coordinate transformation (S180) on the sensing data (the acceleration and the angular velocity in the b-frame) stored in the sensing data table 310, the calculation data (the velocity, the position, and the attitude angle in the e-frame) stored in the calculation data table 340, and the distance in the e-frame calculated in S170 into the acceleration, the angular velocity, the velocity, the position, the attitude angle, and the distance in the m-frame, respectively.

Then, the processing section 20 generates (S190) the calculation data including the acceleration, the angular velocity, the velocity, the position, the attitude angle, and the distance, on which the coordinate transformation has been performed in S180, and the strides and the running pitches calculated in S140. The processing section 20 performs the inertial navigation calculation process (the process corresponding to S100 through S190) every time the sensing data is obtained in S30 shown in FIG. 14.

Figure 16:
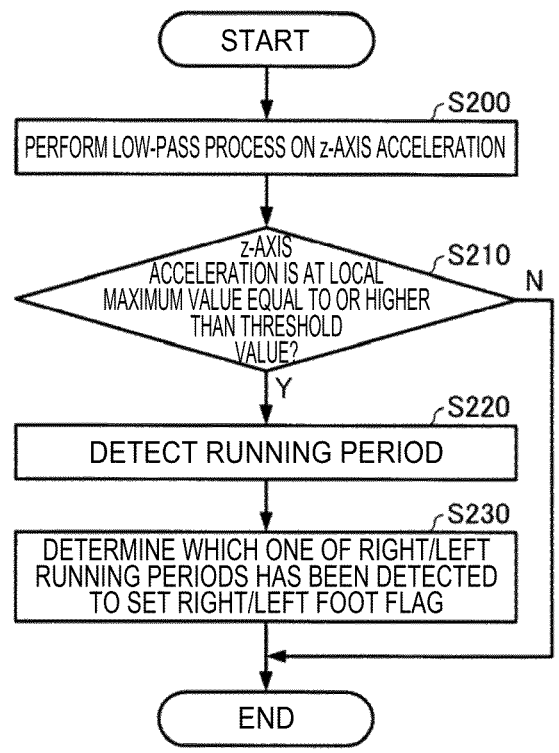
FIG. 16 is a flowchart showing an example of a procedure of a running detection process.

FIG. 16 is a flowchart showing an example of a procedure of the running detection process (the process of S120 shown in FIG. 15). The processing section 20 (the running detection section 242) executes the running detection process under the procedure of, for example, the flowchart shown in FIG. 16.

As shown in FIG. 16, the processing section 20 performs the low-pass filter process (S200) on the z-axis acceleration included in the acceleration corrected in S100 shown in FIG. 15 to remove the noise.

Then, in the case in which the z-axis acceleration, on which the low-pass filter process has been performed in S200, is equal to or higher than a threshold value and takes a local maximum value (Y in S210), the processing section 20 detects (S220) the running period at this timing.

Then, the processing section 20 determines whether the running period detected in S220 is the right running period or the left running period, then sets (S230) the right/left foot flag, and then terminates the running detection process. If the z-axis acceleration is lower than the threshold value or the z-axis acceleration does not take a local maximum value (N in S210), the processing section 20 terminates the running detection process without performing the process corresponding to S220 and subsequent steps.

Figure 17:
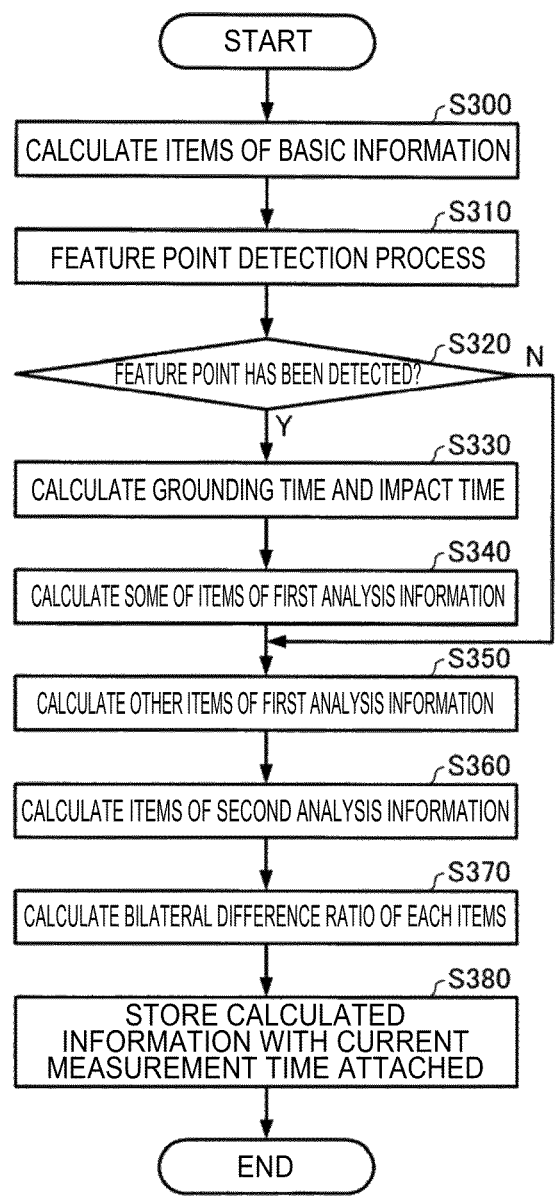
FIG. 17 is a flowchart showing an example of a procedure of an exercise analysis information generation process.

FIG. 17 is a flowchart showing an example of a procedure of the exercise analysis information generation process (the process of S50 shown in FIG. 14). The processing section 20 (the exercise analysis section 24) executes the exercise analysis information generation program 304 stored in the storage section 30 to thereby execute the exercise analysis information generation process under the procedure of, for example, the flowchart shown in FIG. 17.

As shown in FIG. 17, firstly, the processing section 20 calculates (S300) the items of the basic information using the calculation data generated in the inertial navigation calculation process in S40 shown in FIG. 14.

Then, the processing section 20 performs the detection process (S310) of the feature points (landing, treading-in, separating from the ground, and so on) in the running exercise of the user using the calculation data.

In the case in which the processing section 20 has detected the feature points in the process of S310 (Y in S320), the processing section 20 calculates (S330) the grounding time and the impact time based on the timing at which the feature points are detected. Further, the processing section 20 calculates (S340) some of the items of the first analysis information (the items which require the information of the feature points in order to calculate the items) based on the timing at which the feature points are detected using some of the calculation data, and the grounding time and the impact time generated in S330. In the case in which the processing section 20 has failed to detect the feature points in the process of S310 (N in S320), the processing section 20 does not perform the process in S330 and S340.

Then, the processing section 20 calculates (S350) the rest of the items (which do not require the information of the feature points in order to calculate the items) of the first analysis information using the input information.

Then, the processing section 20 calculates (S360) the items of the second analysis information using the first analysis information.

Then, the processing section 20 calculates (S370) the bilateral difference ratio with respect to each of the items of the input information, the items of the first analysis information, and the items of the second analysis information.

The processing section 20 stores (S380) the information calculated in S300 through S370 attached with the current measurement time in the storage section 30, and then terminates the exercise analysis information generation process.

1-4. Notification Device 1-4-1. Configuration of Notification Device

Figures 18, 19:
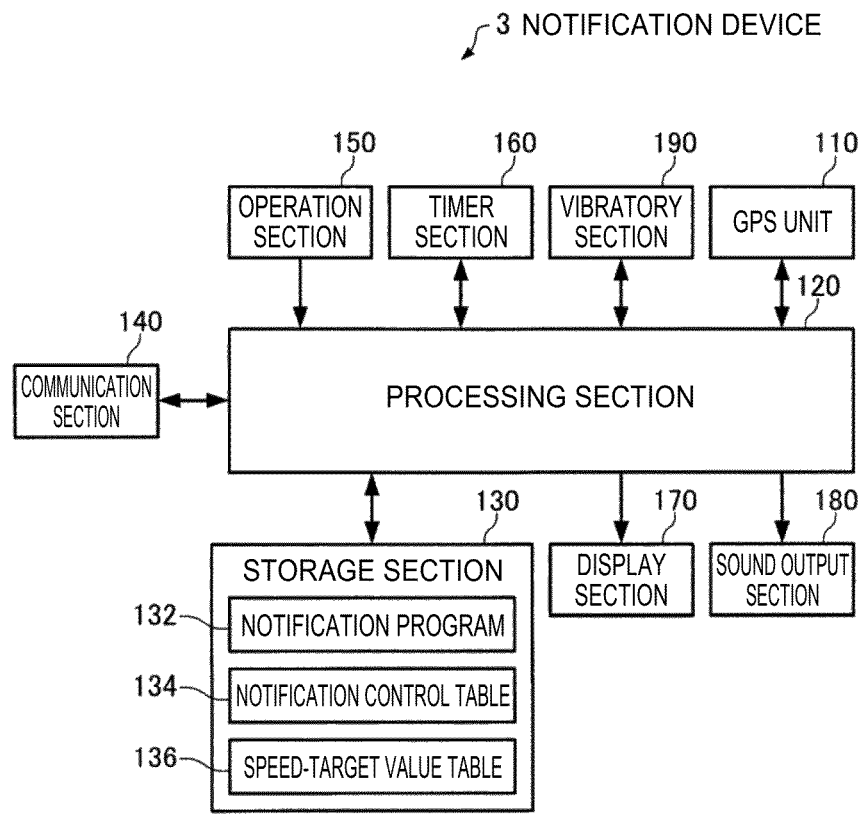
FIG. 18 is a functional block diagram showing a configuration example of a notification device.
FIG. 19 is a diagram showing a configuration example of a notification control table according to a first embodiment of the invention.

FIG. 18 is a functional block diagram showing a configuration example of the notification device 3. As shown in FIG. 18, the notification device 3 is configured including a GPS unit 110, a processing section 120, a storage section 130, a communication section 140, an operation section 150, a timer section 160, a display section 170, a sound output section 180, and a vibratory section 190. It should be noted that it is also possible for the notification device 3 according to the present embodiment to have a configuration obtained by eliminating or modifying some of these constituents, or adding other constituents.

The GPS unit 110 receives GPS satellite signals transmitted from GPS satellites as a kind of positioning satellites, then performs positioning calculation using the GPS satellite signals to calculate the position and the velocity (a vector including the size and the direction) of the user in the n-frame, and then outputs the GPS data, which is obtained by adding the time information and positioning accuracy information to the position and the velocity, to the processing section 120. It should be noted that since a method of calculating the position and the velocity, and a method of generating the time information using the GPS are known to the public, the detailed explanation will be omitted.

The communication section 140 is for performing data communication with the communication section 40 (see FIG. 3) of the exercise analysis device 2, and performs a process of receiving the command (e.g., the command of starting/stopping the measurement) corresponding to the operation data from the processing section 120 and then transmitting the command to the communication section 40 of the exercise analysis device 2, a process of receiving the in-running output information and the running result information having been transmitted from the communication section 40 of the exercise analysis device 2, and then transmitting the information thus received to the processing section 120, and so on.

The operation section 150 performs a process of obtaining the operation data (e.g., operation data of starting/stopping the measurement, operation data of inputting the target values of the respective exercise indexes, and operation data of selecting the exercise indexes to be the notification target)

from the user, and then transmitting the operation data to the processing section 120. The operation section 150 can also be, for example, a touch panel display, a button, a key, and a microphone.

The timer section 160 performs a process of generating the time information such as year, month, day, hour, minute, or second. The timer section 160 is implemented by, for example, a real-time clock (RTC) IC.

The display section 170 (an example of an output section) is for outputting image data and text data having been transmitted from the processing section 120 as a character, a graph, a table, animation, or other images to display such images. The display section 170 is implemented by a display such as a liquid crystal display (LCD), an organic electroluminescence (EL) display, or an electrophoretic display (EPD), and can also be a touch panel display. It should be noted that it is also possible to arrange that the functions of the operation section 150 and the display section 170 are implemented by a single touch panel display.

The sound output section 180 (an example of the output section) is for outputting the sound data having been transmitted from the processing section. 120 as a sound such as a voice or a buzzer sound. The sound output section 180 is implemented by, for example, a speaker or a buzzer.

The vibratory section 190 (an example of the output section) vibrates in accordance with the vibration data transmitted from the processing section 120. The vibration propagates to the notification device 3, and the user wearing the notification device 3 can sense the vibration. The vibratory section 190 is implemented by, for example, a vibration motor.

The storage section 130 is formed of, for example, a recording medium for storing programs and data such as a ROM, a flash ROM, a hard disk drive, or a memory card, and a RAM forming a work area of the processing section 120. The storage section 130 (either of the recording media) stores a notification program 132, which is read out by the processing section 120, and is used for executing the notification process (see FIG. 23).

Further, the storage section 130 stores a notification control table 134. The notification control table 134 is information for defining the maximum value of the difference between the calculation value by the exercise analysis device 2 and the target value set in the notification device 3, and a notification pattern with respect to each of the exercise indexes. FIG. 19 is a diagram showing a configuration example of the notification control table 134 in the first embodiment. In the example shown in FIG. 19, regarding the landing-below-COG, the maximum value of the difference between the calculation value and the target value is defined as "50 cm," the notification pattern is defined as "a first sound" and "a first vibration." Further, regarding the propulsive efficiency, the maximum value of the difference between the calculation value and the target value is defined as "5 degrees," the notification pattern is defined as "a second sound" and "a second vibration." Further, regarding the grounding time, the maximum value of the difference between the calculation value and the target value is defined as "100 ms," the notification pattern is defined as "a third sound" and "a third vibration." Further, regarding the forward tilt angle, the maximum value of the difference between the calculation value and the target value is defined as "5 degrees," the notification pattern is defined as "a fourth sound" and "a fourth vibration."

The "first sound," the "second sound," the "third sound," the "fourth sound," . . . are sounds, which are output by the sound output section 180, different from each other, and can be distinguished from each other by the user. It is also possible for the sounds to be different in the musical scale from each other in such a manner that, for example, the "first sound" is a sound of "C" in the scale, the "second sound" is a sound of "E" in the scale, the "third sound" is a sound of "G" in the scale, and the "fourth sound" is a sound of "B" in the scale. Further, it is also possible for the sounds to be different in melody from each other in such a manner that, for example, the "first sound" has a first melody, the "second sound" has a second melody, the "third sound" has a third melody, and the "fourth sound" has a fourth melody. Further, it is also possible for the sounds to be different from each other in the number of times of output of a sound in such a manner that, for example, a sound such as a blip is output once as the "first sound," a sound such as a blip is output twice as the "second sound," a sound such as a blip is output three times as the "third sound," a sound such as a blip is output four times as the "fourth sound." Further, it is also possible for the sounds to be different in pattern from each other in such a manner that, for example, the "first sound" has a first sound pattern, the "second sound" has a second sound pattern, the "third sound" has a third sound pattern, and the "fourth sound" has a fourth sound pattern.

Similarly, the "first vibration," the "second vibration," the "third vibration," the "fourth vibration," . . . are vibrations, which are generated and then output by the vibratory section 190, different from each other, and can be distinguished from each other by the user. For example, it is also possible for the "first vibration," the "second vibration," the "third vibration," and the "fourth vibration" to have respective vibration patterns different from each other in the frequency or the length. Further, it is also possible for the vibrations to be different from each other in the number of times of generation of a vibration in such a manner that, for example, a short vibration is generated once as the "first vibration," a short vibration is generated twice as the "second vibration," a short vibration is generated three times as the "third vibration," and a short vibration is generated four times as the "fourth vibration."

Further, it is also possible for a speed-target value table 136 to be stored in the storage section 30. The speed-target value table 136 is the information (an example of the correspondence information between the target values of the respective indexes and the velocity of the user determined in advance) for defining the correspondence relationship between the target values of the respective exercise indexes and the running speed of the user. FIG. 20 is a diagram showing a configuration example of the speed-target value table 136 in the first embodiment. In the example shown in FIG. 20, in the case in which the running speed is 5 m/s, the target value of the landing-below-COG is defined as 35 cm, the target value of the propulsive efficiency is defined as 10 degrees, the target value of the grounding time is defined as 100 ms, the target value of the forward tilt angle is defined as 8 degrees, and so on. Further, in the case in which the running speed is 4 m/s, the target value of the landing-below-COG is defined as 30 cm, the target value of the propulsive efficiency is defined as 11 degrees, the target value of the grounding time is defined as 150 ms, the target value of the forward tilt angle is defined as 7 degrees, and so on. Further, in the case in which the running speed is 3 m/s, the target value of the landing-below-COG is defined as 25 cm, the target value of the propulsive efficiency is defined as 12 degrees, the target value of the grounding time is defined as 200 ms, the target value of the forward tilt angle is defined as 6 degrees, and so on. Further, in the case in which the running speed is 2 m/s, the target value of the landingbelow-COG is defined as 20 cm, the target value of the propulsive efficiency is defined as 13 degrees, the target value of the grounding time is defined as 250 ms, the target value of the forward tilt angle is defined as 5 degrees, and so on. In other words, in the example shown in FIG. 20, appropriate target values are defined with respect to the respective exercise indexes for each of the values of the running speed in such a manner that the higher the running speed of the user is, the higher the target value of the landing-below-COG and the target value of the forward tilt angle become, and the lower the target value of the propulsive efficiency and the target value of the grounding time become.

The processing section 120 is formed of, for example, a CPU, a DSP, an ASIC, and so on, and executes programs stored in the storage section 130 (recording medium) to thereby perform a variety of calculation processes and control processes. For example, the processing section 120 performs a variety of processes (a process of transmitting the command of starting/stopping the measurement to the communication section 140, a process of setting the target values of the respective exercise indexes corresponding to the operation data, a process of selecting the exercise index as the notification target, and so on) corresponding to the operation data received from the operation section 150, and a process of receiving the in-running output information from the communication section 140, performing a variety of calculation processes on the values (the calculation values) of the respective exercise indexes to generate the notification information such as sound data or vibration data, and then transmitting the sound data or the vibration data to the sound output section 180 and the vibratory section 190, respectively. Further, the processing section 120 performs a process of receiving the running result information from the communication section 140, then generating the notification information such as text data corresponding to the running result information, and then transmitting the notification information to the display section 170. Further, the processing section 120 performs a process of generating time image data corresponding to the time information received from the timer section 160, and then transmitting the time image data to the display section 170, and so on.

1-4-2. Functional Configuration of Processing Section

Figure 21:
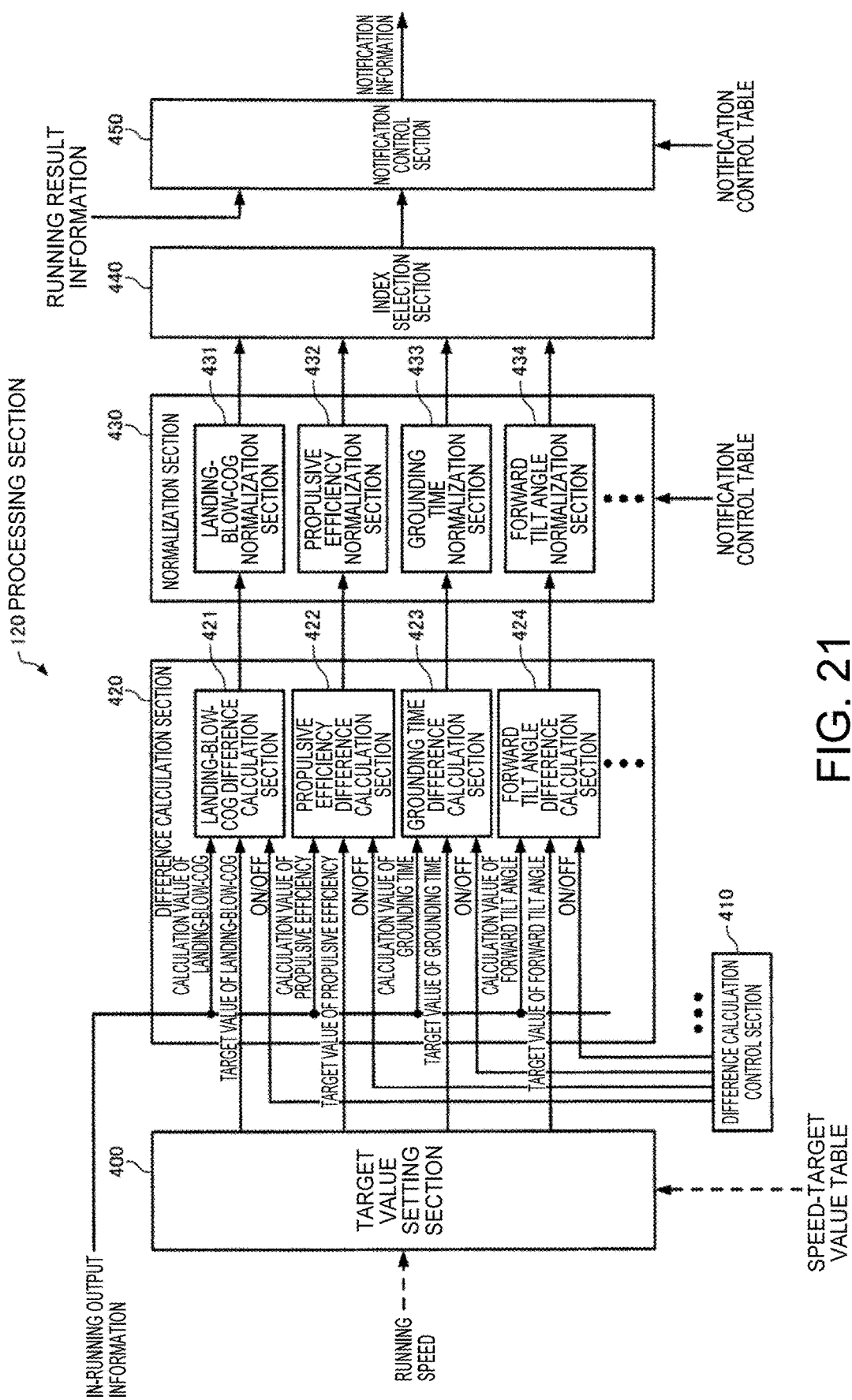
FIG. 21 is a functional block diagram showing a configuration example of a processing section of the notification device according to the first embodiment.

FIG. 21 is a functional block diagram showing a configuration example of the processing section 120 of the notification device 3 according to the first embodiment. In the present embodiment, the processing section 120 executes the notification program 132 stored in the storage section 130 to thereby function as a target value setting section 400, a difference calculation control section 410, a difference calculation section 420, a normalization section 430, an index selection section 440, and a notification control section 450. It should be noted that it is also possible for the processing section 120 to receive the notification program 132 stored in an arbitrary storage device (recording medium) via a network or the like, and then execute the notification program 132.

The target value setting section 400 performs a process of setting the target values of the respective exercise indexes. It is also possible for the target value setting section 400 to obtain and then set the target values of the respective exercise indexes included in, for example, the operation data. For example, it is possible for the user to operate the operation section 150 to set the target values based on the values of the respective exercise indexes in the past running of the user, to set the target values based on the average values or the like of the respective exercise indexes of other members belonging to the same running team, to set the values of the respective exercise indexes of a yearning runner or a target runner to the target values, or to set the values of the respective exercise indexes of another user who clears a target time to the target values.

Alternatively, it is also possible for the target value setting section 400 to set the target value corresponding to the running speed of the user with respect to each of the indexes using the speed-target value table 136. It is also possible for the target value setting section 400 to use, for example, the speed included in the GPS data calculated by the GPS unit 110, or the running speed included in the in-running output information, as the running speed of the user. In the case in which, for example, the target value setting section 400 uses the speed-target value table 136 shown in FIG. 20, if the running speed of the user is 4 m/s, the target value setting section 400 sets the target value of the landing-below-COG to 30 cm, the target value of the propulsive efficiency to 11 degrees, the target value of the grounding time to 150 ms, and the target value of the forward tilt angle to 7 degrees. Further, if the running speed of the user is 3.5 m/s, the target value setting section 400 performs linear interpolation or the like using the target values at 3 m/s and the target values at 4 m/s to set the target value of the landing-below-COG to 27.5 cm, the target value of the propulsive efficiency to 11.5 degree, the target value of the grounding time to 175 ms, and the target value of the forward tilt angle to 6.5 degree.

The difference calculation control section 410 individually controls whether or not the calculation of the difference between the value (calculation value) of each of the exercise indexes and the corresponding target value by the difference calculation section 420 is performed. For example, it is also possible that the user operates the operation section 150 to select the exercise index on which the difference calculation is performed (or is not performed), then the difference calculation control section 410 obtains the operation data corresponding to this operation to control ON/OFF of the difference calculation between the values of the exercise indexes and the respective target values in accordance with the operation data.

The difference calculation section 420 performs a process of calculating the differences between the index values of the exercise indexes calculated by analyzing the exercise of the user using the inertial measurement unit 10 and the target values set respectively to the exercise indexes. In the present embodiment, the difference calculation section 420 performs a process of calculating a difference between the calculation value (a value calculated by the exercise analysis device 2 analyzing the exercise of the user using the measurement data of the inertial measurement unit 10) included in the in-running output information and the target value set by the target value setting section 400 with respect to each of the exercise indexes. Specifically, the difference calculation section 420 is configured including a plurality of difference calculation sections for calculating the difference between the calculation value and the target value with respect to each of the exercise indexes such as a landing-below-COG difference calculation section 421, a propulsive efficiency difference calculation section 422, a grounding time difference calculation section 423, and a forward tilt angle difference calculation section 424, and under the control of the difference calculation control section 410, each of the difference calculation sections outputs the difference ((calculation value)−(target value)) between the calculation value and the target value in the ON state, and outputs a special value (e.g., a practically inconceivable large value) representing the fact that the difference calculation has not been performed in the OFF state without performing the difference calculation.

The normalization section 430 performs a process of normalizing the difference with respect to each of the exercise indexes output by the difference calculation section 420. Specifically, the normalization section 430 is configured including a plurality of normalization sections for normalizing the calculation value of the difference with respect to each of the exercise indexes such as a landing-below-COG normalization section 431, a propulsive efficiency normalization section 432, a grounding time normalization section 433, and a forward tilt angle normalization section 434, and each of the normalization sections normalizes the calculation value of the difference into a value between 0 and 1 by modifying the calculation value of the difference into 0 if the calculation value of the difference with respect to each of the exercise indexes is equal to or lower than 0, modifying the calculation value of the difference into 1 if the calculation value of the difference is equal to or higher than the maximum value defined in the notification control table 134, and modifying the calculation value of the difference into (calculation value of the difference)/(maximum value of the difference) if the calculation value of the difference is a value between 0 and the maximum value, and then outputs the result. Further, in the case in which each of the difference calculation sections outputs the special value representing the fact that the difference calculation section has not performed the difference calculation, each of the normalization sections outputs a negative value or a value greater than 1.

The index selection section 440 perform a process of selecting some exercise indexes out of the plurality of exercise indexes based on the differences with respect to the respective indexes. Specifically, the index selection section 440 selects some of the exercise indexes based on the value of the normalized difference between the calculation value and the target value with respect to each of the exercise indexes output by the normalization section 430.

For example, it is also possible for the index selection section 440 to select exercise indexes larger in the difference from the target value than other exercise indexes as the some of the exercise indexes. It is also possible for the index selection section 440 to select, for example, a predetermined number of exercise indexes having the largest normalized difference values out of the exercise indexes having the normalized difference values within a range between 0 and 1. Further, it is also possible for the index selection section 440 to select, for example, only the exercise index having the normalized difference value the closest to 1 (only the worst exercise index), or to select top two or three exercise indexes having the normalized difference value closest to 1 (the worst two or three exercise indexes). Further, it is also possible for the index selection section 440 to select no exercise index in the case in which all of the difference values, which have been normalized into the range between 0 and 1, are smaller than a threshold value (e.g., 0.3) (no relatively bad exercise index exists).

Further, for example, it is also possible for the index selection section 440 to select exercise indexes smaller in the difference from the target value than other exercise indexes as the some of the exercise indexes. It is also possible for the index selection section 440 to select, for example, a predetermined number of exercise indexes having the smallest normalized difference values out of the exercise indexes having the normalized difference values within the range between 0 and 1. Further, it is also possible for the index selection section 440 to select, for example, only the exercise index having the normalized difference value the closest to 0 (only the best exercise index), or to select top two or three exercise indexes having the normalized difference value closest to 0 (the best two or three exercise indexes). Further, it is also possible for the index selection section 440 to select no exercise index in the case in which all of the difference values, which have been normalized into the range between 0 and 1, are larger than a threshold value (e.g., 0.7) (no relatively good exercise index exists).

The notification control section 450 performs control for making a notification of the some of the exercise indexes selected by the index selection section 440. Specifically, the notification control section 450 generates the notification information for generating the sound or the vibration, which is defined in the notification control table 134, with respect to each of the exercise indexes selected, and then transmits the notification information to the sound output section 180 or the vibratory section 190. It is possible for the user to run while recognizing what exercise index has been selected (what exercise index is bad (or good)) due to the pattern of the sound or the vibration. It should be noted that in the case in which the index selection section 440 has selected a plurality of exercise indexes, it is not achievable in reality for the user to distinguish the exercise indexes even if a plurality of vibrations different from each other between the exercise indexes is generated at the same time, and therefore, it is preferable to output a plurality of sounds different from each other between the exercise indexes at the same time. Further, if the number of sounds output at the same time is too large, the user fails to distinguish the sounds. Therefore, it is preferable for the index selection section 440 to perform the selection up to a ceiling of two or three exercise indexes.

Further, it is also possible that the user performs setting of a notification period (e.g., setting of generating a sound or a vibration for 5 seconds every minute) via the operation section 150, and the notification control section 450 generates the notification information for generating the sound or the vibration every notification period thus set.

Figure 22:
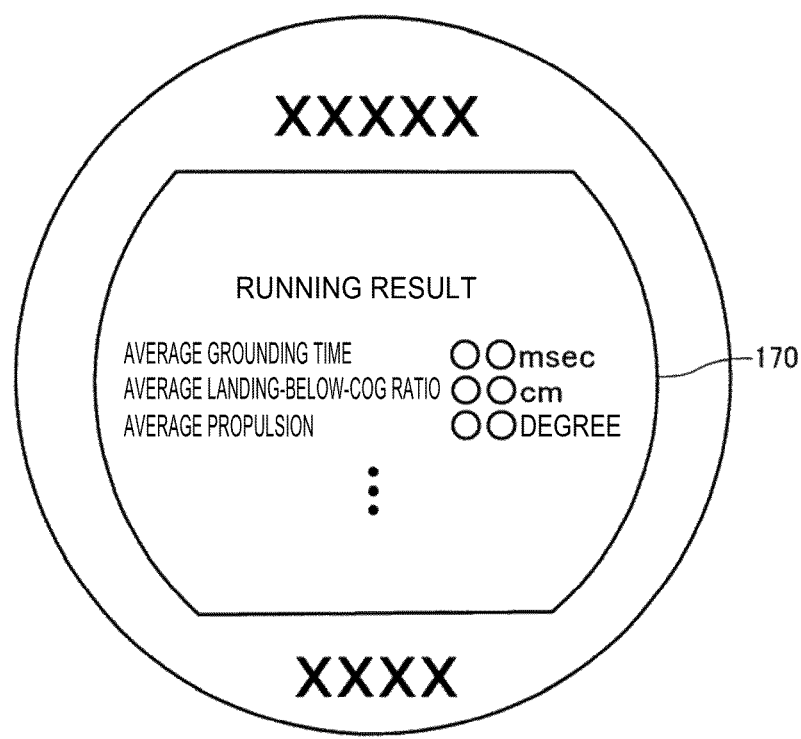
FIG. 22 is a diagram showing an example of information displayed on a display section of the notification device according to the first embodiment.

Further, when the notification control section 450 receives the running result information, the notification control section 450 generates the notification information (e.g., text data) for displaying the running result information, and then transmits the notification information to the display section 170. For example, as shown in FIG. 22, the notification control section 450 in the first embodiment makes the display section 170 display average values of the respective exercise indexes during running of the user included in the running result information. It is possible for the user to immediately recognize whether each of the exercise indexes is good or bad by looking at the display section 170 after stopping running (after performing the stopping operation of the measurement).

1-4-3. Procedure of Process

Figure 23:
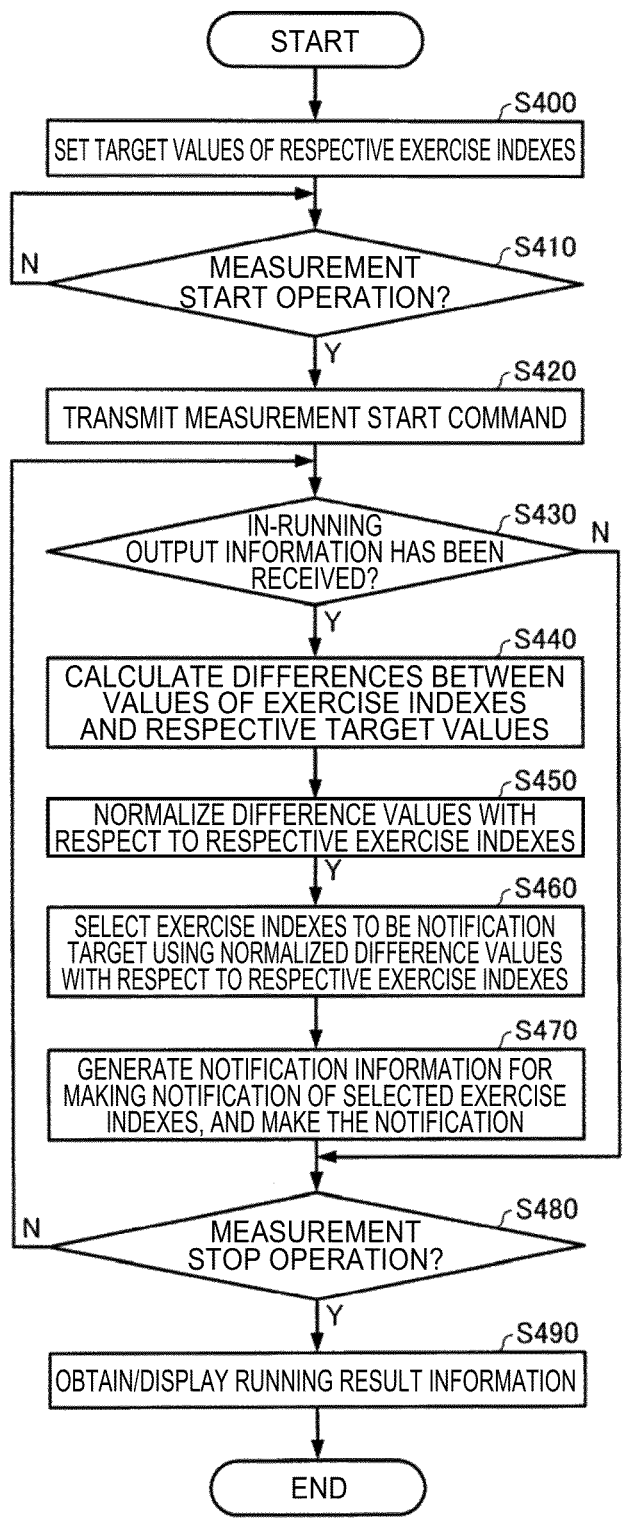
FIG. 23 is a flowchart showing an example of a procedure of a notification process according to the first embodiment.

FIG. 23 is a flowchart showing an example of a procedure of the notification process performed by the processing section 120 of the notification device 3 according to the first embodiment. The processing section 120 (an example of a computer) of the notification device 3 executes the notification program 132 stored in the storage section 130 to thereby execute the notification process under the procedure of, for example, the flowchart shown in FIG. 23.

As shown in FIG. 23, the processing section 120 first sets (S400) the target values of the respective exercise indexes based on the operation data from the operation section 150.

Then, the processing section 120 waits until the processing section 120 obtains the operation data of starting the measurement from the operation section 150 (N in S410), and in the case in which the processing section 120 has received the operation data of starting the measurement (Y in S410), the processing section 120 transmits (S420) the command of starting the measurement to the exercise analysis device 2 via the communication section 140.

Then, the processing section 120 calculates (S440) the differences between the values (the calculation values) of the exercise indexes included in the in-running output information obtained and the respective target values set in S400 every time the processing section 120 obtains the in-running output information from the exercise analysis device 2 via the communication section 140 (Y in S430) until the processing section 120 obtains the operation data of stopping the measurement from the operation section 150 (N in S470).

Then, the processing section 120 normalizes (S450) each of the difference values of the exercise indexes calculated in S440 into a range between 0 and 1.

Then, the processing section 120 selects (S460) the exercise indexes to be the notification target using the difference values thus normalized with respect to the respective exercise indexes, generates the notification information for making the notification of the exercise indexes thus selected to perform the notification (S470) via the sound output section 180 or the vibratory section 190.

Then, when the processing section 120 obtains the operation data of stopping the measurement from the operation section 150 (Y in S480), the processing section 120 obtains the running result information from the exercise analysis device 2 via the communication section 140 to make the display section 170 display (S490) the running result information, and then terminates the notification process.

As described above, it is possible for the user to run while recognizing the running state based on the information, which the user is notified of in S470. Further, it is possible for the user to recognize the running result immediately after stopping running based on the information displayed in S490.

It should be noted that in the flowchart shown in FIG. 23, since the processing section 120 sets the target values of the respective exercise indexes in S400 based on the operation data from the operation section 150, it is suitable for the case in which it is not required to change the target values of the respective exercise indexes during running of the user (e.g., the case in which the user runs at a roughly constant speed). In contrast, in the case in which the running speed of the user changes dramatically (e.g., the case in which the user runs on a road having a lot of ups and downs), it is also possible to modify the flowchart shown in FIG. 23 so that the processing section 120 obtains the running speed of the user to set the target values corresponding to the running speed using the speed-target value table 136 as described above.

1-5. Advantages

In the first embodiment, since the inertial measurement unit 10 is capable of detecting fine movement of the user with the triaxial acceleration sensor 12 and the triaxial angular velocity sensor 14, it is possible for the exercise analysis device 2 to perform the inertial navigation calculation using the detection result of the inertial measurement unit 10 during running of the user, and then accurately calculate the values of the variety of types of exercise indexes related to the running ability using the result of the inertial navigation calculation. Then, the notification device 3 selects some relatively bad (or good) exercise indexes based on the differences between the values of the variety of types of exercise indexes calculated by the exercise analysis device 2 and the respective target values, and then makes the notification of the some exercise indexes. Therefore, according to the first embodiment, since the user can run while recognizing the relatively bad (or good) exercise indexes, it is possible for the user to efficiently improve the running ability.

In particular, in the first embodiment, the notification device 3 normalizes the differences between the values of the variety of types of exercise indexes and the respective target values, and then selects a predetermined number of exercise indexes having the highest (or lowest) normalized difference values to make the notification. Therefore, according to the first embodiment, since it is possible for the notification device to select the predetermined number of relatively bad (or good) exercise indexes under the fair conditions to make the notification, it is possible to reduce the possibility that a notification of specific exercise indexes becomes apt to be made irrespective of the running state of the user.

Further, in the first embodiment, the notification device 3 does not make a notification of any exercise indexes in the case in which all of the normalized differences with respect to the respective exercise indexes are smaller (or larger) than a threshold value. Therefore, according to the first embodiment, it is possible for the user to determine that the running state is good (or bad) when no notification of any exercise indexes is made, and physically experience the good running state (or the bad running state).

Further, in the first embodiment, the notification device 3 makes the notification of the exercise indexes using the sounds or the vibrations different from each other between the exercise indexes. Therefore, according to the first embodiment, since the user can recognize the relatively bad (or good) exercise indexes while keeping the eyes forward and concentrating on running, it is possible for the user to efficiently improve the running ability.

Further, according to the first embodiment, since the notification device 3 displays the information such as the average values of the respective exercise indexes during running after stopping running of the user (after the user performs the operation of stopping the measurement), it is possible for the user to immediately recognize how much the exercise index, to which the user has paid attention, has been improved, or whether or not there is any exercise index, to which the user has not paid attention, but which has been bad (or good) in average.

2. Second Embodiment

In a second embodiment, constituents substantially the same as those in the first embodiment will be denoted by the same reference symbols, and the explanation thereof will be omitted or simplified, and the contents different from those of the first embodiment will be explained in detail.

2-1. Configuration of Exercise Analysis System

Although the explanation will hereinafter be presented citing an exercise analysis system for analyzing the exercise in running (including walking) of the user as an example, the exercise analysis system according to the second embodiment can also be applied to an exercise analysis system for analyzing an exercise other than running in a similar manner. Since the configuration example of the exercise analysis system 1 according to the second embodiment is substantially the same as that in the first embodiment (FIG. 1), the graphical description thereof will be omitted. The exercise analysis system 1 according to the second embodiment is also configured including the exercise analysis device 2 and the notification device 3 similarly to the first embodiment (FIG. 1). Similarly to the first embodiment, the exercise analysis device 2 is a device for analyzing the exercise during running of the user, and the notification device 3 is a device for notifying the user of information of a state of the exercise during running of the user and a running result. As shown in FIG. 2, similarly to the first embodiment, also in the second embodiment, the exercise analysis device 2 incorporates an inertial measurement unit (IMU) 10, and is attached to the body portion (e.g., right waist, left waist, or central portion of the waist) of the user so that one of the detection axes (hereinafter referred to as the z axis) of the inertial measurement unit (IMU) 10 roughly coincides with a gravitational acceleration direction (vertically downward direction) in the state in which the user is in the rest state. Further, similarly to the first embodiment, the notification device 3 is a wrist-type (wristwatch-type) portable information apparatus, and is attached to the wrist or the like of the user. It should be noted that the notification device 3 can also be a portable information apparatus such as a head mount display (HMD) or a smartphone.

Similarly to the first embodiment, the user operates the notification device 3 when starting running to instruct start of the measurement (the inertial navigation calculation process and the exercise analysis process) by the exercise analysis device 2, and then operates the notification device 3 when stopping running to instruct stop of the measurement by the exercise analysis device 2. The notification device 3 transmits the command for instructing start or stop of the measurement to the exercise analysis device 2 in accordance with the operation by the user.

Similarly to the first embodiment, when the exercise analysis device 2 receives the command of starting the measurement, the exercise analysis device 2 starts the measurement by the inertial measurement unit (IMU) 10, calculates the values of the variety of exercise indexes, which are indexes related to a running ability (an example of athletic abilities) of the user using the measurement result, and generates the exercise analysis information including the values of the variety of exercise indexes as the information of the analysis result of the running exercise of the user. The exercise analysis device 2 generates the information (the in-running output information) output during running of the user using the exercise analysis information thus generated, and then transmits the in-running output information to the notification device 3. Further, in the second embodiment, the notification device 3 receives the in-running output information from the exercise analysis device 2, compares the values of the variety of exercise indexes included in the in-running output information with the respective target values set in advance, and then displays the information regarding whether each of the exercise indexes is good or bad. Thus, it is possible for the user to run while recognizing whether each of the exercise indexes is good or bad.

Further, in the second embodiment, the notification device 3 periodically outputs a specific type of sound or vibration in accordance with the target values of the time during which one of the feet is grounded (a period from landing to the separation from the ground), and the time (flying time) during which the both feet are separated from the ground. By repeating the landing and the separation from the ground in accordance with the sound or the vibration, it is possible for the user to realize running having an ideal grounding time and an ideal flying time.

Further, similarly to the first embodiment, when the exercise analysis device 2 receives the command of stopping the measurement, the exercise analysis device 2 stops the measurement by the inertial measurement unit (IMU) 10, then generates the information (the running result information: the running distance, the running speed) of the running result of the user, and then transmits the running result information to the notification device 3. The notification device 3 receives the running result information from the exercise analysis device 2, and then notifies the user of the information of the running result as characters or images. Thus, it is possible for the user to recognize the information of the running result immediately after stopping running. Alternatively, it is also possible for the notification device 3 to generate the running result information based on the in-running output information, and then notify the user as the characters or the images.

It should be noted that the data communication between the exercise analysis device 2 and the notification device 3 can be wireless communication or wired communication.

2-2. Coordinate System

The coordinate systems to be necessary in the following explanation are defined similarly to "1-2. Coordinate System" in the description of the first embodiment.

2-3. Exercise Analysis Device 2-3-1. Configuration of Exercise Analysis Device

Since the configuration example of the exercise analysis device 2 in the second embodiment is substantially the same as that in the first embodiment (FIG. 3), the graphical description thereof will be omitted. In the exercise analysis device 2 in the second embodiment, since the functions of the inertial measurement unit (IMU) 10, the processing section 20, the storage section 30, the communication section 40, the GPS unit 50, and the geomagnetic sensor 60 are substantially the same as those in the first embodiment, the explanation thereof will be omitted.

2-3-2. Functional Configuration of Processing Section

Since the configuration example of the processing section 20 of the exercise analysis device 2 in the second embodiment is substantially the same as that in the first embodiment (FIG. 8), the graphical description thereof will be omitted. Also in the second embodiment, similarly to the first embodiment, the processing section 20 executes the exercise analysis program 300 stored in the storage section 30 to thereby function as the inertial navigation calculation section 22 and the exercise analysis section 24. Since the functions of the inertial navigation calculation section 22 and the exercise analysis section 24 are substantially the same as those in the first embodiment, the explanation thereof will be omitted.

2-3-3. Functional Configuration of Inertial Navigation Calculation Section

Since the configuration example of the inertial navigation calculation section 22 in the second embodiment is substantially the same as that in the first embodiment (FIG. 9), the graphical description thereof will be omitted. Also in the second embodiment, similarly to the first embodiment, the inertial navigation calculation section 22 includes the bias elimination section 210, the integral processing section 220, the error estimation section 230, the running processing section 240, and the coordinate transformation section 250, and since the functions of these constituents are substantially the same as those in the first embodiment, the explanation thereof will be omitted.

2-3-4. Functional Configuration of Exercise Analysis Section

Since the configuration example of the exercise analysis section 24 in the second embodiment is substantially the same as that in the first embodiment (FIG. 13), the graphical description thereof will be omitted. Also in the second embodiment, similarly to the first embodiment, the inertial navigation calculation section 24 includes the feature point detection section 260, the grounding time/impact time calculation section 262, the basic information generation section 272, the first analysis information generation section 274, the second analysis information generation section 276, the bilateral difference ratio calculation section 278, and an output information generation section 280, and since the functions of these constituents are substantially the same as those in the first embodiment, the explanation thereof will be omitted.

2-3-5. Input Information

Since the details of the items of the input information are explained in "1-3-5. Input Information" in the description of the first embodiment, the explanation thereof will be omitted here.

2-3-6. Second Analysis Information

Since the details of the items of the second analysis information calculated by the second analysis information generation section 276 are explained in "1-3-7. Second Analysis Information" in the description of the first embodiment, the explanation thereof will be omitted here.

2-3-7. Bilateral Difference Ratio (Balance Between Both Sides)

Since the details of the bilateral difference ratio calculated by the bilateral difference ratio calculation section 278 are explained in "1-3-8. Bilateral Difference Ratio (Balance Between Both Sides)" in the description of the first embodiment, the explanation thereof will be omitted here.

2-3-8. Procedure of Process

Since the flowchart showing an example of the procedure of the exercise analysis process performed by the processing section 20 in the second embodiment is substantially the same as that in the first embodiment (FIG. 14), the graphical description and the explanation thereof will be omitted.

Further, since the flowchart showing an example of the procedure of the inertial navigation calculation process (the process in S40 shown in FIG. 14) in the second embodiment is also substantially the same as that in the first embodiment (FIG. 15), the graphical description and the explanation thereof will be omitted.

Further, since the flowchart showing an example of the procedure of the running detection process (the process in S120 shown in FIG. 15) in the second embodiment is also substantially the same as that in the first embodiment (FIG. 16), the graphical description and the explanation thereof will be omitted.

Further, since the flowchart showing an example of the procedure of the exercise analysis information generation process (the process in S50 shown in FIG. 14) in the second embodiment is also substantially the same as that in the first embodiment (FIG. 17), the graphical description and the explanation thereof will be omitted.

2-4. Notification Device
2-4-1. Configuration of Notification Device

Since the configuration example of the notification device 3 according to the second embodiment is substantially the same as that in the first embodiment (FIG. 18), the graphical description thereof will be omitted. In the notification device 3 according to the second embodiment, since the functions of the GPS unit 110, the communication section 140, the operation section 150, and the timer section 160 are substantially the same as those in the first embodiment, the explanation thereof will be omitted.

The display section 170 (an example of an output section) is for outputting image data and text data having been transmitted from the processing section 120 as a character, a graph, a table, animation, or other images to display such images. The display section 170 is implemented by a display such as an LCD, an organic EL display, or an EPD, and can also be a touch panel display. It should be noted that it is also possible to arrange that the functions of the operation section 150 and the display section 170 are implemented by a single touch panel display.

The sound output section 180 (an example of the output section) is for outputting the sound information (the sound data) having been transmitted from the processing section 120 as a sound such as a voice or a buzzer sound. The sound output section 180 is implemented by, for example, a speaker or a buzzer.

The vibratory section 190 (an example of the output section) vibrates in accordance with the vibration information (the vibration data) transmitted from the processing section 120. The vibration propagates to the notification device 3, and the user wearing the notification device 3 can sense the vibration. The vibratory section 190 is implemented by, for example, a vibration motor.

The storage section 130 is formed of, for example, a recording medium for storing programs and data such as a ROM, a flash ROM, a hard disk drive, or a memory card, and a RAM forming a work area of the processing section 120. The storage section 130 (either of the recording media) stores the notification program 132, which is read out by the processing section 120, and is used for executing the notification process (see FIG. 29).

Further, the storage section 30 stores the notification control table 134. The notification control table 134 in the second embodiment is the information for defining a method of notifying the user of a target grounding time (the first period) as a time corresponding to the target value of the grounding time (the time during which one of the feet of the user is grounded), and a target flying time (the second period) as a time corresponding to the target value of the flying time (the both feet of the user are separated from the ground). FIG. 24 is a diagram showing a configuration example of the notification control table 134 in the second embodiment. In the present embodiment, it is possible for the user to select either one of four notification modes (a first mode, a second mode, a third mode, and a fourth mode), and in the example shown in FIG. 24, it is defined in the notification control table 134 that in the first mode, the notification of the target grounding time is made using the "first sound" or the "first vibration" (a first notification medium), and the notification of the target flying time is not made. Further, in the second mode, it is defined that the notification of the target flying time is made using the "second sound" or the "second vibration" (a second notification medium), and the notification of the target grounding time is not made. Further, in the third mode, it is defined that the notification of the target grounding time is made using the "first sound" or the "first vibration" (the first notification medium), and the notification of the target flying time is made using the "second sound" or the "second vibration" (the second notification medium). Further, in the fourth mode, it is defined that neither of the notification of the target grounding time and the notification of the target flying time is made.

The "first sound" and the "second sound" are sounds, which are output by the sound output section 180, different from each other, and can be distinguished from each other by the user. For example, it is also possible for the "first sound" and the "second sound" to be "thwack" and "boing," respectively, which are sounds easy for the user to call up images of the grounding state and the flying state. Further, the "first sound" and the "second sound" can also be different in frequency from each other in such a manner that the "first sound" is a sound low in frequency, and the "second sound" is a sound high in frequency. Further, the "first sound" and the "second sound" can also be different in the music scale from each other in such a manner that the "first sound" is a sound of "C" in the scale, and the "second sound" is a sound of "E" in the scale.

Similarly, the "first vibration" and the "second vibration" are vibrations, which are generated by the vibratory section 190, different from each other, and can be distinguished from each other by the user. For example, the "first vibration" and the "second vibration" can also be different in frequency from each other.

Further, it is also possible for a speed-target value table 136 to be stored in the storage section 30. The speed-target value table 136 in the second embodiment is the information for defining the correspondence relationship between the running speed of the user, and the target grounding time and the target flying time. FIG. 25 is a diagram showing a configuration example of the speed-target value table 136 in the second embodiment. In the example shown in FIG. 25, in the case in which the running speed is 4 m/s, the target grounding time is defined as 170 ms, and the target flying time is defined as 110 ms. Further, in the case in which the running speed is 3 m/s, the target grounding time is defined as 190 ms, and the target flying time is defined as 100 ms. Further, in the case in which the running speed is 2 m/s, the target grounding time is defined as 210 ms, and the target flying time is defined as 90 ms. Therefore, in the example shown in FIG. 25, the appropriate target grounding time and the appropriate target flying time are defined in such a manner that the higher the running speed of the user is, the shorter the target grounding time becomes, and the longer the target flying time becomes.

The processing section 120 is formed of, for example, a CPU, a DSP, an ASIC, and so on, and executes programs stored in the storage section 130 (recording medium) to thereby perform a variety of calculation processes and control processes. For example, the processing section 120 performs a variety of processes (a process of transmitting the command of starting/stopping the measurement to the communication section 140, a process of setting the target values of the respective exercise indexes corresponding to the operation data, a process of selecting the notification mode, and so on) corresponding to the operation data received from the operation section 150, a process of receiving the in-running output information from the communication section 140, generating the display information (text data) corresponding to the comparison result between the values of the variety of exercise indexes and the respective target values to transmit the display information to the display section 170, and a process of generating the sound information (the sound data) or the vibration information (the vibration data) corresponding to the target grounding time and the target flying time to transmit the sound information or the vibration information to the sound output section 180 or the vibratory section 190. Further, the processing section 120 performs a process of generating time image data corresponding to the time information received from the timer section 160, and then transmitting the time image data to the display section 170, and so on.

2-4-2. Functional Configuration of Processing Section

Figure 26:
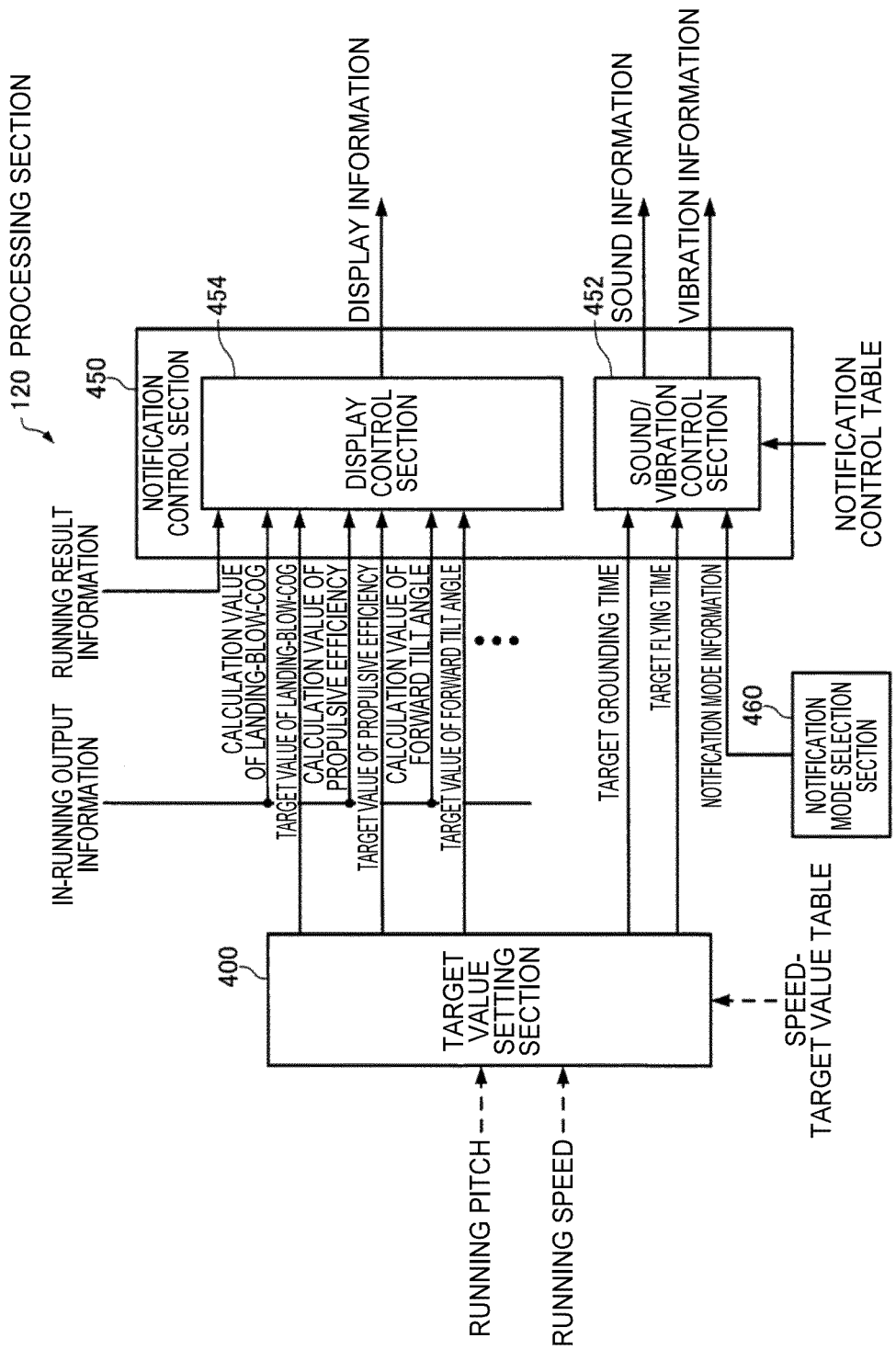
FIG. 26 is a functional block diagram showing a configuration example of a processing section of the notification device according to the second embodiment.

FIG. 26 is a functional block diagram showing a configuration example of the processing section 120 of the notification device 3 according to the second embodiment. In the second embodiment, the processing section 120 executes the notification program 132 stored in the storage section 130 to thereby function as the target value setting section 400, a notification mode selection section 460, and the notification control section 450. It should be noted that it is also possible for the processing section 120 to receive the notification program 132 stored in an arbitrary storage device (recording medium) via a network or the like, and then execute the notification program 132.

The target value setting section 400 performs a process of setting the target values of the respective exercise indexes. It is also possible for the target value setting section 400 to obtain and then set the target values of the respective exercise indexes included in, for example, the operation data. For example, it is possible for the user to operate the operation section 150 to set the target values based on the values of the respective exercise indexes in the past running of the user, to set the target values based on the average values or the like of the respective exercise indexes of other members belonging to the same running team, to set the values of the respective exercise indexes of a yearning runner or a target runner to the target values, or to set the values of the respective exercise indexes of another user who clears a target time to the target values.

Further, the target value setting section 400 performs a process of setting the target grounding time (the target value of the grounding time) and the target flying time (the target value of the flying time) based on predetermined information in running of the user. For example, the predetermined information can also be the information of the grounding time and the running pitch (values of the grounding time and the running pitch (the calculation value included in the in-running output information) calculated using the measurement data of the inertial measurement unit). Further, for example, the predetermined information can also be the information of the running speed (the value of the running speed calculated by the GPS unit 110, or the value of the running speed (the calculation value included in the in-running output information) calculated using the measurement data of the inertial measurement unit).

The notification mode selection section 460 performs the process of selecting the notification mode based on the control information (e.g., the operation data from the operation section 150 (an example of the information control section)), and then outputs the information of the notification mode thus selected. It is possible for the notification mode selection section 460 to select as the notification mode one of the first mode of making the notification of the target grounding time without making the notification of the target flying time, and the second mode of making the notification of the target flying time without making the notification of the target grounding time. It is also possible for the notification mode selection section 460 to further select as the notification mode the third mode of making the notification of both of the target grounding time and the target flying time. It is also possible for the notification mode selection section 460 to further select as the notification mode the fourth mode of making no notification of any of the target grounding time and the target flying time.

The notification control section 450 includes a sound/vibration control section 452 and a display control section 454.

The sound/vibration control section 452 performs the control for periodically making the notification of at least one of the target grounding time and the target flying time using a sound or a vibration during running of the user in accordance with the notification mode having been selected by the notification mode selection section 460.

Specifically, the sound/vibration control section 452 generates the sound information (the sound data) or the vibration information (the vibration data) for generating the sound or the vibration, which is defined in the notification control table 134 in the target grounding time and the target flying time with respect to the notification node thus selected, and then transmits the sound information or the vibration information to the sound output section 180 or the vibratory section 190.

Figure 27A:
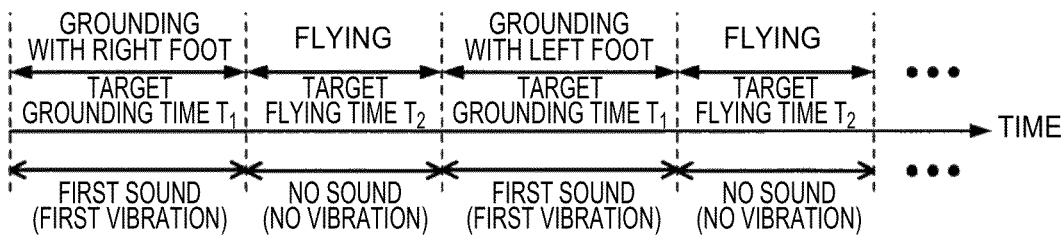
FIGS. 27A through 27D are explanatory diagrams of a notification method of target grounding time and target flying time.

In the case in which the first mode has been selected, as shown in FIG. 27A, the period of the target grounding time $T_1$ during which the first sound or the first vibration is output, and the period of the target flying time $T_2$ during which neither of the sound and the vibration is output are repeated. Therefore, the user performs running so as to ground the right foot or the left foot in sync with the period of the target grounding time $T_1$ during which the sound or the vibration is output, and to separate the both feet from the ground in sync with the period of the target flying time $T_2$ during which neither of the sound and the vibration is output.

Figure 27B:
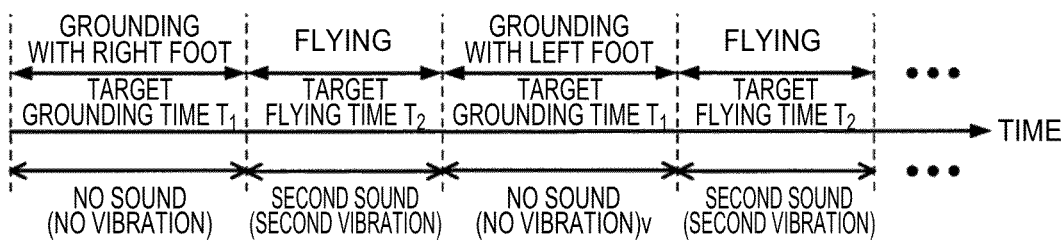

In the case in which the second mode has been selected, as shown in FIG. 27B, the period of the target grounding time $T_1$ during which neither of the sound and the vibration is output, and the period of the target flying time $T_2$ during which the second sound or the second vibration is output are repeated. Therefore, the user performs running so as to ground the right foot or the left foot in sync with the period of the target grounding time $T_1$ during which neither of the sound and the vibration is output, and to separate the both feet from the ground in sync with the period of the target flying time $T_2$ during which the sound or the vibration is output.

Figure 27C:
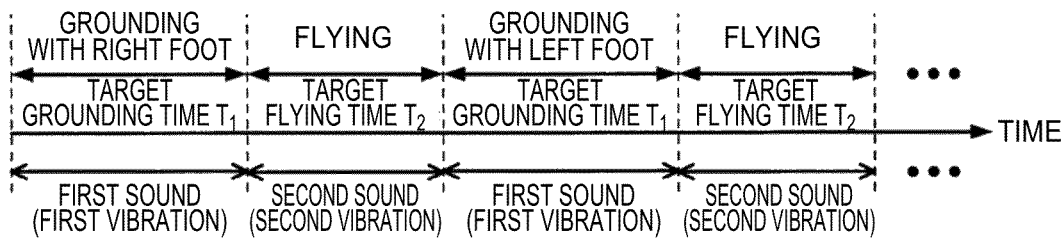

In the case in which the third mode has been selected, as shown in FIG. 27C, the period of the target grounding time $T_1$ during which the first sound or the first vibration is output, and the period of the target flying time $T_2$ during which the second sound or the second vibration is output are repeated. Therefore, the user performs running so as to ground the right foot or the left foot in sync with the period of the target grounding time $T_1$ during which the first sound or the first vibration is output, and to separate the both feet from the ground in sync with the period of the target flying time $T_2$ during which the second sound or the second vibration is output.

Figure 27D:
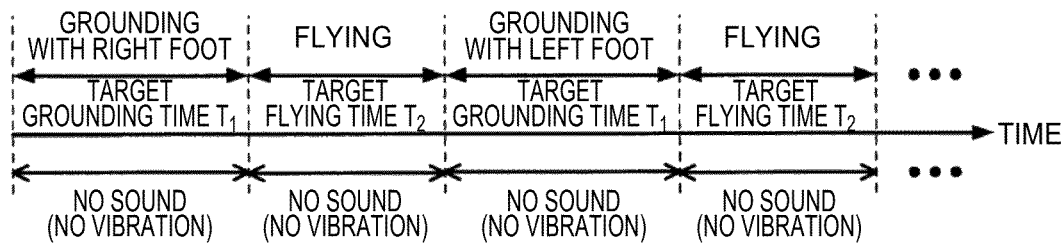

In the case in which the fourth mode has been selected, as shown in FIG. 27D, neither of the sound and the vibration is output in both of the period of the target grounding time $T_1$ and the period of the target flying time $T_2$.

By selecting the first mode, the second mode, or the third mode, and running while using the sound or the vibration as guidance, it is possible for the user to exercise while physically experiencing running with an ideal grounding time and an ideal flying time fitting the target. It is possible for the user to subsequently select the fourth mode to perform the running exercise without relying on the sound or the vibration while being conscious of the running physically experienced in the first mode, the second mode, or the third mode.

The display control section 454 performs the control for making the notification of the running state using display during running of the user or after stopping running.

Figure 28A:
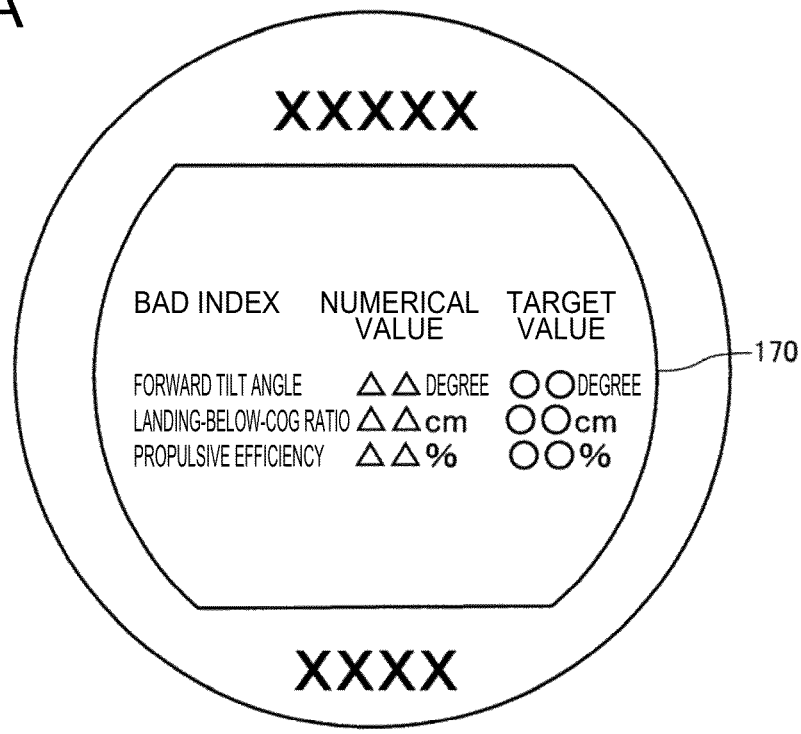
FIGS. 28A and 28B are diagrams showing an example of information displayed on a display section of the notification device according to the second embodiment.

Specifically, the display control section 454 obtains the in-running output information during running of the user, then compares the values of the respective exercise indexes included in the in-running output information with the respective target values set by the target value setting section 400, then generates the display information (e.g., the text data) related to the exercise indexes worse than the respective target values, and then transmits the display information to the display section 170 to make the display section 170 display the display information. It is also possible for the display control section 454 to make the display section 170 display all of the values of the exercise indexes worse than the respective target values and the information of the target values as shown in, for example, FIG. 28A. It is also possible for the user to correctly recognize the differences between the all of the values of the exercise indexes worse than the target values and the respective target values by looking at the information displayed on the display section 170.

Figure 28B:
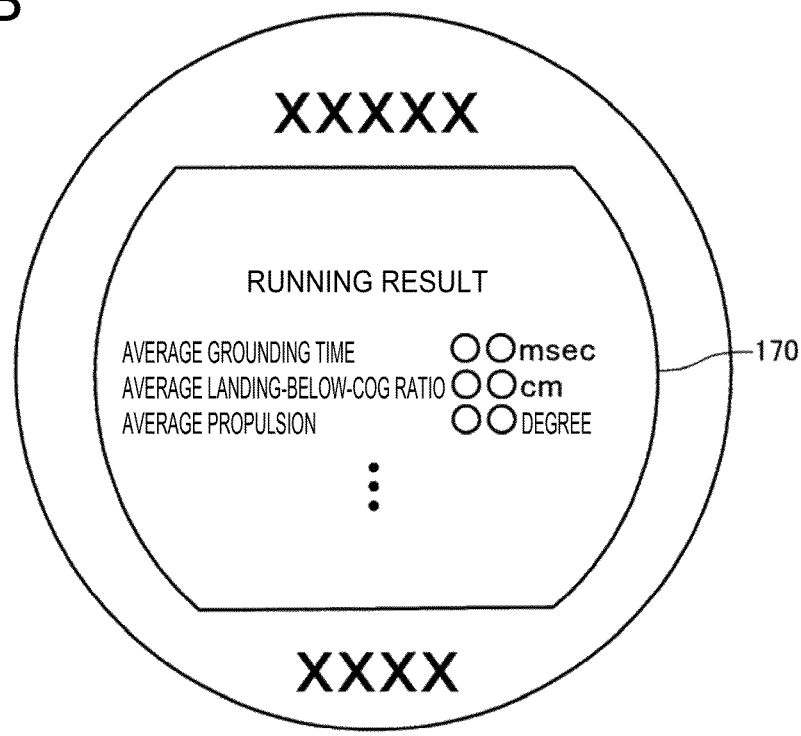

Further, the display control section 454 obtains the running result information after stopping running of the user, then generates the display information (e.g., the text data) related to the running result of the user, and then transmits the display information to the display section 170 to make the display section 170 display the display information. It is also possible for the display control section 454 to make the display section 170 display the average values of the respective exercise indexes during running of the user included in the running result information as shown in, for example, FIG. 28B. It is possible for the user to immediately recognize whether each of the exercise indexes is good or bad by looking at the display section 170 after stopping running (after performing the stopping operation of the measurement).

2-4-3. Procedure of Process

Figure 29:
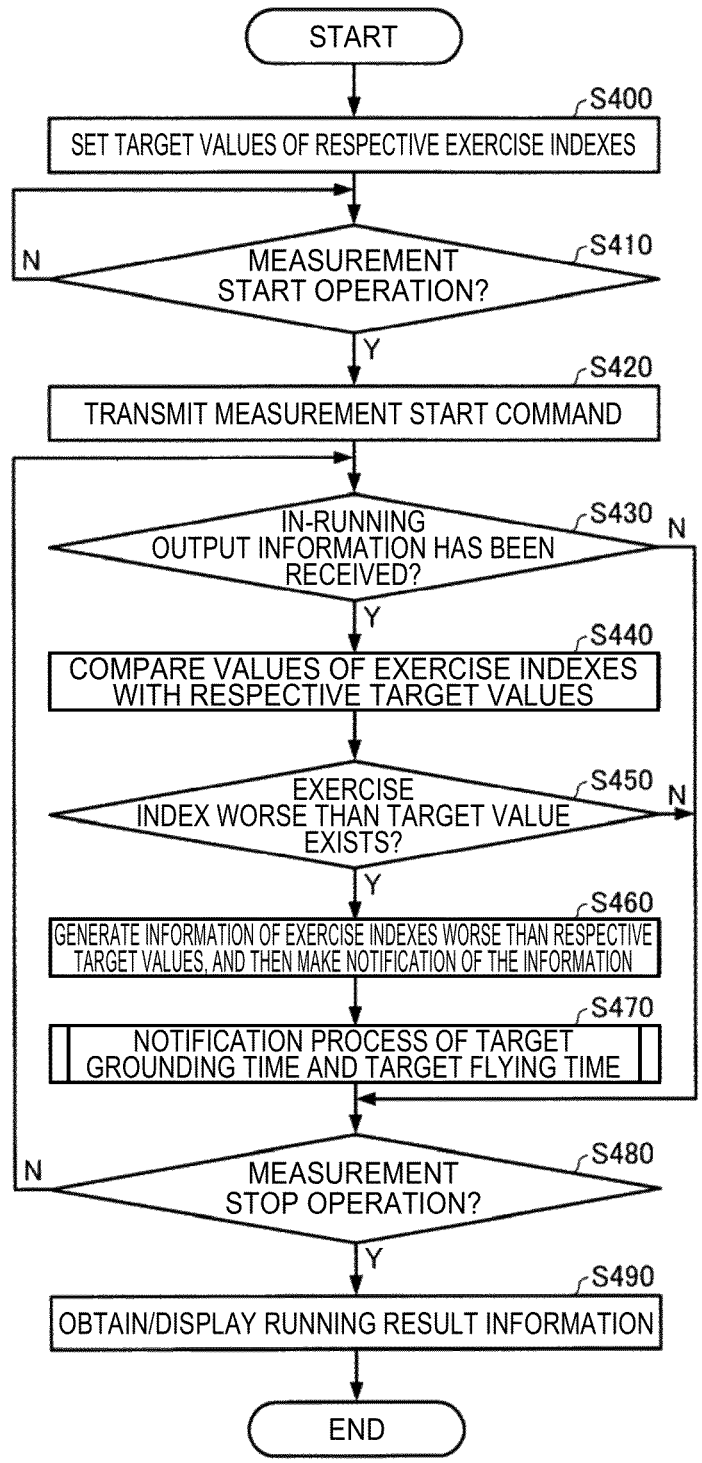
FIG. 29 is a flowchart showing an example of a procedure of a notification process according to the second embodiment.

FIG. 29 is a flowchart showing an example of a procedure of the notification process performed by the processing section 120 of the notification device 3 according to the second embodiment. The processing section 120 (an example of a computer) of the notification device 3 executes the notification program 132 stored in the storage section 130 to thereby execute the notification process under the procedure of, for example, the flowchart shown in FIG. 29.

As shown in FIG. 29, the processing section 120 first sets (S400) the target values of the respective exercise indexes based on the operation data from the operation section 150. It is possible for the processing section 120 to statically set the target grounding time and the target flying time based on the operation data in S400, or to dynamically set the target grounding time and the target flying time in a process in S470 described later.

Then, the processing section 120 waits until the processing section 120 obtains the operation data of starting the measurement from the operation section 150 (N in S410), and in the case in which the processing section 120 has received the operation data of starting the measurement (Y in S410), the processing section 120 transmits (S420) the command of starting the measurement to the exercise analysis device 2 via the communication section 140.

Then, the processing section 120 compares (S440) the values (the calculation values) of the exercise indexes included in the in-running output information obtained with the respective target values set in S400 every time the processing section 120 obtains the in-running output information from the exercise analysis device 2 via the communication section 140 (Y in S430) until the processing section 120 obtains the operation data of stopping the measurement from the operation section 150 (N in S480).

In the case in which the exercise index worse than the target value exists (Y in S450), the processing section 120 generates the information of the exercise index worse than the target value, and then notifies (S460) the user using characters and so on via the display section 170.

In contrast, in the case in which the exercise index worse than the target value does not exist (N in S450), the processing section 120 does not perform the process of S460.

Then, the processing section 120 performs the notification process (S470) of the target grounding time and the target flying time. An example of the procedure of the notification process of the target grounding time and the target flying time will be described later.

Then, when the processing section 120 obtains the operation data of stopping the measurement from the operation section 150 (Y in S480), the processing section 120 obtains the running result information from the exercise analysis device 2 via the communication section 140 to make the display section 170 display (S490) the running result information, and then terminates the notification process.

As described above, it is possible for the user to run while recognizing the running state based on the information, which the user is notified of in S460. Further, it is possible for the user to recognize the running result immediately after stopping running based on the information displayed in S490.

As described above, it is possible for the user to run while recognizing the running state based on the information, which the user is notified of in S460. Further, it is possible for the user to run in accordance with the guidance of the grounding time and the flying time using the sound or the vibration based on the information, which the user is notified of in S470. Further, it is possible for the user to recognize the running result immediately after stopping running based on the information displayed in S490.

Figure 30:
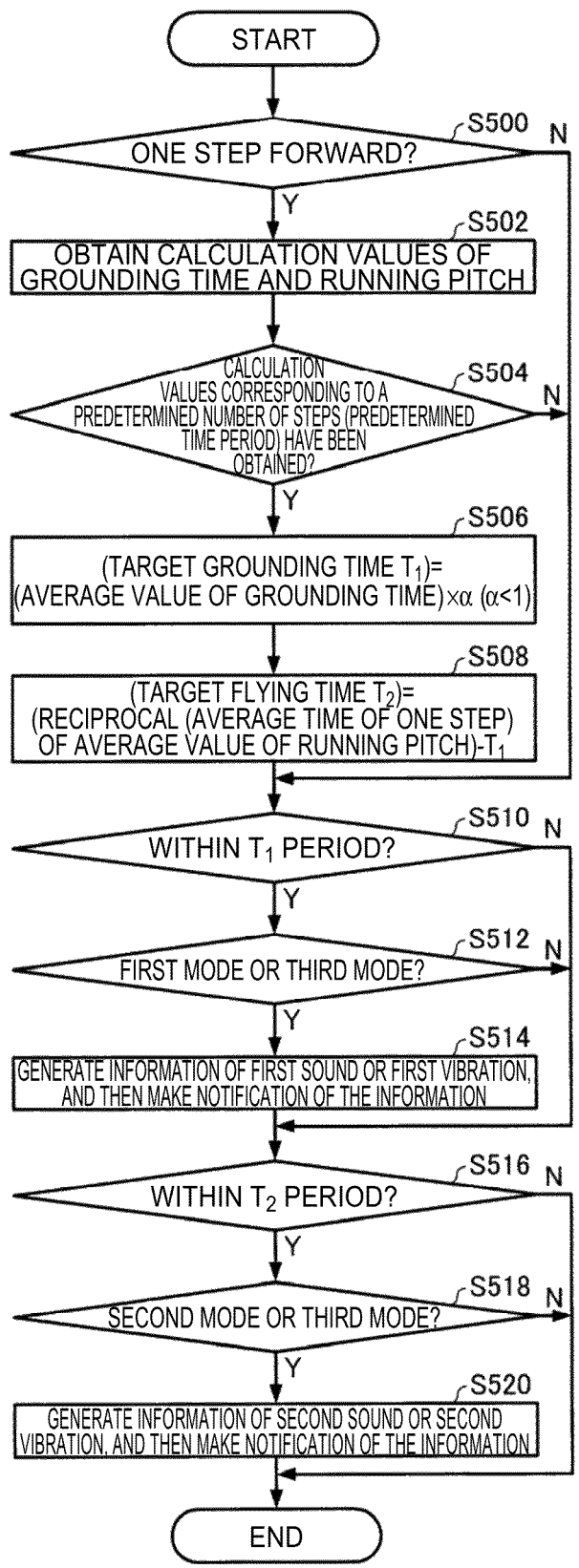
FIG. 30 is a flowchart showing an example of a procedure of the notification process of the target grounding time and the target flying time.

FIG. 30 is a flowchart showing an example of a procedure of the notification process (the process of S470 shown in FIG. 29) of the target grounding time and the target flying time. The processing section 120 executes the notification process of the target grounding time and the target flying time under the procedure of, for example, the flowchart shown in FIG. 30.

Firstly, the processing section 120 determines whether or not the user takes one step forward using the in-running output information obtained in S430 shown in FIG. 29, and in the case in which the user has taken one step forward (Y in S500), the processing section 120 obtains (S502) the calculation values of the grounding time and the running pitch (the number of steps per minute) included in the in-running output information.

Then, the processing section 120 sets (S506) the target grounding time $T_1$ as follows every time the processing section 120 obtains the calculation values of the grounding time and the running pitch corresponding to a predetermined number of steps (e.g., 100 steps) (or a predetermined time period (e.g., one minute)) (Y in S504).

(target grounding time $T_1$)=(average value (average grounding time) of the grounding time corre-sponding to the predetermined number of steps (or a predetermined time period))×α (α<1)

Further, the processing section 120 sets (S508) the target flying time $T_2$ as follows.

(target flying time $T_2$)=(reciprocal (average time of one step) of the average value of the running pitch corresponding to a predetermined number of steps (or a predetermined time period))−$T_1$ For example, assuming that the average grounding time is 0.2 second, and the average time of one step is 0.3 second, the processing section 120 sets the target grounding time $T_1$ and the target flying time $T_2$ as follows using α=0.9, for example.

(target grounding time $T_1$)=0.2×0.9=0.18 second (target flying time $T_2$)=0.3−0.18=0.12 second In the case in which the user fails to take one step forward (N in S500), the processing section 120 does not perform the process corresponding to S500 through S508.

Then, if it is in the period of the target grounding time $T_1$ (Y in S510), in the case in which the first mode or the third mode has been selected (Y in S512), the processing section 120 generates the information of the first sound or the first vibration defined in the notification control table 134, and then makes the sound output section 180 or the vibratory section 190 make the notification (S514) of the fact that it is in the period of the target grounding time $T_1$ using the sound or the vibration.

In the case in which neither of the first mode and the third mode has been selected (N in S512), the processing section 120 does not perform the process in S514. Further, it is not in the period of the target grounding time $T_1$ (N in S510), the processing section 120 does not perform the process corresponding to S512 and S514.

Then, if it is in the period of the target flying time $T_2$ (Y in S516), in the case in which the second mode or the third mode has been selected (Y in S518), the processing section 120 generates the information of the second sound or the second vibration defined in the notification control table 134, and then makes the sound output section 180 or the vibratory section 190 make the notification (S520) of the fact that it is in the period of the target flying time $T_2$ using the sound or the vibration.

In the case in which neither of the second mode and the third mode has been selected (N in S518), the processing section 120 does not perform the process in S520. Further, it is not in the period of the target flying time $T_2$ (N in S516), the processing section 120 terminates the process without performing the process corresponding to S518 and S520.

Figure 31:
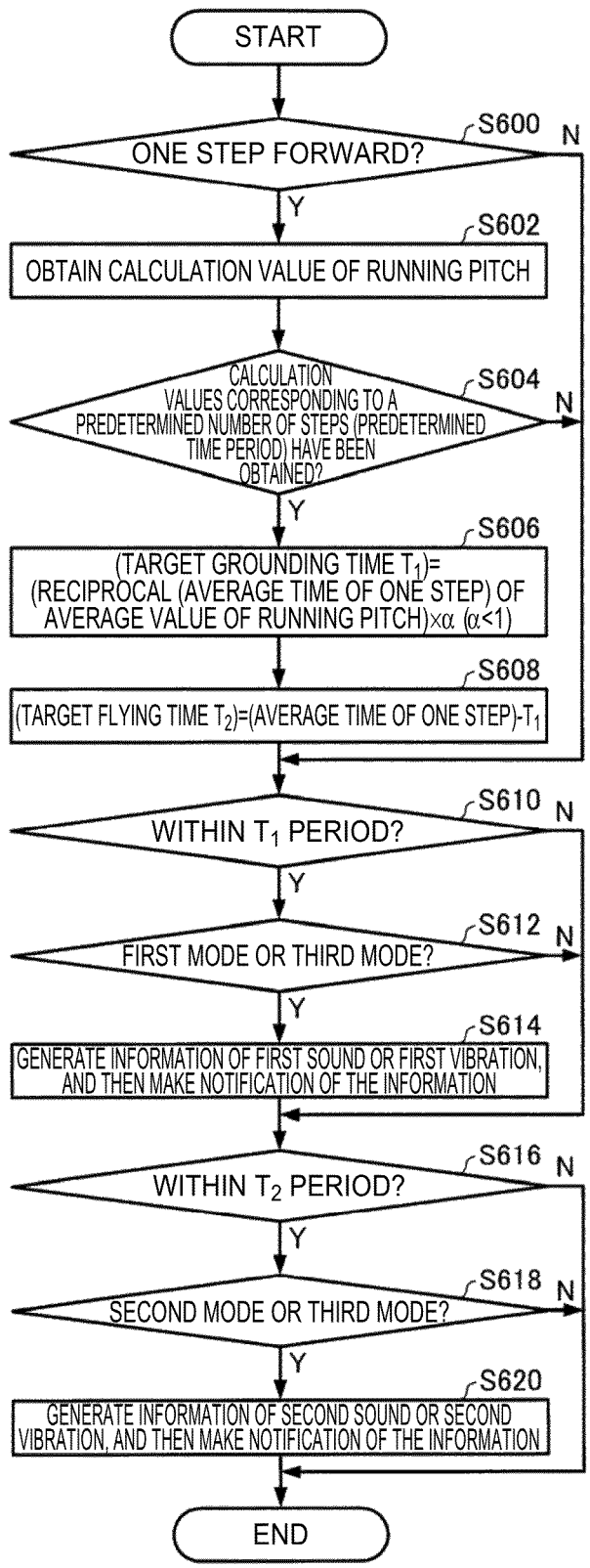
FIG. 31 is a flowchart showing another example of the procedure of the notification process of the target grounding time and the target flying time.

FIG. 31 is a flowchart showing another example of a procedure of the notification process (the process of S470 shown in FIG. 29) of the target grounding time and the target flying time. It is also possible for the processing section 120 to execute the notification process of the target grounding time and the target flying time under the procedure of, for example, the flowchart shown in FIG. 31.

Firstly, the processing section 120 determines whether or not the user takes one step forward using the in-running output information obtained in S430 shown in FIG. 29, and in the case in which the user has taken one step forward (Y in S600), the processing section 120 obtains (S602) the calculation value of the running pitch (the number of steps per minute) included in the in-running output information.

Then, the processing section 120 sets (S606) the target grounding time $T_1$ as follows every time the processing section 120 obtains the calculation value of the running pitch corresponding to a predetermined number of steps (or a predetermined time period) (Y in S604).

(target grounding time $T_1$)=(reciprocal (average time of one step) of the average value of the running pitch corresponding to a predetermined number of steps (or a predetermined time period))×α ($\alpha<1$)

Further, the processing section 120 sets (S608) the target flying time $T_2$ as follows.

(target flying time $T_2$)=(average time of one step)−$T_1$

For example, assuming the average time of one step as 0.3 second, the processing section 120 sets the target grounding time $T_1$ and the target flying time $T_2$ as follows using α=0.6, for example.

(target grounding time $T_1$)=0.3×0.6=0.18 second (target flying time $T_2$)=0.3−0.18=0.12 second It is also possible for the processing section 120 to set the target grounding time $T_1$ and the target flying time $T_2$ in S606 and S608 using table information defining the correspondence relationship between the time of one step, and the target grounding time and the target flying time.

In the case in which the user fails to take one step forward (N in S600), the processing section 120 does not perform the process corresponding to S600 through S608.

Thereafter, the processing section 120 performs the process corresponding to S610 through S620 similarly to S510 through S520 shown in FIG. 30.

Figure 32:
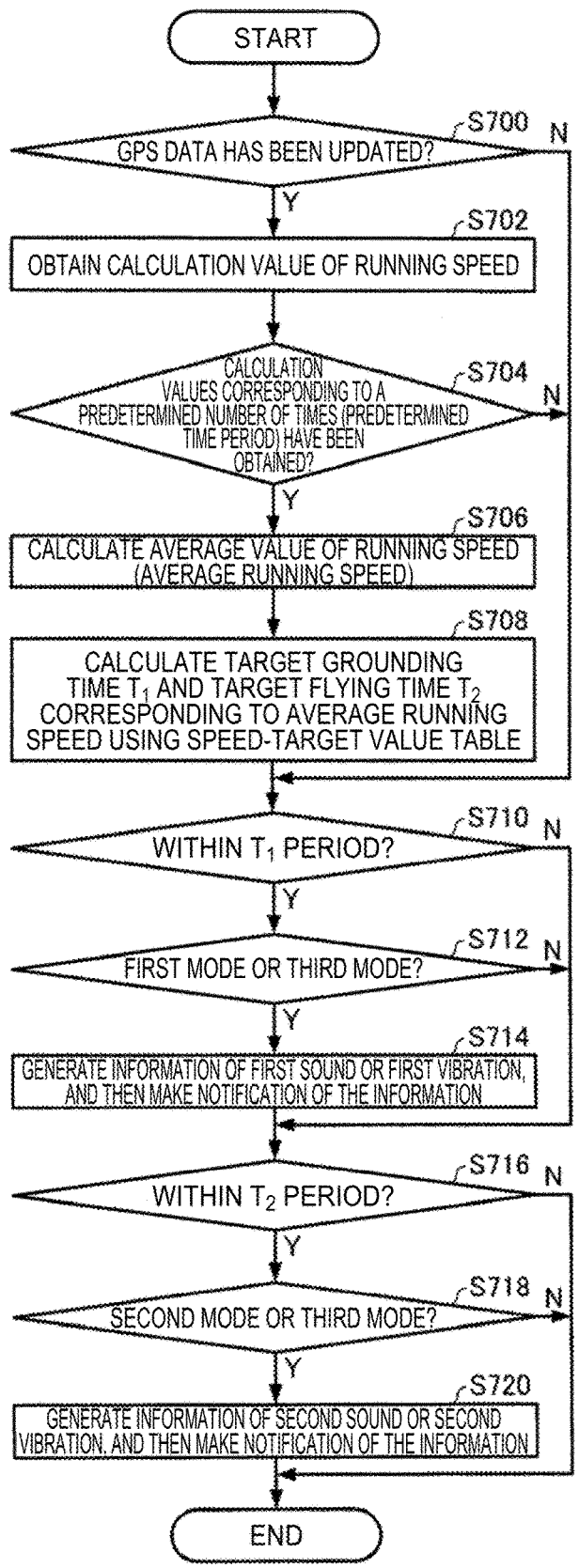
FIG. 32 is a flowchart showing another example of the procedure of the notification process of the target grounding time and the target flying time.

FIG. 32 is a flowchart showing another example of a procedure of the notification process (the process of S470 shown in FIG. 29) of the target grounding time and the target flying time. It is also possible for the processing section 120 to execute the notification process of the target grounding time and the target flying time under the procedure of, for example, the flowchart shown in FIG. 32.

Firstly, the processing section 120 determines whether or not the GPS data calculated by the GPS unit 110 has been updated, and in the case in which the GPS data has been updated (Y in S700), the processing section 120 obtains (S702) the calculation value of the running speed included in the GPS data. It is also possible for the processing section 120 to, for example, determine whether or not the user has taken one step forward, and then obtain the calculation value of the running speed included in the in-running output information in the case in which the user has taken one step forward instead of the process in the S700 and S702.

Then, the processing section 120 calculates (S706) the average value (the average running speed) of the running speed every time the processing section 120 obtains the calculation value of the running speed corresponding to a predetermined number of times (or a predetermined time period) (Y in S704). Then, the processing section 120 calculates (S708) the target ground time $T_1$ and the target flying time $T_2$ corresponding to the average running speed using the speed-target value table 136. Specifically, in the case in which the target grounding time and the target flying time at the speed equal to the average running speed are defined in the speed-target value table 136, the processing section 120 uses the target grounding time and the target flying time as $T_1$, $T_2$, and in the case in which the target grounding time and the target flying time at the speed equal to the average running speed are not defined, the processing section 120 calculates $T_1$, $T_2$ by linear interpolation or the like using, for example, the target grounding time and the target flying time at defined speeds around the average running speed.

It is also possible for the processing section 120 to calculate the target grounding time $T_1$ and the target flying time $T_2$ in S706 and S708 using calculation formulas of the target grounding time and the target flying time each using the running speed as a variable.

In the case in which the GPS data has not been updated (N in S700), the processing section 120 does not perform the process corresponding to S700 through S708.

Thereafter, the processing section 120 performs the process corresponding to S710 through S720 similarly to S510 through S520 shown in FIG. 30.

Figure 33:
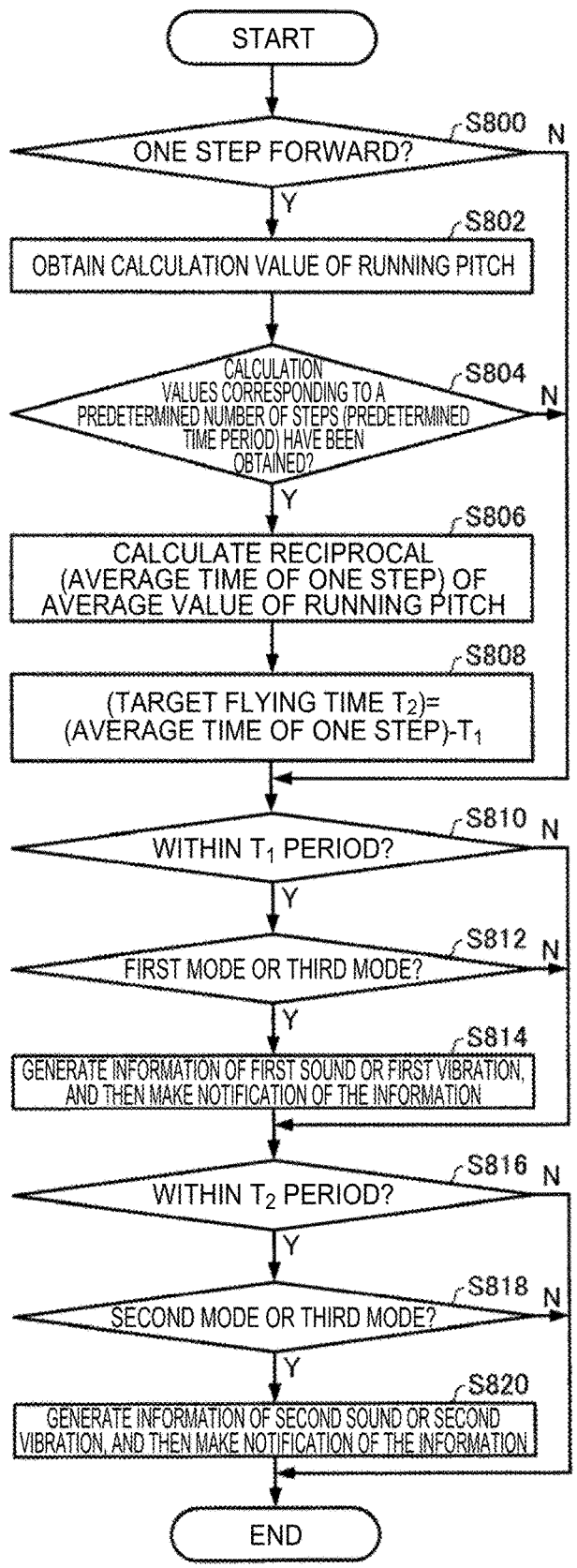
FIG. 33 is a flowchart showing another example of the procedure of the notification process of the target grounding time and the target flying time.

FIG. 33 is a flowchart showing another example of a procedure of the notification process (the process of S470 shown in FIG. 29) of the target grounding time and the target flying time. It is also possible for the processing section 120 to execute the notification process of the target grounding time and the target flying time under the procedure of, for example, the flowchart shown in FIG. 33.

Firstly, the processing section 120 determines whether or not the user takes one step forward using the in-running output information obtained in S430 shown in FIG. 29, and in the case in which the user has taken one step forward (Y in S800), the processing section 120 obtains (S802) the calculation value of the running pitch (the number of steps per minute) included in the in-running output information.

Then, the processing section 120 calculates (S806) the reciprocal (the average time of one step) of the average value of the running pitch every time the processing section 120 obtains the calculation value of the running pitch corresponding to a predetermined number of steps (or a predetermined time period) (Y in S804). Then, the processing section 120 sets (S808) the target flying time $T_2$ as follows using the target grounding time (the target grounding time input by the user) $T_1$ having previously been set in S400 shown in FIG. 29.

(target flying time $T_2$)=(average time of one step)−$T_1$

In the case in which the user fails to take one step forward (N in S800), the processing section 120 does not perform the process corresponding to S800 through S808.

Thereafter, the processing section 120 performs the process corresponding to 810 through S820 similarly to S510 through S520 shown in FIG. 30.

2-5. Advantages

According to the second embodiment, since the notification device 3 makes the notification of the timing of the target grounding time and the timing of the target flying time during running of the user, it is possible for the user to exercise running high in efficiency, running difficult to get tired, and so on.

Further, according to the second embodiment, since the notification device 3 makes the notification of the timing of the target grounding time and the timing of the target flying time using the sound or the vibration, it is possible for the user to recognize such timing during running without relying on the visual sense.

Further, according to the second embodiment, since the notification device 3 makes the notification of the timing of the target grounding time and the notification of the timing of the target flying time using respective sounds or vibrations different in type from each other, it is possible for the user to identify which one of the timing of the grounding time to be the target and the timing of the flying time to be the target is included in the notification.

Further, according to the second embodiment, it is possible for the user to select one of the mode of making the notification of only either one of the timing of the target grounding time and the timing of the target flying time, the mode of making the notification of both of the timing of the target grounding time and the timing of the target flying time, and the mode of making no notification of any of the timing of the target grounding time and the timing of the target flying time depending on the taste of the user.

Further, according to the second embodiment, it is possible for the exercise analysis device 2 to accurately analyze the exercise of the user using the measurement data of the inertial measurement unit 10 capable of detecting fine movements of the regions of the user. Further, it is possible for the notification device 3 to make the notification of the more appropriate timing of the target grounding time and the more appropriate timing of the target flying time in accordance with the running state of the user by changing the setting of the target grounding time and the target flying time in accordance with the information of the grounding time, the running pitch, the running speed, and so on of the user analyzed by the exercise analysis device 2. Therefore, it is possible for the user to efficiently perform the running exercise.

3. Third Embodiment

3-1. System Configuration

Figure 34:
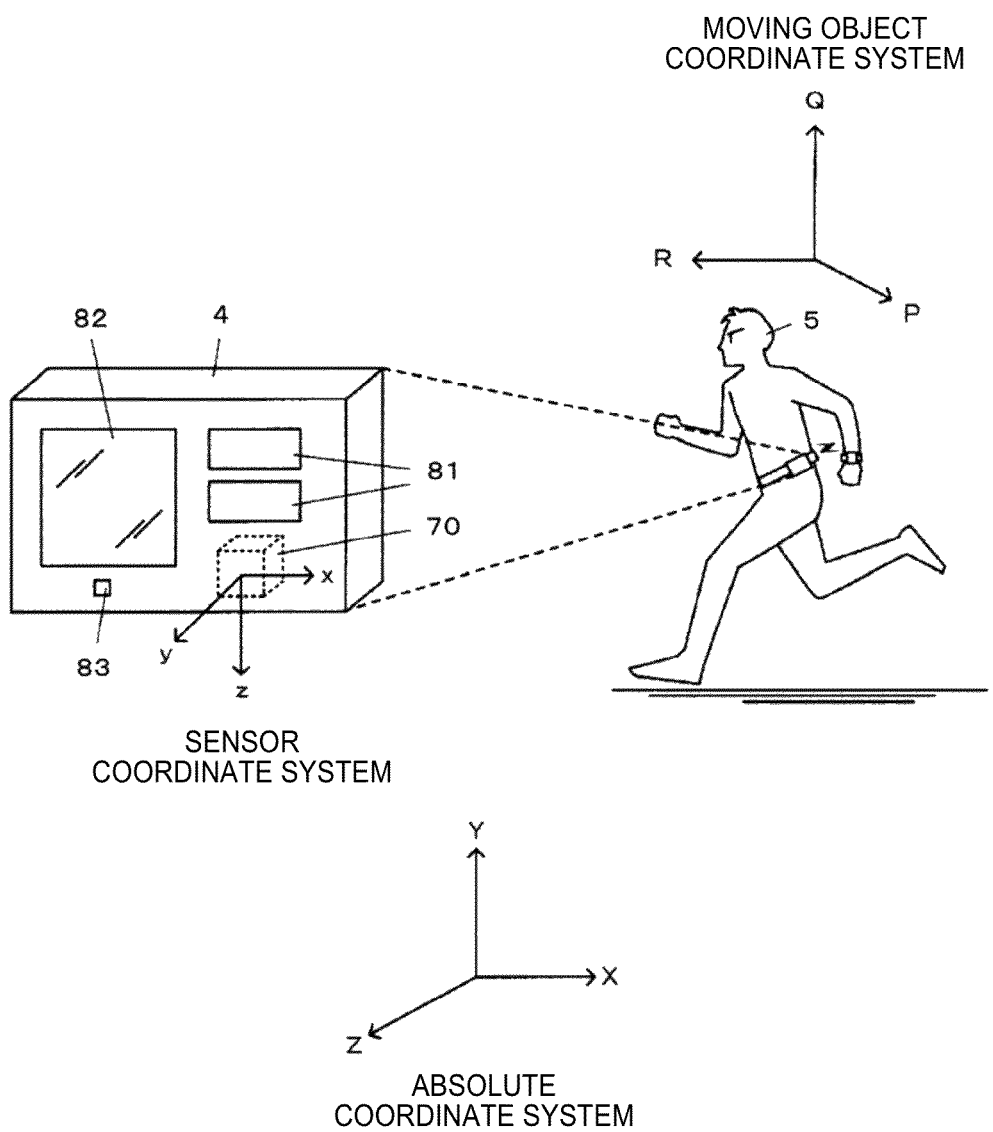
FIG. 34 is a diagram showing a configuration example of a portable electronic apparatus according to a third embodiment of the invention.

FIG. 34 is a diagram showing a configuration example of a portable electronic apparatus 4 according to the third embodiment. The portable electronic apparatus 4 is used while attached to the body portion or the waist portion of the user 5 when running. The portable electronic apparatus 4 is provided with operation switches 81, a display 82, a speaker 83, and so on, and at the same time incorporates an inertial measurement unit (IMU) 70 and a control device (not shown) having a central processing unit (CPU) III and a memory mounted.

The IMU 70 is a sensor unit having an acceleration sensor and a gyro sensor, and is a body motion detecting sensor for detecting the body motion of the user 5. The acceleration sensor detects the acceleration in a sensor coordinate system (a local coordinate system) as a three-dimensional Cartesian coordinate system (x, y, z) associated with the sensor. The gyro sensor detects the angular velocity in a sensor coordinate system as a three-dimensional Cartesian coordinate system (x, y, z) associated with the sensor.

It should be noted that although the explanation will be presented assuming that the sensor coordinate system of the acceleration sensor and the sensor coordinate system of the gyro sensor are the same in coordinate axes as each other, in the case in which they are different from each other, it is possible to transform one coordinate system into the other coordinate system by performing coordinate transformation matrix calculation. Regarding the coordinate transformation matrix calculation, a known method can be applied.

The portable electronic apparatus 4 is capable of calculating the position, the speed, the attitude, and so on of the apparatus by performing the inertial navigation calculation using the measurement result of the IMU 70. Further, the portable electronic apparatus 4 is also an exercise support device, which determines whether or not the running form of the user 5 is in an unstable state using the calculation result of the inertial navigation calculation, and then makes a predetermined notification to the user 5 in case of the unstable state. As the notification to the user 5, there can be cited, for example, display of a notification screen on the display 82, and output of a notification sound from the speaker 83.

Here, there are defined a moving object coordinate system and an absolute coordinate system. The moving object coordinate system is a three-dimensional Cartesian coordinate system (P, Q, R) associated with the user 5, wherein the proceeding direction (way) of the user 5 is defined as an R-axis positive direction, a vertically upward direction is defined as a Q-axis positive direction, and a right and left direction of the user 5 perpendicular to each of the R axis and the Q axis is defined as P-axis direction. The absolute coordinate system is a three-dimensional coordinate system (X, Y, Z) determined as, for example, an earth-centered earth-fixed (ECEF) coordinate system, wherein the Y-axis positive direction corresponds to the vertically upward direction, and the X, Z axes are in the horizontal direction.

3-2. Principle (A) Lactate Accumulation State

In running, it is important to run stably in a good running form. However, it has been known that if the lactate accumulation occurs in a muscle due to continuous running, muscle weakness occurs due to restriction of energy metabolism, and thus, the running form becomes worse to destabilize the state.

Therefore, in the present embodiment, in the case in which the amplitude value of the vibration along the vertical direction of the user 5 in running has exceeded a threshold value, the portable electronic apparatus 4 determines that the running form is in an unstable state to make a notification of the fact that the form is in the unstable state. Specifically, the portable electronic apparatus 4 determines whether the running form is in the stable state or in the unstable state based on the vertical vibration as one of the exercise indexes, and then presumptively determines the lactate accumulation state from the determination result. The vertical vibration is the amplitude (a deflection width) of the vibration in the vertical direction of the user, and can be calculated from the change of the position in the vertical direction obtained by the inertial navigation calculation. The smaller the vertical amplitude is, the more stable the running form is, and in contrast, the larger the vertical amplitude is, the more unstable the running form is.

(B) Running Form

As representative running forms of the running exercise, there can be cited a long-stride running, which has a long stride length, and a short-stride running, which has a relatively short stride length, but is high in running pitch instead. A difference between the two running forms appears in the difference in cadence (pitch) and stride as the exercise indexes. Specifically, the short-stride running is higher in cadence, but in contrast, the long-stride running is longer in stride.

(C) Recommendation of Running Form

Incidentally, it has been known that in the case of continuing an exercise in the same running form, the lactate accumulation occurs in the muscle of a specific region corresponding to the running form. Therefore, in the case in which running is continued in the same running form, and the lactate accumulation has occurred, the portable electronic apparatus 4 according to the present embodiment notifies the user of the recommendation of a running form different from the current running form in order to remove or relax the lactate having been accumulated.

3-3. Functional Configuration

Figure 35:
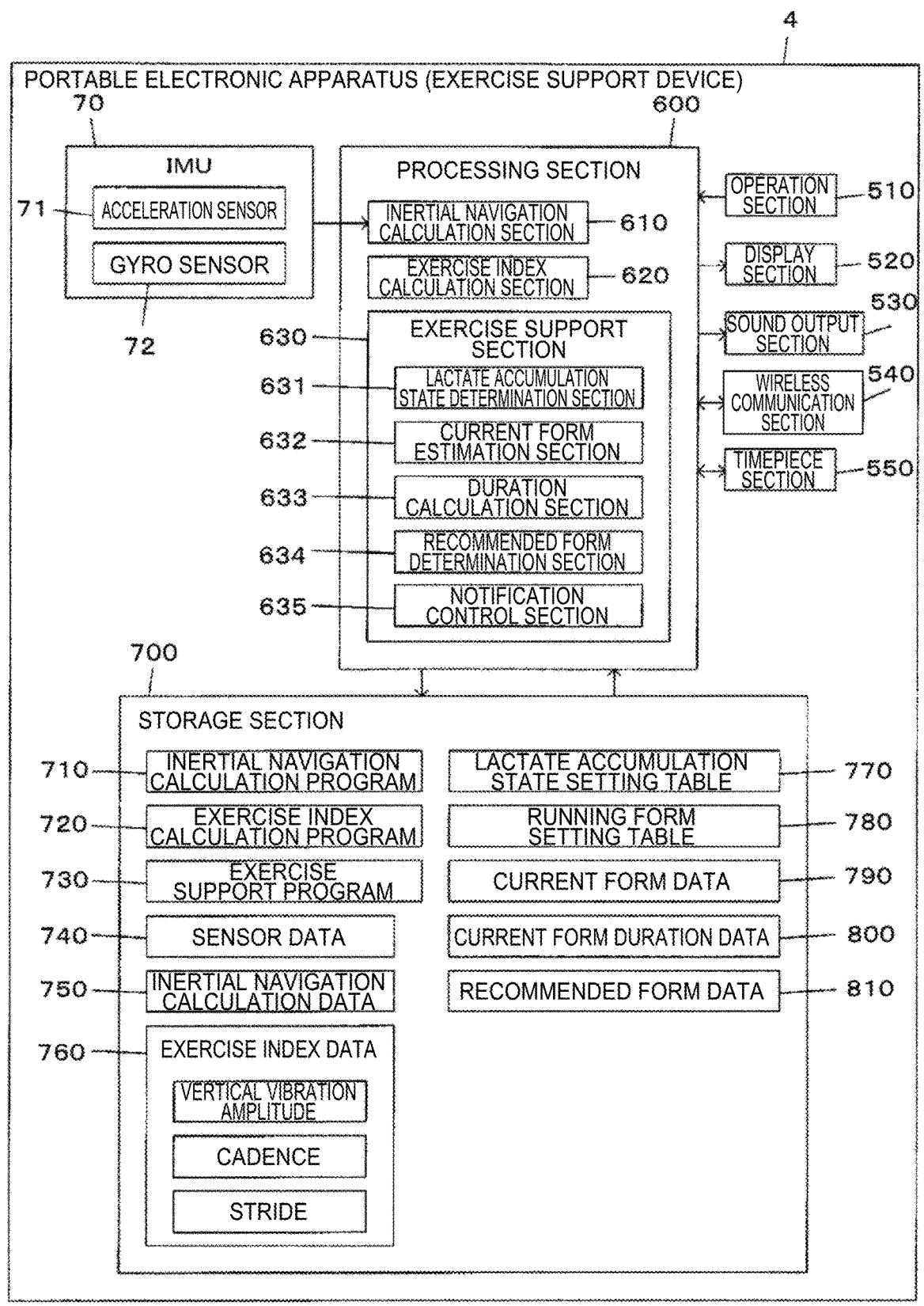
FIG. 35 is a functional configuration diagram of the portable electronic apparatus.

FIG. 35 is a block diagram showing a functional configuration of the portable electronic apparatus 4. According to FIG. 35, the portable electronic apparatus 4 is configured including the IMU 70, an operation section 510, a display section 520, a sound output section 530, a wireless communication section 540, a timepiece section 550, a processing section 600, and a storage section 700.

The IMU 70 has the acceleration sensor 71 and the gyro sensor 72. The acceleration sensor 71 detects the acceleration in each of the axes (the x axis, the y axis, and the z axis) of the sensor coordinate system. The gyro sensor 72 detects the angular velocity in each of the axes (the x axis, the y axis, and the z axis) of the sensor coordinate system. The acceleration (the sensor coordinate acceleration) detected by the acceleration sensor 71, and the angular velocity (the sensor coordinate angular velocity) detected by the gyro sensor 72 are stored in an accumulative manner as sensor data 740 so as to be associated with the measurement time.

The operation section 510 is implemented by an input device such as a touch panel or button switches, and outputs the operation signal corresponding to the operation performed thereon to the processing section 600. The operation switches 81 shown in FIG. 34 correspond to the operation section 510.

The display section 520 is implemented by a display device such as a liquid crystal display (LCD), and performs a variety of types of display based on a display signal from the processing section 600. The display 82 shown in FIG. 34 corresponds to the display section 520.

The sound output section 530 is implemented by a sound output device such as a speaker, and performs a variety of types of sound output based on a sound signal from the processing section 600. The speaker 83 shown in FIG. 34 corresponds to the sound output section 530.

The wireless communication section 540 is implemented by a wireless communication device compatible with a wireless local area network (LAN), Bluetooth (registered trademark), or the like, and performs communication with an external device.

The timepiece section 550 is an internal timepiece of the portable electronic apparatus 4, formed of an oscillator circuit provided with a quartz crystal oscillator, and outputs a time signal such as the current time measured or elapsed time from a designated timing to the processing section 600.

The processing section 600 is implemented by an arithmetic device such as a CPU, and performs overall control of the portable electronic apparatus 4 based on programs and data stored in the storage section 700, the operation signal from the operation section 510, and so on. In the present embodiment, the processing section 600 includes an inertial navigation calculation section 610, an exercise index calculation section 620, and an exercise support section 630.

The inertial navigation calculation section 610 performs an inertial navigation calculation process using the detection result (the sensor coordinate acceleration detected by the acceleration sensor 71, and the sensor coordinate angular velocity detected by the gyro sensor 72) of the IMU 70 to calculate a position (absolute coordinate position), a speed (absolute coordinate speed), and an attitude angle (absolute coordinate angle) in the absolute coordinate system. In the inertial navigation calculation process, the coordinate transformation from the sensor coordinate system (x, y, z) to the moving object coordinate system (P, Q, R) and the absolute coordinate system (X, Y, Z) is performed.

The detailed explanation will be presented. Referring to the fact that the force acting on the user when the user is in the rest state is the gravitational acceleration alone, and the fact that the force acting on the user when the user starts moving is the acceleration in the moving direction alone besides the gravitational acceleration, the initial attitude angle (the absolute coordinate attitude angle) of the IMU 70 in the absolute coordinate system is obtained from the detection result of the IMU 70. Therefore, the moving object coordinate system (P, Q, R) in the initial state can be defined, and the coordinate transformation matrix from the sensor coordinate system to the moving object coordinate system can be obtained. Therefore, the inertial navigation calculation is implemented by occasionally calculating the moving velocity vector in the moving object coordinate system from the detection result of the IMU 70 after setting the movement start position of the user, and then accumulating the moving velocity vector in a replenishing manner. By designating the movement start position on the absolute coordinate system, it results that the position and the speed during running in the absolute coordinate system are obtained.

Further, since the direction of the user can occasionally be figured out by occasionally correcting the absolute coordinate attitude angle using the detection value of the gyro sensor 72, the moving object coordinate system is occasionally updated, and the absolute coordinate position, the absolute coordinate speed, and the absolute coordinate attitude angle during the movement of the user are obtained as the calculation result due to the inertial navigation.

However, the R-axis direction (see FIG. 34) of the moving object coordinate system during running varies in accordance with the direction of the body of the user 5 in running. Specifically, when running, since the user 5 steps out with the legs in the order of left to right, the user 5 proceeds while twisting the body portion including the waist alternately clockwise and counterclockwise. In other words, since the direction of the body portion swings from side to side, in the moving object coordinate system defining the direction of the body portion as the R-axis direction, it results that the yaw angle changes periodically. As a result, if the moving velocity vectors obtained in the moving object coordinate system are simply accumulated in a replenishing manner, the absolute coordinate position, the absolute coordinate speed, and the absolute coordinate attitude angle cannot accurately be obtained due to errors mixed therein.

Therefore, assuming the clockwise and counterclockwise rotations (twist) of the body portion as noise, a correction process for correcting the errors in the calculation result by the inertial navigation method is performed to correct the moving object coordinate system. Specifically, by applying the Kalman filter process setting the state vector X as the variations (the differences between the previous values and the current values; errors) of the respective values, namely the absolute velocity vector, the absolute coordinate attitude angle, the absolute coordinate position, and the yaw angle, and setting the observation value Z as a variation of the yaw angle obtained from the detection value of the gyro sensor 72, the absolute coordinate speed, the absolute coordinate attitude angle, and the absolute coordinate position are corrected. As a result of the correction process, the variation of the yaw angle can be suppressed, and the proceeding direction of the user 5, namely the R-axis direction of the moving object coordinate system, is corrected. In the present embodiment, it is assumed that the inertial navigation calculation section 610 occasionally performs the calculation process obtained by incorporating the correction process using the Kalman filter in the inertial navigation calculation of the related art. The process hereinafter simply referred to as the "inertial navigation calculation" or the "inertial navigation calculation process" is the process incorporating the correction process described above.

The calculation result of the inertial navigation calculation by the inertial navigation calculation section 610 is stored as inertial navigation calculation data 750. The inertial navigation calculation data 750 includes the data of the speed, the position, and the attitude angle at each time in the absolute coordinate system, and the data of the acceleration, the speed, and the position at each time in the moving object coordinate system.

The exercise index calculation section 620 calculates a variety of exercise indexes based on the inertial navigation calculation result by the inertial navigation calculation section 610. Specifically, the values of the vertical vibration amplitude, the cadence, and the stride are calculated as the exercise indexes. The exercise index values calculated by the exercise index calculation section 620 are stored as exercise index data 760.

The exercise support section 630 includes a lactate accumulation state determination section 631, a current form estimation section 632, a duration calculation section 633, a recommended form determination section 634, and a notification control section 635, and determines whether or not the running form of the user 5 is in the unstable state, and then performs exercise support of, for example, making a predetermined notification in case of the unstable state.

The lactate accumulation state determination section 631 determines the accumulation state of the lactate in accordance with the exercise index calculated by the exercise index calculation section 620. Specifically, the lactate accumulation state determination section 631 refers to a lactate accumulation state setting table 770 to determine the accumulation level and the accumulation state of the lactate corresponding to the vertical vibration amplitude as the exercise index.

FIG. 36 is a diagram showing a data configuration example of the lactate accumulation state setting table 770. According to FIG. 36, the lactate accumulation state setting table 770 stores the lactate accumulation level 772 and the lactate accumulation state 773 so as to be associated with the vertical vibration amplitude 771. In the drawing, it is defined that the higher the vertical vibration amplitude 771 is, the higher the lactate accumulation level is, and that the lactate accumulation state 773 is in a "high accumulation state" if the accumulation level is equal to or higher than a threshold value of "5." A normal state as the accumulation state 773 corresponds to the stable state of the running form, and the high accumulation state corresponds to the unstable state of the running form. It should be noted that although the threshold value for determining the high accumulation state is set to "5" or higher in the accumulation level, "4" or higher is also possible. Further, it is also possible to define the threshold value using the value of the vertical vibration amplitude.

The current form estimation section 632 estimates the current running form of the user 5 in accordance with the exercise index calculated by the exercise index calculation section 620. Specifically, the current form estimation section 632 refers to a running form setting table 780 to estimate the running form corresponding to the values of the cadence and the stride as the exercise indexes.

FIG. 37 is a diagram showing a data configuration example of the running form setting table 780. According to FIG. 37, the running form setting table 780 stores the ranges of each of the cadence and the stride as the exercise indexes 782 so as to be associated with the respective items of the running form 781.

The current form estimation section 632 assumes the running form, which has the ranges defined in the running form setting table 780 and respectively satisfied by the values of the cadence and the stride thus calculated, as the current running form. It should be noted that in the case in which there is no running form having the ranges both satisfied by the respective values of the cadence and the stride thus calculated, the current running form estimated previously is directly assumed as the current running form. The current running form estimated by the current form estimation section 632 is stored as current form data 790.

The duration calculation section 633 calculates the duration of the current running form estimated by the current form estimation section 632. Specifically, it is assumed that the duration is counted using a timer system. The duration calculation section 633 compares the types of the latest running form thus estimated and the running form estimated previously with each other, and continues to count the duration if the types are the same, or resets the duration if the types are different from each other. The duration calculated by the duration calculation section 633 is stored as current form duration data 800.

In the case in which the lactate accumulation state determination section 631 has determined the high accumulation state of the lactate, and the duration of the current running form calculated by the duration calculation section 633 is equal to or longer than a predetermined time period, the recommended form determination section 634 determines a running form different from the current running form as the running form to be recommended. The running form to be recommended, which has been determined by the recommended form determination section 634 is stored as recommended form data 810.

The notification control section 635 controls a variety of types of notification related to the exercise support. Specifically, the notification control section 635 notifies the user 5 of the running form to be recommended determined by the recommended form determination section 634, the lactate accumulation level and the lactate accumulation state determined by the lactate accumulation state determination section 631, and the current running form estimated by the current form estimation section 632 by making the display section 520 display these items, or by making these items be output from the sound output section 530 as sounds.

The storage section 700 is implemented by a storage device such as a ROM (read only memory) or a RAM (random access memory), and stores programs, data, and so on for the processing section 600 to integrally control the portable electronic apparatus 4, and at the same time, is used as the working area of the processing section 600, and temporarily stores the result of the calculation performed by the processing section 600 with a variety of programs, the sensor data from the IMU 70, and so on. In the present embodiment, the storage section 700 stores an inertial navigation calculation program 710, an exercise index calculation program 720, an exercise support program 730, the sensor data 740, the inertial navigation calculation data 750, the exercise index data 760, the lactate accumulation state setting table 770, the running form setting table 780, the current form data 790, the current form duration data 800, and the recommended form data 810.

The inertial navigation calculation program 710 is a program for making the processing section 600 function as the inertial navigation calculation section 610, the exercise index calculation program 720 is a program for making the processing section 600 function as the exercise index calculation section 620, and the exercise support program 730 is a program for making the processing section 600 function as the exercise support section 630.

3-4. Process Flow

Figure 38:
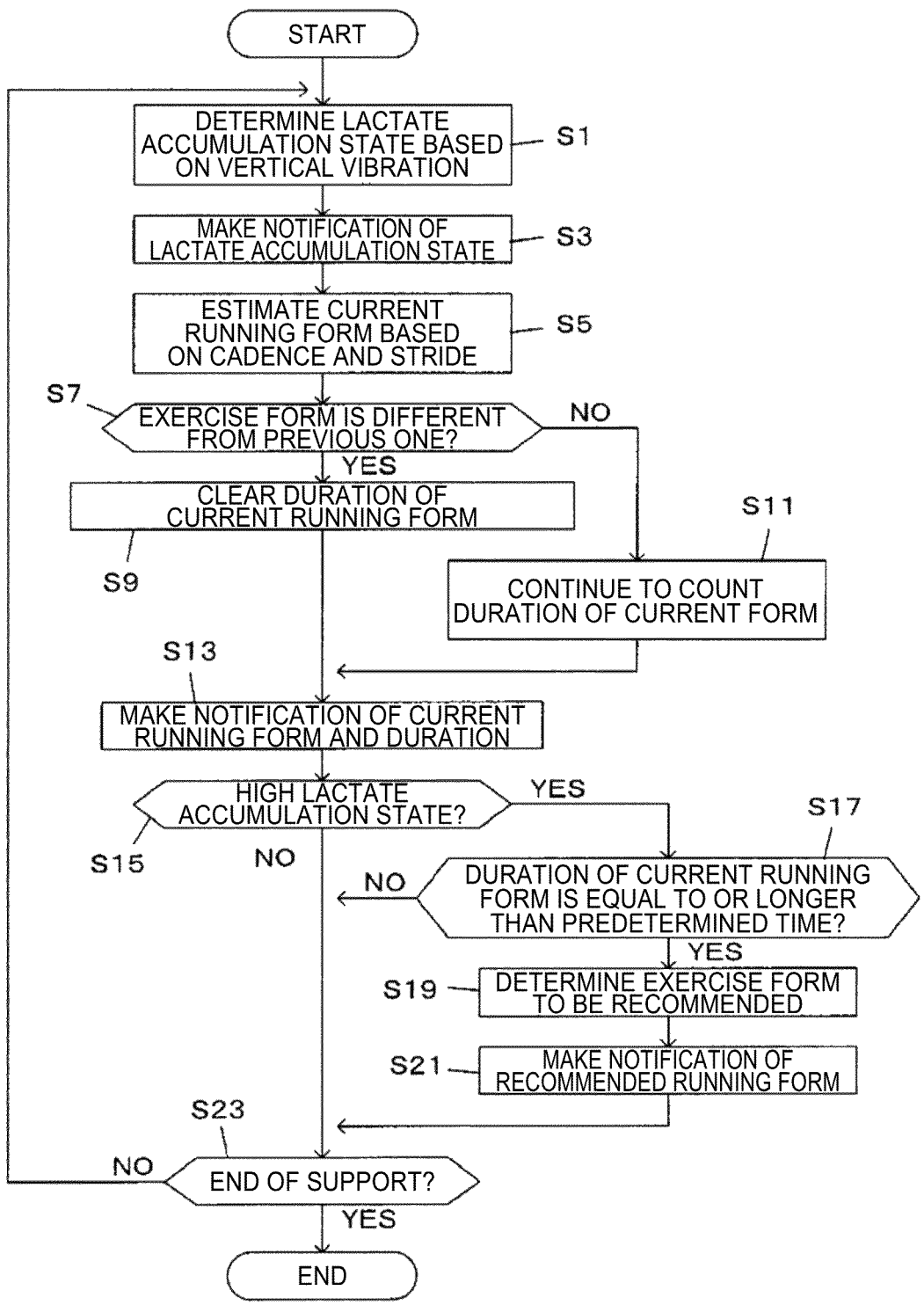
FIG. 38 is a flowchart of an exercise support process.

FIG. 38 is a flowchart for explaining the flow of the exercise support process. This process is a process executed by the exercise support section 630 with the exercise support program 730, and the execution of this process is started in response to a support start instruction made by the user 5 wearing the portable electronic apparatus 4 in the state in which the inertial navigation calculation has been performed by the inertial navigation calculation section 610 and thus the position, the speed, the attitude, and so on of the portable electronic apparatus 4 have already been calculated, and the calculation of the exercise indexes has already been performed by the exercise index calculation section 620.

Firstly, the lactate accumulation state determination section 631 determines (step S1) the accumulation level and the accumulation state of the lactate based on the vertical vibration amplitude as the exercise index. Then, the notification control section 635 makes a notification (step S3) of the accumulation level and the accumulation state of the lactate thus determined.

Further, the current form estimation section 632 estimates (step S5) the current running form based on the cadence and the stride as the exercise indexes. Subsequently, if the current running form thus estimated is different from the previous running form (NO in the step S7), the duration calculation section 633 clears (step S9) the duration, and if the running forms are the same (YES in the step S7), the duration calculation section 633 continues (step S11) to count the duration of the same running form. Then, the notification control section 635 makes a notification (step S13) of the current running form thus estimated and the duration.

Subsequently, if the lactate accumulation state is in the high accumulation state (YES in the step S15), and the duration of the current running form is equal to or longer than a predetermined time period (YES in the step S17), the recommended form determination section 634 determines (step S19) a running form different from the current running form as the recommended running form. Then, the notification control section 635 makes a notification (step S21) of the recommended running form thus determined.

Subsequently, the exercise support section 630 determines whether or not the support stop instruction has been made. If the support stop instruction has not been made (NO in the step S23), the process returns to the step S. If the support stop instruction has been made (YES in the step S23), the process is terminated.

3-5. Functions and Advantages

As described above, according to the portable electronic apparatus 4 of the third embodiment, it is possible to determine whether or not the running form is in the unstable state using the detection values of the IMU 70, and to make a predetermined notification in the case in which the unstable state has been determined. Further, if the lactate accumulation occurs in a certain region, the running form becomes unstable due to the muscle weakness in that region, and therefore, it is possible to presumptively determine the fact that the lactate accumulation has occurred based on the fact that the running form of the user has become in the unstable state.

Further, it is possible to estimate the running form of the user 5 using the detection values of the IMU 70, and then recommend a different form in the case in which the running form is in an unstable state, and the duration of the same running form is equal to or longer than a predetermined time period. Thus, by recommending a different running form in the case in which the running in the same running form is continued, it becomes possible to, for example, remove the lactate accumulated in the muscle of a specific region.

4. Modified Examples

The invention is not limited to the embodiments described above, but can be implemented with various modifications within the scope or the spirit of the invention. Hereinafter, some modified examples will be explained. It should be noted that the same constituents as in any of the embodiments described above are denoted with the same reference symbols, and the duplicated explanation will be omitted.

4-1. Sensor

Although in each of the embodiments described above, the acceleration sensor 12 and the angular velocity sensor 14 (or the acceleration sensor 71 and the gyro sensor 72) are integrated with each other as the inertial measurement unit 10 (or the IMU 70) and are incorporated in the exercise analysis device 2 (or the portable electronic apparatus 4), the acceleration sensor 12 and the angular velocity sensor 14 (or the acceleration sensor 71 and the gyro sensor 72) are not required to be integrated with each other. Alternatively, the acceleration sensor 12 and the angular velocity sensor 14 (or the acceleration sensor 71 and the gyro sensor 72) can also be attached directly to the user without being incorporated in the exercise analysis device 2 (or the portable electronic apparatus 4). In the first embodiment and the second embodiment, in any cases, it is sufficient to, for example, set either one of the sensor coordinate systems to the b-frame of the embodiments described above, transform the other of the sensor coordinate systems into the b-frame, and then apply each of the embodiments.

Further, although in each of the embodiments described above, the explanation is presented assuming that the region of the user to which the sensor (the exercise analysis device 2 (IMU 10) or the portable electronic apparatus 4 (IMU 70)) is attached is the waist (the waist portion) or the body portion, it is also possible to assume that the sensor is attached to other regions than the waist (the waist portion) or the body portion. The preferable attachment region is the body trunk (the region other than the four limbs) of the user. However, it is also possible to assume that the sensor is attached to other regions than the arms, for example, the head or the legs, besides the body trunk. Further, the number of the sensors is not limited to one, but it is also possible to assume that an additional sensor is attached to a different region of the body. It is also possible to attach the sensors to, for example, the waist and the legs, or the waist and the arms.

4-2. Inertial Navigation Calculation

Although in the first embodiment and the second embodiment described above, the integral processing section 220 calculates the speed, the position, the attitude angle, and the distance in the e-frame, and then the coordinate transformation section 250 performs the coordinate transformation on the speed, the position, the attitude angle, and the distance in the e-frame to generate the speed, the position, the attitude angle, and the distance in the m-frame, it is also possible for the integral processing section 220 to calculate the speed, the position, the attitude angle, and the distance in the m-frame. In this case, since it is sufficient for the exercise analysis section 24 to perform the exercise analysis process using the speed, the position, the attitude angle, and the distance in the m-frame calculated by the integral processing section 220, the coordinate transformation of the speed, the position, the attitude angle, and the distance by the coordinate transformation section 250 becomes unnecessary. Further, it is also possible for the error estimation section 230 to perform the error estimation by the extended Kalman filter using the speed, the position, and the attitude angle in the m-frame.

Further, although in the first embodiment and the second embodiment described above, the inertial navigation calculation section 22 performs a part of the inertial navigation calculation using the signals from the GPS satellites, it is also possible for the inertial navigation calculation section 22 to use signals from positioning satellites of Global Navigation Satellite System (GNSS) other than the GPS, or signals from positioning satellites other than GNSS. It is also possible to use one or more of the satellite positioning systems such as Wide Area Augmentation System (WAAS), Quasi Zenith Satellite System (QZSS), GLObal NAvigation Satellite System (GLONASS), GALILEO, and BeiDou Navigation Satellite System (BciDou). Further, it is also possible to use an indoor positioning system (Indoor MEssaging System (IMES)) or the like.

Further, although in the first embodiment and the second embodiment described above, the running detection section 242 detects the running period at the timing when the acceleration (the z-axis acceleration) of the vertical motion of the user takes a local maximum value equal to or higher than a threshold value, the invention is not limited to this example, but it is also possible to detect the running period at the timing when, for example, the acceleration (the z-axis acceleration) of the vertical motion changes from a positive value to a negative value (or the timing when the z-axis acceleration changes from a negative value to a positive value). Alternatively, it is also possible for the running detection section 242 to calculate speed (z-axis speed) of the vertical motion by integrating the acceleration (the z-axis acceleration) of the vertical motion, and then detect the running period using the speed (the z-axis speed) of the vertical motion thus calculated. On this occasion, it is also possible for the running detection section 242 to detect the running period at the timing when, for example, the speed traverses a threshold value in the vicinity of the center value between the local maximum value and the local minimum value due to an increase in the value or a decrease in the value. Further, it is also possible for the running detection section 242 to, for example, calculate synthesized acceleration of those in the x-axis, y-axis, and z-axis directions, and detect the running period using the synthesized acceleration thus calculated. On this occasion, it is also possible for the running detection section 242 to detect the running period at the timing when, for example, the synthesized acceleration traverses a threshold value in the vicinity of the center value between the local maximum value and the local minimum value due to an increase in the value or a decrease in the value.

Further, although in the first embodiment and the second embodiment described above, the error estimation section 230 uses the velocity, the attitude angle, the acceleration, the angular velocity, and the position as the state variables to estimate the errors of these values using the extended Kalman filter, it is also possible to estimate the errors thereof using some of the velocity, the attitude angle, the acceleration, the angular velocity, and the position as the state variables. Alternatively, it is also possible for the error estimation section 230 to use other values (e.g., a moving distance) than the velocity, the attitude angle, the acceleration, the angular velocity, and the position as the state variables to estimate the errors thereof. Similarly, in the third embodiment described above, it is also possible to use some of the variations in the respective values of the absolute velocity vector, the absolute coordinate attitude angle, the absolute coordinate position, and the yaw angle as the elements of the state vector X, or it is also possible to use other values (e.g., the acceleration vector, the angular velocity vector, or the moving distance vector) than these values as the elements of the state vector X.

Further, although in the first embodiment and the second embodiment described above, the extended Kalman filter is used for the estimation of the errors by the error estimation section 230, it is also possible to replace the extended Kalman filter with other estimation device such as a particle filter or an H infinity filter. Similarly, in the third embodiment described above, it is possible to replace the Kalman filter process described above with a process using other estimation device such as a particle filter or an H infinity filter.

4-3. Exercise Analysis Process

In each of the embodiments described above, it is also possible for the exercise analysis device 2 or the portable electronic apparatus 4 to generate the exercise analysis information (the exercise indexes) using biological information. As the biological information, there can be cited, for example, skin temperature, central temperature, oxygen consumption, an inter-beat variation, a heart rate, a pulse rate, a respiration rate, heat flow, a galvanic skin response, electromyogram (EMG), electroencephalogram (EEG), electro-oculogram (EOG), blood pressure, and an activity. It is also possible for the exercise analysis device 2 or the portable electronic apparatus 4 to be provided with a device for measuring the biological information, or to receive the biological information measured by a measurement device. For example, it is also possible that the user runs with a wristwatch-type pulsimeter attached, or with a heart-rate sensor wound around the chest with a belt, and the exercise analysis device 2 or the portable electronic apparatus 4 calculates the heart rate of the user during running using the measurement value of the pulsimeter or the heart-rate sensor.

Further, although in the first embodiment and the second embodiment, the exercise indexes included in the exercise analysis information are each an index related to a technical ability of the user, the exercise analysis information can also include the exercise indexes related to endurance capacity. For example, the exercise analysis information can also include the HRR (Heart Rate Reserved) calculated as follows as the exercise index related to the endurance capacity.

(heart rate reserved)=((heart rate)−(heart rate at rest))/((maximum heart rate)−(heart rate at rest))×100

For example, it is also possible that each athlete operates the notification device 3 to input the heart rate, the maximum heart rate, and the heart rate at rest every time running is performed, or runs with the heart rate meter attached, and the exercise analysis device 2 obtains the values of the heart rate, the maximum heart rate, and the heart rate at rest from the notification device 3 or the heart rate meter, and then calculates the value of the heart rate reserved (HRR).

Further, although in each of the embodiments described above, the exercise analysis in running of a human is intended, the invention is not limited to this configuration, but can similarly be applied to the exercise analysis in walking and running of a moving object such as an animal or a robot. Further, besides running, the invention can also be applied to a wide variety of exercises such as mountaineering, trail running, skiing (including cross-country skiing and ski jumping), snowboarding, swimming, bike riding, skating, golf, tennis, baseball, or rehabilitation. In the case in which the invention is applied to skiing as an example, it is also possible to determine, for example, whether or not curving can smoothly achieved, or whether or not the ski plates fail to be aligned, based on the variation in the vertical acceleration when pressurizing the ski plates, or it is also possible to determine the difference between the right foot and the left foot, or the ability of skiing based on the trajectory of the change in the vertical acceleration when pressurizing or unweighting the ski plates. Alternatively, it is also possible to analyze how approximate the trajectory of the change in the angular velocity in the yaw direction is to a sine wave to thereby determine whether or not the user successfully rides the ski plates, or it is also possible to analyze how approximate the trajectory of the change in the angular velocity in the roll direction is to a sine wave to thereby determine whether or not the smooth skiing is achieved.

4-4. Notification Process

Although in the first embodiment described above, the notification device 3 normalizes the difference between the value of the exercise index and the target value into a value in a range between 0 and 1 while setting the difference to 0 if the difference is equal to or lower than 0, and setting the difference to 1 if the difference is equal to or higher than the maximum value set in advance with respect to each of the exercise indexes, the normalization method is not limited to this example. For example, it is also possible for the notification device 3 to normalize the difference between the value of the exercise index and the target value into a value in a range between 0 and 1 while setting the difference to 0 if the difference is equal to or higher than the maximum value set in advance, and setting the difference to 1 if the difference is equal to or lower than 0 with respect to each of the exercise indexes. In this case, it is sufficient for the notification device 3 to assume that the closer the normalized difference value of the exercise index is to 1, the better, and the closer the normalized difference value of the exercise index is to 0, the worse, and perform the subsequent process. Further, for example, it is also possible for the notification device 3 to normalize the difference into a numerical range different from the range between 0 and 1.

Further, although in the first embodiment described above, the notification device 3 notifies the user of the exercise indexes better or worse than the respective target values using the sounds or the vibrations different from each other, it is also possible that a light emitting section is provided to the notification device 3, and the notification device 3 makes the notifications of the respective exercise indexes better or worse than the respective target values using light signals from the light emitting section different in type from each other (e.g., light signals different in color or blink pattern from each other).

Further, although in the first embodiment described above, the notification device 3 performs the calculation of the difference between the values of the exercise indexes and the respective target values, the normalization, the selection and the notification of the exercise indexes, it is also possible that the exercise analysis device 2 performs the calculation of the difference, and the notification device 3 receives the calculation value of the difference, and then performs the normalization, and the selection and the notification of the exercise indexes. Alternatively, it is also possible that the exercise analysis device 2 performs the calculation of the difference and the normalization, and the notification device 3 receives the normalized calculation value of the difference, and then performs the selection and the notification of the exercise indexes. Alternatively, it is also possible that the exercise analysis device 2 performs the calculation of the difference, the normalization, and the selection of the exercise indexes, and the notification device 3 receives the information of the selected exercise indexes, and then performs the notification. In either of the cases, the exercise analysis system 1 including the exercise analysis device 2 and the notification device 3 functions as the notification device. Alternatively, it is also possible for the exercise analysis device 2 to perform the calculation of the difference, the normalization, the selection and the notification of the exercise indexes to function as the notification device.

Further, although in the second embodiment described above, the notification device 3 notifies the user of the target grounding time and the target flying time using the sounds or the vibrations, it is also possible that the notification device 3 is provided with a light emitting section, and the notification device 3 makes the notifications of the target grounding time and the target flying time using the light from the light emitting section. In the case in which the notification device 3 makes both of the notifications of the target grounding time and the target flying time using the light, it is also possible to arrange that the two types of light for making the respective notifications of the target grounding time and the target flying time are different in color or blink pattern from each other.

Further, although in the second embodiment described above, the notification device 3 performs the setting (calculation) of the target grounding time and the target flying time, the selection of the notification mode, and the notification using the sounds or the vibrations, it is also possible that the exercise analysis device 2 performs the setting (calculation) of the target grounding time and the target flying time, and the notification device 3 receives the setting values of the target grounding time and the target flying time, and then performs the selection of the notification mode, and the notification using the sounds or the vibrations. Alternatively, it is also possible that the exercise analysis device 2 performs the setting (calculation) of the target grounding time and the target flying time, and the selection of the notification mode, and the notification device 3 receives the setting values of the target grounding time and the target flying time, and the information of the notification mode thus selected, and then makes the notification using the sounds or the vibrations. In either of the cases, the exercise analysis system 1 including the exercise analysis device 2 and the notification device 3 functions as the notification device. Alternatively, it is also possible for the exercise analysis device 2 to perform the setting (calculation) of the target grounding time and the target flying time, selection of the notification mode, and the notification using the sounds or the vibrations to function as the notification device.

Further, although in the second embodiment described above, the notification device 3 notifies the user of the information related to the exercise indexes worse than the respective target values, it is possible to notify the user of the information related to the exercise indexes better than the respective target values.

Further, although in the first embodiment and the second embodiment described above, the notification device 3 is the wristwatch-type device, the invention is not limited to this configuration, but it is also possible to adopt a portable device (e.g., a head mount display (HMD) or a device (which can also be the exercise analysis device 2) attached to the waist of the user) other than the wristwatch-type attached to the user. In the case in which the notification device 3 is the head mount display (HMD), since the display section thereof is sufficiently larger and therefore higher in visibility than the display section of the notification device 3 having the wristwatch shape, and is therefore difficult to be an obstacle if watched by the user, it is also possible to, for example, display the information of the running process so far of the user, or to display a picture in which a virtual runner created based on a record time (e.g., a record time set by the user, the personal record, the record of a personality, or the world record) is running.

4-5. Running Form

Although in the third embodiment described above, it is assumed that the running form includes the two types, namely the long-stride running and the short-stride running, it is possible to replace them with other types, or to include three or more types. Further, although the exercise indexes used for determining the running form are assumed to be the cadence and the stride, other exercise indexes can also be adopted. Further, it is possible to adopt other exercise indexes in which the feature of the running form appears in accordance with the type of the running form.

4-6. Man-Machine Interface Function

It is also possible to arrange that there is provided a device having the man-machine interface function of the portable electronic apparatus 4 explained as the third embodiment described above. Specifically, for example, a terminal device having the function corresponding to the display section 520 is implemented as a wristwatch-type device, and is made to be connected to the portable electronic apparatus 4 via wireless communication (see FIG. 34). Then, it is also possible to arrange that the terminal device is made to occasionally display the support result by the exercise support section 630. Further, the terminal device can also be provided with the functions corresponding not only to the display section 520, but also to the operation section 510 and the sound output section 530.

4-7. Other Issues

For example, it is also possible for the exercise analysis device 2 and the notification device 3 to calculate the score of the user based on the input information or the analysis information to notify the user of the score during running or after running. For example, it is sufficient to section the numerical value of each of the exercise indexes into a plurality of levels (e.g., 5 levels or 10 levels), and to assign points to the respective levels in advance. Further, for example, it is also possible for the exercise analysis device 2 or the notification device 3 to provide the points in accordance with the types of the number of the exercise indexes high in score, or to calculate the total score, and then display the result.

Further, although in the first embodiment and the second embodiment described above, the exercise analysis device 2 is provided with the GPS unit 50, the GPS unit 50 is not required to be provided. For example, it is also possible that the processing section 120 of the notification device 3 receives the GPS data from the GPS unit 110, and then transmits the GPS data to the exercise analysis device 2 via the communication section 140, and the processing section 20 of the exercise analysis device 2 receives the GPS data via the communication section 40, and then adds the GPS data thus received to the GPS data table 320.

Further, although in the first embodiment and the second embodiment described above, the exercise analysis device 2 and the notification device 3 are separated from each other, it is also possible to adopt an exercise analysis device (a notification device) having the exercise analysis device 2 and the notification device 3 integrated with each other.

Further, although in the first embodiment and the second embodiment described above, the exercise analysis device 2 is attached to the user, the invention is not limited to this configuration, but it is also possible that the inertial measurement unit (the inertial sensor) and the GPS unit are attached to the body or the like of the user, the inertial measurement unit (the inertial sensor) and the GPS unit each transmit the detection result to the portable information device such as a smartphone, and the portable information device analyzes the exercise of the user using the detection results received.

The embodiments and the modified examples described above are illustrative only, and the invention is not limited to the embodiments and the modified examples. For example, it is also possible to arbitrarily combine any of the embodiments and the modified examples described above with each other.

The invention includes configurations (e.g., configurations having the same function, the same way, and the same result, or configurations having the same object and the same advantage) substantially the same as the configuration described as the embodiment of the invention. Further, the invention includes configurations obtained by replacing a non-essential part of the configuration described as the embodiment of the invention. Further, the invention includes configurations exerting the same functions and advantages and configurations capable of achieving the same object as the configuration described as the embodiment of the invention. Further, the invention includes configurations obtained by adding known technologies to the configuration described as one of the embodiments of the invention.

What is claimed is:

1. A notification device comprising:
an output section adapted to periodically make a notification of at least one of a first period corresponding to a target value of a grounding time of a foot of a user, and a second period corresponding to a target value of a flying time of a foot of the user during an exercise of the user,
wherein the output section makes the notification of the first period using a first notification medium, and makes the notification of the second period using a second notification medium different from the first notification medium.

2. The notification device according to claim 1, wherein the output section makes the notification using at least one of a sound and a vibration.

3. The notification device according to claim 1, further comprising:
a notification mode selection section capable of selecting one of a first mode of making the notification of the first period without making the notification of the second period and a second mode of making the notification of the second period without making the notification of the first period.

4. The notification device according to claim 3, wherein the notification mode selection section is capable of selecting a third mode of making both of the notification of the first period and the notification of the second period.

5. The notification device according to claim 1, further comprising:
a target value setting section adapted to set the target value of the grounding time and the target value of the flying time based on predetermined information in the exercise of the user.

6. The notification device according to claim 5, wherein the predetermined information is information of the grounding time.

7. The notification device according to claim 5, wherein the predetermined information is information of a running pitch.

8. The notification device according to claim 5, wherein the predetermined information is information of running speed.

9. The notification device according to claim 5, wherein the predetermined information is information calculated using a detection result of an inertial sensor.

10. An exercise analysis system comprising:
the notification device according to claim 9; and
an exercise analysis device adapted to calculate the predetermined information using the detection result of the inertial sensor.

11. A notification method comprising:
periodically making a notification of at least one of a first period corresponding to a target value of a grounding time of a foot of a user, and a second period corresponding to a target value of a flying time of a foot of the user during an exercise of the user.

12. A notification program adapted to make a computer execute a process comprising:
periodically making a notification of at least one of a first period corresponding to a target value of a grounding time of a foot of a user, and a second period corresponding to a target value of a flying time of a foot of the user during an exercise of the user.

13. A notification device comprising:
an output section adapted to periodically make a notification of at least one of a first period corresponding to a target value of a grounding time of a foot of a user, and a second period corresponding to a target value of a flying time of a foot of the user during an exercise of the user; and
a notification mode selection section capable of selecting one of a first mode of making the notification of the first period without making the notification of the second period and a second mode of making the notification of the second period without making the notification of the first period.

14. A notification device comprising:
an output section adapted to periodically make a notification of at least one of a first period corresponding to a target value of a grounding time of a foot of a user, and a second period corresponding to a target value of a flying time of a foot of the user during an exercise of the user; and
a target value setting section adapted to set the target value of the grounding time and the target value of the flying time based on predetermined information in the exercise of the user, wherein the predetermined information is information of a running pitch.

* * * * *